(12) United States Patent
Yoshioka

(10) Patent No.: US 10,013,219 B2
(45) Date of Patent: Jul. 3, 2018

(54) IMAGE FORMING APPARATUS

(71) Applicant: KYOCERA Document Solutions Inc., Osaka-shi (JP)

(72) Inventor: Tetsuya Yoshioka, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 15/546,427

(22) PCT Filed: Jan. 26, 2016

(86) PCT No.: PCT/JP2016/052218
§ 371 (c)(1),
(2) Date: Jul. 26, 2017

(87) PCT Pub. No.: WO2016/121774
PCT Pub. Date: Aug. 4, 2016

(65) Prior Publication Data
US 2017/0371599 A1    Dec. 28, 2017

(30) Foreign Application Priority Data

Jan. 30, 2015 (JP) .................. 2015-017160
Jan. 30, 2015 (JP) .................. 2015-017161

(51) Int. Cl.
G06F 3/12      (2006.01)
G03G 15/00     (2006.01)
H04N 1/393     (2006.01)

(52) U.S. Cl.
CPC ....... *G06F 3/1208* (2013.01); *G03G 15/5016* (2013.01); *G06F 3/1252* (2013.01);
(Continued)

(58) Field of Classification Search
CPC .... G06F 3/1256; G06F 3/1208; G06F 3/1252; G06F 3/1219; G03G 15/5016; H04N 1/393
(Continued)

(56) References Cited

U.S. PATENT DOCUMENTS

| | | | |
|---|---|---|---|
| 9,000,393 B2 * | 4/2015 | Takasawa | A61B 6/461 250/394 |
| 2008/0195663 A1 * | 8/2008 | Sekine | G03G 15/5016 |
| 2009/0009820 A1 * | 1/2009 | Fukui | H04N 1/3875 358/449 |

FOREIGN PATENT DOCUMENTS

JP     2003-208279     1/2016

OTHER PUBLICATIONS

International Search Report dated Apr. 26, 2016.

* cited by examiner

*Primary Examiner* — Allen H Nguyen
(74) *Attorney, Agent, or Firm* — Gerald E. Hespos; Michael J. Porco; Matthew T. Hespos

(57) ABSTRACT

An image forming apparatus comprising: an acceptance section; a prediction section which predicts, based on margin information contained in an instruction for execution of an accepted job, an arrangement pattern of a plurality of sheets to be obtained by the execution; a determination section which determines, based on the margin information, whether or not a sum of respective areas of margin regions of the plurality of sheets is greater than a threshold associated with the predicted arrangement pattern; and an adjusted printing section which downscales, in response to a determination that the sum is greater than the threshold, an overall image consisting of a set of partial images intended to be formed and arranged in the predicted arrangement pattern, in such a manner as to fall within one or more sheets arranged in an
(Continued)

altered arrangement pattern, and forms the downscaled image on the one or more sheets.

16 Claims, 41 Drawing Sheets

(52) U.S. Cl.
CPC .......... *H04N 1/393* (2013.01); *G06F 3/1219* (2013.01); *G06F 3/1256* (2013.01)

(58) Field of Classification Search
USPC ........................................................ 358/1.2
See application file for complete search history.

ARRANGEMENT PATTERN
Y2Xv (v≧2)

(v−0.2) × w (2−0.2) × h

THRESHOLD TY2Xv
=2 × PS × v
−(2−0.2) × h × (v−0.2) × w

ARRANGEMENT PATTERN
Y1Xm (m≧3)

THRESHOLD TY1Xm
=PS×m

FIG. 6

| ARRANGEMENT PATTERN | ALTERED ARRANGEMENT PATTERN |
|---|---|
| Y2X1 | Y1X1 |
| Y1X2 | Y1X1 |
| Y2X2 | Y1X1 |
|  | Y1X2 |
|  | Y2X1 |
| YsX1 (s≧3) | Ys-1X1 |
| Y1Xs (s≧3) | Y1Xs-1 |
| YnXv (n≧3,v≧2) | Yn-1Xv |
|  | YnXv-1 |
| YuXm (u≧2,m≧3) | Yu-1Xm |
|  | YuXm-1 |

FIRST THRESHOLD T1 = h × 0.3 × w
(AREA SURROUNDED BY DASHED LINE)

SECOND THRESHOLD T2 = 0.3 × h × w
(AREA SURROUNDED BY ONE-DOT CHAIN LINE)

FIRST AREA BS1 = AREA OF BR + AREA OF BBR

SECOND AREA BS2 = AREA OF BB + AREA OF BBR

FIG. 18

IN CASE WHERE RADIO BUTTON C12 IS SELECTED

IN CASE WHERE RADIO BUTTON C13 IS SELECTED

IN CASE WHERE RADIO BUTTON C14 IS SELECTED

IMAGE FORMING APPARATUS

TECHNICAL FIELD

1. The present invention relates to an image forming apparatus, and more particularly to a technique of executing a printing job based on an accepted printing job execution instruction.

BACKGROUND ART

Heretofore, it has been common practice to generate a printing job execution instruction for instructing an image forming apparatus such as a printer to execute a printing job, using a printer driver or the like, so as to print an image representing an edited object such as a text, a table or a photograph edited on software running on a personal computer.

However, for example, when printing a rectangular image representing a table or the like, a user sometimes fails to adequately input printing conditions such as a size of a sheet to be output and a printing range, and thus a printing job execution instruction can be generated with the printing conditions set to a default state. If the printing job is executed based on such a printing job execution instruction, a plurality of sheets are likely to be output with an image formed thereon in a layout unintended by a user, e.g., an image is likely to be formed on sheets whose number is greater than that intended by the user, in such a manner as to protrude beyond an intended sheet. In this case, the user feels inconvenient, e.g., because the image cannot be visually recognized without adequately arranging the output sheets, and will perform operation for re-generating a new printing job execution instruction. This can result in a situation where the previously output sheets become wasted, and the user is required to take time and effort for re-generating a new printing job execution instruction.

In view of the above, for example, the following JP 2003-208279A describes determining, based on acquired printing data, whether or not printing target data will be printed out in such a manner as to protrude from a page intended to allow the printing target data to fall therewithin, to another page, on a page-by-page basis. The JP 2003-208279A also describes, when it is determined that the printing target data will be printed out to protrude beyond the intended page, prompting a user to select whether or not the printing should be continued, or automatically downscaling an image representing the data determined that it will be printed out to protrude beyond the intended page, and printing the downscaled image on the intended page to thereby prevent unnecessary printing and improve convenience.

For example, when printing a large-area rectangular image such as a table having a large number of columns and/or rows, a user sometimes intends to form the image to fall within a plurality of sheets two or more of which are aligned in each of a vertical direction and a horizontal direction.

However, the technique described in the following JP 2003-208279A is configured to, based on a printing job execution instruction, determine whether or not an image will be formed to fall within each sheet, on a sheet-by-sheet basis, i.e., determine whether or not an image will be formed as intended by a user, on a per-sheet basis. Thus, in the technique described in the following JP 2003-208279A, suppose that a printing job execution instruction for forming an image to fall within a plurality of sheets intentionally arranged by a user is generated, as mentioned above. In this case, when the above determination is made based on the printing job execution instruction on a per-sheet basis, the determination for a part of the plurality of sheets is likely to be made such that a partial image assigned to each of these sheets will be formed to fall within the sheet, and the determination for the remaining sheets is likely to be made such that a partial image assigned to each of these sheets will not be formed to fall within the sheet.

Thus, on each of a part of the plurality of sheets, the partial image assigned thereto is formed as-is without being downscaled, according to the printing job execution instruction, and, on each of the remaining sheets, the partial image assigned thereto is formed after being downscaled. Therefore, though a user desired to obtain a set of the plurality of sheets having an image formed thereon in an intended layout, there is a possibility of failing to obtain such a desired set of the plurality of sheets. This is likely to lead to a situation where all of the plurality of output sheets become wasted. Moreover, the user is likely to be required to take time and effort for re-generating a new printing job execution instruction, for example, by re-inputting conditions for forming an image on a plurality of sheets.

On the other hand, during editing of an image, a user sometimes sets as printing conditions a printing range corresponding to a size of the image during the edition, so as to preview a result of printing of the image. Suppose that the image size is subsequently reduced so that a final image size after the editing becomes smaller than that during the editing. Despite this situation, there is a possibility that the user performs operation for generating a printing job execution instruction without changing the setting of the printing conditions.

If a printing job is executed based on such a printing job execution instruction, a sheet having an image formed thereon in a size smaller than that intended by the user and thus having a relatively large margin is likely to be output, i.e., a sheet having an image formed thereon in a layout unintended by the user is likely to be output. In this case, the user feels inconvenient due to difficulty in visually recognizing the image, and will perform operation for re-generating a new printing job execution instruction. As a result, there is a possibility that the user feels a burden of taking time and effort for re-generating a new printing job execution instruction.

As above, in the case where a printing job execution instruction is generated without redoing the setting of the printing conditions, even using the technique described in the Patent Document 1, the determination will be made such that an image will be formed to fall within a sheet, based on the printing job execution instruction. If the printing job is executed according to the result of the determination without any change, a sheet having an image formed thereon in a layout unintended by the user is likely to be output. This can result in a situation where the user feels a burden of taking time and effort for re-generating a new printing job execution instruction.

It is an object of the present invention to provide an image forming apparatus capable of reducing a risk that a plurality of sheets are output with an image formed thereon in a layout unintended by a user, when a printing job is executed based in an accepted printing job execution instruction.

SUMMARY

According to one aspect of the present invention, there is provided an image forming apparatus comprising: an acceptance section which accepts a printing job execution instruction for executing an printing job for forming a set of partial images, respectively, on a plurality of sheets; a prediction section which predicts, based on margin information contained in an accepted job execution instruction accepted by the acceptance section, and indicative of a margin region as a non-image forming region defined in each of the sheets, an arrangement pattern of the plurality of sheets to be obtained as a result of execution of an accepted job as the printing job indicated by the accepted job execution instruction; a determination section which determines, based on the margin information, whether or not a sum of respective areas of margin regions of the plurality of sheets is greater than a threshold associated with the arrangement pattern predicted by the prediction section; and an adjusted printing section which executes an adjusted printing processing of: downscaling, when the determination section determines that that the sum is greater than the threshold, an overall image consisting of a set of partial images intended to be formed according to the accepted job and arranged in the predicted arrangement pattern, in such a manner as to fall within one or more sheets arranged in an altered arrangement pattern associated with the predicted arrangement pattern; and forming the downscaled overall image on the one or more sheets arranged in the altered arrangement pattern, wherein the number of the one or more sheets is less than that of the sheets arranged in the predicted arrangement pattern.

According to another aspect of the present invention, there is provided an image forming apparatus comprising: an acceptance section which accepts a printing job execution instruction for executing an printing job for forming an image on one sheet; a first determination section which determines, based on region information contained in an accepted job execution instruction accepted by the acceptance section, and indicative of an image forming region and a margin region as a non-image forming region each defined in the one sheet, whether or not a first area of a part of the margin region lying rightward or leftward of the image forming region is greater than a preset first threshold; a second determination section which determines, based on the region information, whether or not a second area of a part of the margin region lying upward or downward of the image forming region is greater than a preset second threshold; and an adjusted printing section which executes an adjusted printing processing of: enlarging, when the first determination section determines that the first area is greater than the first threshold or when the second determination section determines that the second area is greater than the second threshold, an image intended to be formed according to the accepted job, so as to cause the first area or the second area to become reduced; and forming the enlarged image on one or more sheets.

The present invention provides an image forming apparatus capable of reducing the risk that a plurality of sheets are output with an image formed thereon in a layout unintended by a user, when a printing job is executed based in an accepted printing job execution instruction.

BRIEF DESCRIPTION OF DRAWINGS

FIG. 6 is a diagram depicting an altered arrangement pattern associated with each type of arrangement pattern.

FIG. 18 is a diagram depicting a specific example of the operation in FIG. 17, in the case where a first determination section determines that the first area is greater than the first threshold, and a second determination section determines that the second area is greater than the second threshold.

FIG. 22 is a diagram depicting a specific example of the operation in FIG. 17, in the case where the first determination section determines that the first area is equal to or less than the first threshold, and the second determination section determines that the second area is greater than the second threshold.

FIG. 25 is a diagram depicting a specific example where a first adjusted printing processing and a second adjusted printing processing in a modification of the second embodiment are performed in the specific example depicted in FIG. 18.

DESCRIPTION OF EMBODIMENTS

First Embodiment

A first embodiment of an image forming apparatus of the present invention will now be described based on the drawings. Although this embodiment will be described by taking a printer as an example of an image forming apparatus, this is not meant to be construed in a limiting sense. For example, the image forming apparatus may be a facsimile machine or a complex machine.

Figure 1:
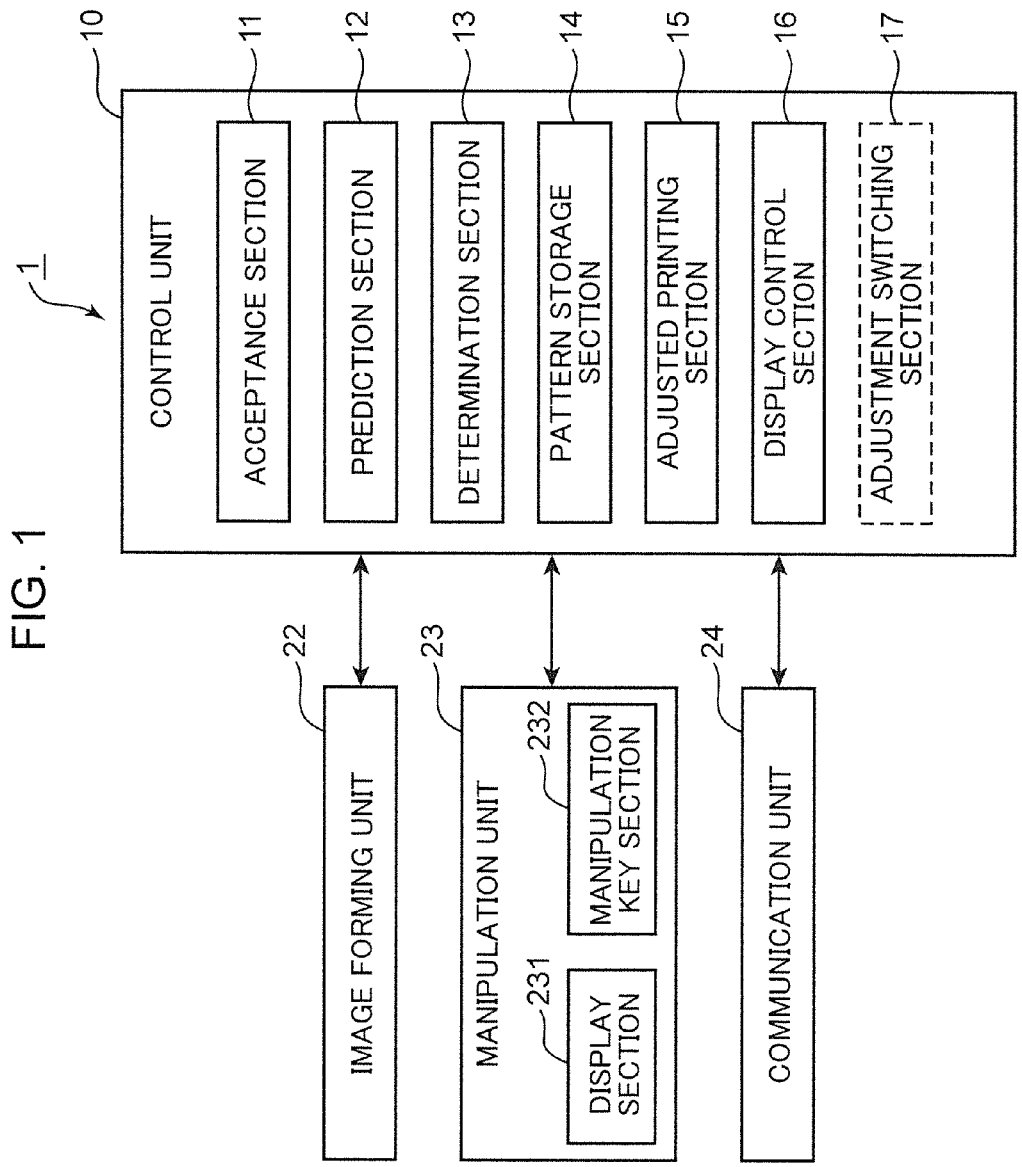
FIG. 1 is a block diagram depicting an electrical configuration of a printer according to a first embodiment of an image forming apparatus of the present invention.

FIG. 1 is a block diagram depicting an electrical configuration of a printer 1 according to the first embodiment of the image forming apparatus of the present invention. As depicted in FIG. 1, the printer 1 comprises an image forming unit 22, a manipulation unit 23, a communication unit 24 and a control unit 10.

The image forming unit 22 is configured to form an image on a sheet under control of the control unit 10. Specifically, the image forming unit 22 has a well-known configuration comprising a photosensitive drum, an electrostatic charging section, an exposure section, a development section, and a cleaning section. An operation to be performed by the image forming unit 22, i.e., an image forming operation of forming an image of a sheet, is well known, and therefore description thereof will be omitted.

The manipulation unit 23 comprises a display section 231 for displaying information thereon, and a manipulation key section 232 for allowing a user to perform manipulation about various instructions therethrough. The display section 231 is composed, for example of a liquid crystal display having a touch panel function, and is configured to display a variety of information thereon. For example, the manipulation key section includes various keys such as a numerical keypad for inputting a numerical value and/or a symbol, and a directional keypad for moving a pointer (cursor) displayed on the display section 231.

The communication unit 24 is connected to a non-depicted network such as LAN (Local Area Network). The communication unit 24 is a communication interface circuit for performing communication with an external device such as a personal computer connected to the network. The communication unit 24 is operable to receive a printing job execution instruction (instruction for execution of a printing job) transmitted from the external devices. The printing job means a job for the image forming unit 22 to form an image on a sheet.

For example, the control unit 10 comprises: a non-depicted CPU (Central Processing Unit) for executing a given computational processing; a non-depicted non-volatile memory such as EEPROM, which preliminarily stores therein a given control program; a non-depicted RAM (Random Access Memory) for temporarily storing data therein; and peripheral circuits thereof. The control unit 10 is configured to cause the CPU to execute the control program stored in the non-volatile memory or the like to thereby execute a variety of processing to control operation of each unit of the printer 1.

For example, the control unit 10 is operable, when a printing job execution instruction is received by the communication unit 24, to cause the image forming unit 22 to form an image on a sheet, based on this printing job execution instruction. In particular, regarding the operation of causing the image forming unit 22 to form an image on a sheet based on the printing job execution instruction, the control unit 10 operates as an acceptance section 11, a prediction section 12, a determination section 13, an adjusted printing section 15, and a display control section 16, as indicated in solid line blocks in FIG. 1. The control unit 10 uses, as a pattern storage section 14, a part of a storage area of the aforementioned non-volatile memory.

The acceptance section 11 is operable to accept various instructions for the printer 1, which are input through touch manipulation of the display section 231 or manipulation of the manipulation key section 232 by a user. The acceptance section 11 is also operable, when a printing job execution instruction for forming a set of partial images, respectively, on a plurality of sheets, is transmitted from the external device and received by the communication unit 24, to accept this printing job execution instruction.

Specifically, the printing job execution instruction contains image data representing a set of partial images intended to be formed, respectively, on a plurality of sheets, generation software information, output sheet number information, sheet size information, image forming region information, and margin information. The generation software information is information representing software generating the printing job execution instruction. The output sheet number information is information representing a total number of sheets on each which a corresponding one of the partial images is formed by execution of the printing job. The sheet size information is information representing a size of the sheets. The image forming region information is information representing an image forming region of each of the sheets on which a corresponding one of the partial images is to be formed. The margin information is information representing a margin region (non-image forming region) of each of the sheets. The printing job execution instruction accepted by the acceptance section 11 will hereinafter be termed "accepted job execution instruction".

The prediction section 12 is operable, based on the margin information contained in the accepted job execution instruction, to predict an arrangement pattern of a plurality of sheets to be obtained as a result of execution of the accepted job.

Figure 2A:
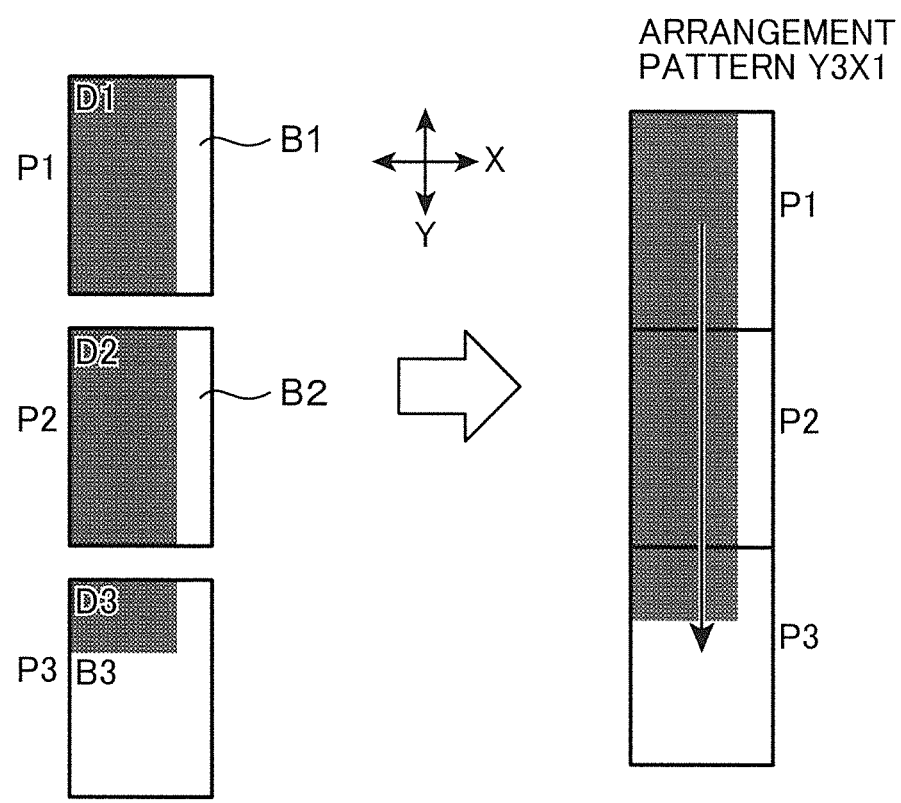
FIG. 2A is a diagram depicting a specific example where a prediction section operates to predict an arrangement pattern in which a plurality of sheets to be output are aligned in a vertical direction.

A specific example where the prediction section 12 operates to predict an arrangement pattern of a plurality of sheets to be obtained as a result of execution of the accepted job. FIG. 2A is a diagram depicting a specific example where the prediction section 12 operates to predict an arrangement pattern in which a plurality of sheets to be output are aligned in a vertical direction. As one example, suppose that the accepted job is a printing job for forming a set of partial images D1, D2, D3, respectively, on three sheets P1, P2, P3 to be output, as depicted in the left region of FIG. 2A. Further, suppose that the margin information indicative of a margin region B1 of the first sheet P1, a margin region B2 of the second sheet P2 and a margin region B3 of the third sheet P3 is contained in the accepted job execution instruction.

In this case, the prediction section 12 operates to figure out, based on this margin information, that the margin region B1 of the sheet P1 lies along a right end of the sheet P1. Thus, the prediction section 12 operates to predict that the next sheet P2 is probably disposed beneath the sheet P1, instead of being disposed on the right side of the sheet P1. In the following description, a rightward-leftward direction of a sheet to be output (X-direction in the figures) will be termed "horizontal direction", and an upward-downward direction of the sheet (Y-direction in the figures) will be termed "vertical direction".

Then, the prediction section 12 operates to figure out, based on the margin information, that the margin region B2 of the sheet P2 lies along a right end of the sheet P2, and a horizontal length of the margin region B2 is equal to a horizontal length of the margin region B1. Thus, the prediction section 12 operates to predict that the sheet P2 will be disposed beneath the sheet P1. The prediction section 12 also operates to predict that the next sheet P3 is probably disposed beneath the sheet P2.

Then, the prediction section 12 operates to figure out, that the margin region B3 of the sheet P3 lies in a flag shape extending from a right end of the sheet P3 to an entire lower region of the sheet P3, and a horizontal length of the margin region B3 at the right end thereof is equal to the horizontal length of the margin region B2. Thus, the prediction section 12 operates to predict that the sheet P3 will be disposed beneath the sheet P2.

That is, in this case, the prediction section 12 operates to predict that the arrangement pattern of the three sheets P1, P2, P3 is an arrangement pattern Y3X1 in which three sheets are aligned in the vertical direction, and one sheet is disposed in the horizontal direction, as depicted in the right region of FIG. 2A. In the following description, an arrangement pattern in which r sheets are aligned in the vertical direction (Y direction), and c sheets are aligned in the horizontal direction (X direction) is assigned with sign "YrXc". For example, an arrangement pattern Y3X1 means an arrangement pattern in which three sheets are aligned in the vertical direction, and one sheet is disposed in the horizontal direction.

Figure 2B:
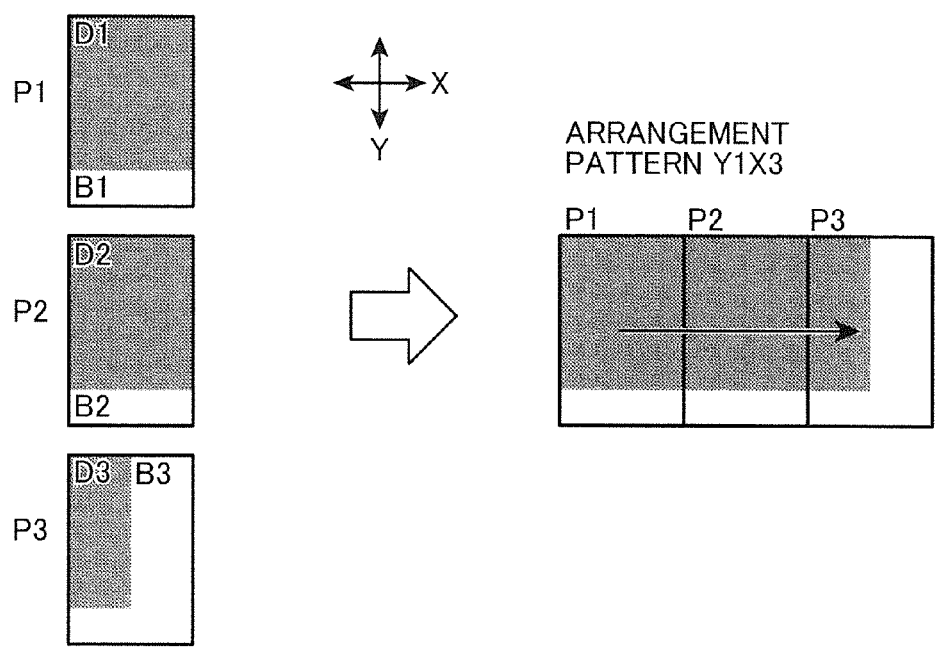
FIG. 2B is a diagram depicting another specific example where the prediction section operates to predict an arrangement pattern in which a plurality of sheets to be output are aligned in a horizontal direction.

Another specific example will be described. FIG. 2B is a diagram depicting another specific example where the prediction section 12 operates to predict an arrangement pattern in which a plurality of sheets to be output are aligned in the horizontal direction. As with the above example, suppose that the accepted job is a printing job for forming a set of partial images D1, D2, D3, respectively, on three sheets P1, P2, P3 to be output, as depicted in the left region of FIG. 2B. Further, suppose that the margin information indicative of a margin region B1 of the first sheet P1, a margin region B2 of the second sheet P2 and a margin region B3 of the third sheet P3 is contained in the accepted job execution instruction.

In this case, the prediction section 12 operates to figure out, based on this margin information, that the margin region B1 of the sheet P1 lies along a lower end of the sheet P1. Thus, the prediction section 12 operates to predict that the next sheet P2 is probably disposed on the right side of the sheet P1, instead of being disposed beneath the sheet P1.

Then, the prediction section 12 operates to figure out, based on the margin information, that the margin region B2 of the sheet P2 lies along a lower end of the sheet P2, and a vertical length of the margin region B2 is equal to a vertical length of the margin region B1. Thus, the prediction section 12 operates to predict that the sheet P2 will be disposed on the right side of the sheet P1. The prediction section 12 also operates to predict that the next sheet P3 is probably disposed on the right side of the sheet P2.

Then, the prediction section 12 operates to figure out that the margin region B3 of the sheet P3 lies in a flag shape extending from a lower end of the sheet P3 to an entire right region of the sheet P3, and a vertical length of the margin region B3 at the lower end thereof is equal to the vertical length of the margin region B2. Thus, the prediction section 12 operates to predict that the sheet P3 will be disposed on the right side of the sheet P2.

That is, in this case, the prediction section 12 operates to predict that the arrangement pattern of the three sheets P1, P2, P3 is an arrangement pattern Y1X3 in which one sheet is disposed in the vertical direction, and three sheets are aligned in the horizontal direction, as depicted in the right region of FIG. 2B.

In this way, the prediction section 12 operates to predict, based on the margin information contained in the accepted job execution instruction, that a plurality of sheets to be obtained as a result of execution of the accepted job are arranged in an arrangement pattern in which the sheets are aligned in one of the vertical and horizontal directions.

Figure 3:
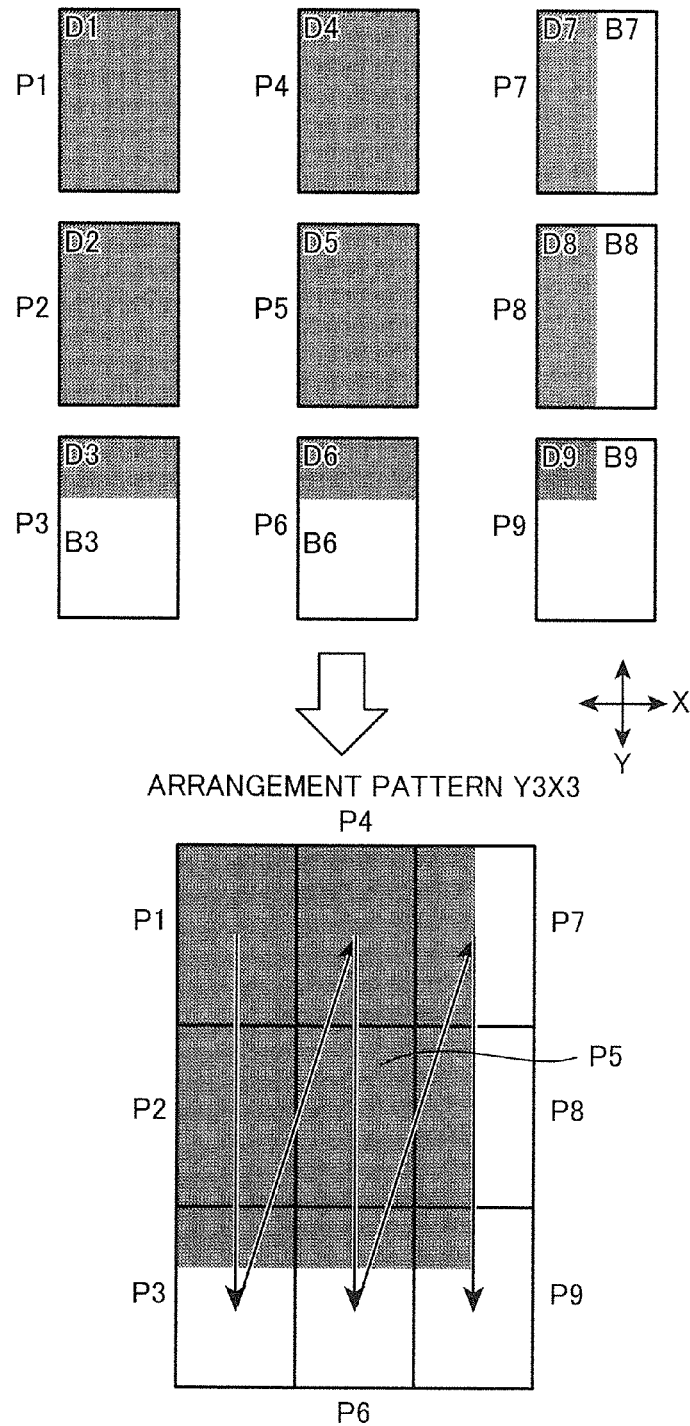
FIG. 3 is a diagram depicting yet another specific example where the prediction section operates to predict an arrangement pattern in which a plurality of sheets to be output are aligned in each of vertical and horizontal directions.

Yet another specific example will be described. FIG. 3 is a diagram depicting yet another specific example where the prediction section 12 operates to predict an arrangement pattern in which a plurality of sheets to be output are aligned in each of the vertical and horizontal directions. Suppose that the accepted job is a printing job for forming a set of partial images D1 to D9, respectively, on nine sheets P1 to P9 to be output, as depicted in the upper region of FIG. 3. Further, suppose that the margin information indicative of respective margin regions B3, B6 and B7 to B9 of the third, sixth and seventh to ninth sheets P3, P6 and P7 to P9 is contained in the accepted job execution instruction.

In this case, the prediction section 12 operates to figure out, based on this margin information, that there is no margin region in the preceding two sheets P4, P5 and the margin region B3 of the sheet P3 lies along a lower end of the sheet P3. Thus, the prediction section 12 operates to predict that the three sheets P1, P2, P3 are probably aligned in the vertically direction (Y-direction) in such a manner as to enable the sheet P3 having the margin region B3 along the lower end thereof to be disposed at a lowermost position among the three sheets P1, P2, P3.

Then, the prediction section 12 operates to figure out, based on this margin information, that, among the three sheets P4, P5, P6, there is no margin region in the preceding two sheets P4, P5, whereas there is the margin region B6 along a lower end of the last sheet P6, as with the three sheets P1, P2, P3. Thus, the prediction section 12 operates to predict that the three sheets P4, P5, P6 are probably aligned in the vertically direction (Y-direction), in the same manner as that for the three sheets P1, P2, P3.

Further, the prediction section 12 operates to figure out that there is no margin region on the left side of the two first and second sheets P4, P5, among the three vertically-aligned sheets P4, P5, P6, and a vertical length of the margin region B6 lying along the lower end of the third sheet P6 is equal to a vertical length of the margin region B3 lying along the lower end of the third sheet P3 among the among the three vertically-aligned sheets P1, P2, P3. Thus, the prediction section 12 operates to predict that the three vertically-aligned sheets P4, P5, P6 will be arranged on the right side of and in parallel to the three vertically-aligned sheets P1, P2, P3.

Then, in the same manner as that in the specific example depicted in FIG. 2A, the prediction section 12 operates to predict that the three sheets P7, P8, P9 will be arranged in the arrangement pattern Y3X1. That is, the prediction section 12 operates to predict that the three sheets P7, P8, P9 will be aligned in the vertical direction.

Further, the prediction section 12 operates to figure out that there is no margin region on the left side of the two first and second sheets P7, P8, among the three vertically-aligned sheets P7, P8, P9, and a vertical length of the margin region B9 lying along a lower end of the third sheet P9 is equal to the vertical length of the margin region B6 lying along the lower end of the third sheet P6 among the among the three vertically-aligned sheets P4, P5, P6. Thus, the prediction section 12 operates to predict that the three vertically-aligned sheets P7, P8, P9 will be arranged on the right side of and in parallel to the three vertically-aligned sheets P4, P5, P6.

That is, in this case, the prediction section 12 operates to predict that the arrangement pattern of the nine sheets P1 to P9 is an arrangement pattern Y3X3 in which three sheets are aligned in each of the vertical and horizontal directions, as depicted in the lower region of FIG. 3.

In this way, the prediction section 12 operates to predict, based on the margin information contained in the accepted job execution instruction, that a plurality of sheets to be obtained as a result of execution of the accepted job are arranged in an arrangement pattern in which two or more sheets are aligned in each of the vertical and horizontal directions.

Return reference to FIG. 1. The determination section 13 is operable, based on the margin information contained in accepted job execution instruction, to determine whether a sum of respective areas of the margin regions of the plurality of sheets is greater than a threshold associated with a predicted arrangement pattern which is an arrangement pattern predicted by the prediction section 12.

A specific example of a threshold associated with each type of arrangement pattern and used by the determination section 13 will be described below. FIGS. 4A to 4D are diagrams, respectively, presenting four different thresholds each associated with a respective one of four types of arrangement patterns. In the following description, a threshold associated with an arrangement pattern YrXc is assigned with sign "TYrXc" created by adding "T" to the left side of the sign "YrXc" assigned to the arrangement pattern.

Figure 4A:
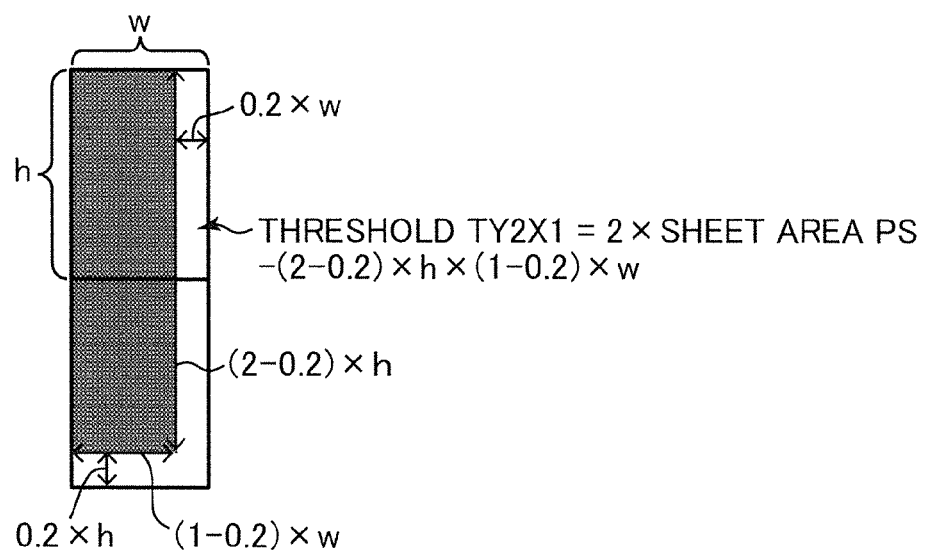
FIG. 4A is a diagram presenting a threshold associated with one type of arrangement pattern.

For example, an arrangement pattern Y2X1 in which two sheets are aligned in the vertical direction, and one sheet is disposed in the horizontal direction is associated with a threshold TY2X1. The threshold TY2X1 is set as follows. Suppose that, in two sheets arranged in the arrangement pattern Y2X1, a margin region having a horizontal length of 0.2 times a horizontal length w of each of the sheets (the horizontal (rightward-leftward) length will hereinafter be termed "width") lies along a right end of each of the sheets, and a margin region having a vertical length of 0.2 times a vertical length w of each of the sheets (the vertical (upward-downward) length will hereinafter be termed "height") lies along a lower end of each of the sheets, as depicted in FIG. 4A. In this case, a total area of the margin regions is set as the threshold TY2X1, and stored in the non-volatile memory of the control unit 10 or the like. Specifically, the threshold TY2X1 is calculated by a formula described below.

$$TY2X1=2\times PS-(2-0.2)\times h\times(1-0.2)\times w \text{ (where } PS \text{ denotes an area of one sheet)}$$

Figure 4B:
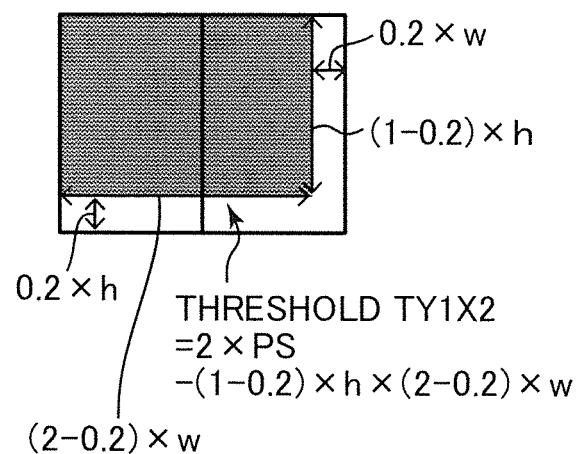
FIG. 4B is a diagram presenting a threshold associated with another type of arrangement pattern.

In the same manner as above, an arrangement pattern Y1X2 in which one sheet is disposed in the vertical direction, and two sheets are aligned in the horizontal direction is associated with a threshold TY1X2, as depicted in FIG. 4B. The threshold TY1X2 is calculated by a formula described below.

$$TY1X2=2\times PS-(1-0.2)\times h\times(2-0.2)\times w$$

Figure 4C:
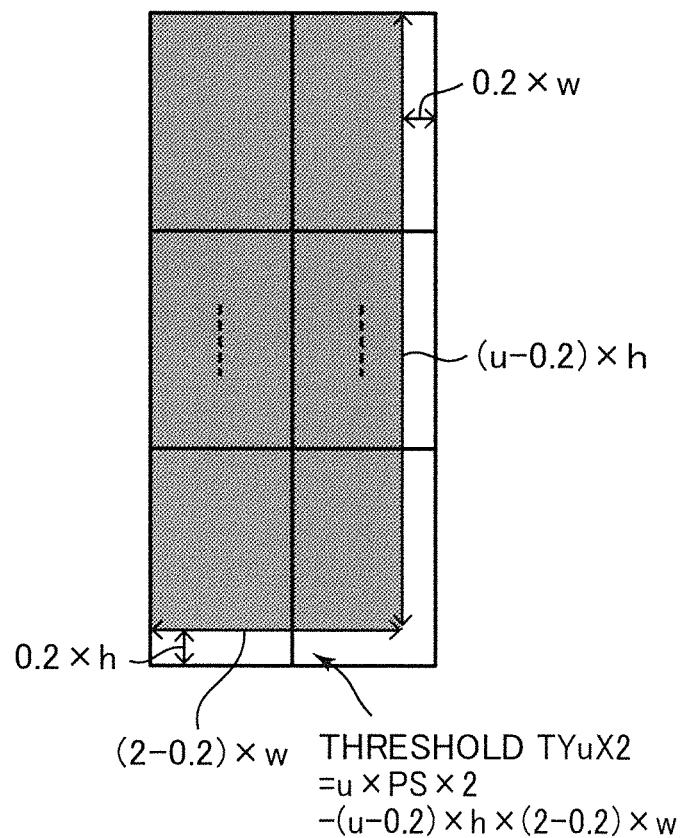
FIG. 4C is a diagram presenting a threshold associated with yet another type of arrangement pattern.

Further, an arrangement pattern YuX2 in which u sheets (where u≥2) are aligned in the vertical direction, and two sheets are aligned in the horizontal direction is associated with a threshold TYuX2, as depicted in FIG. 4C. The threshold TYuX2 is calculated by a formula described below.

$$TYuX2 = u \times PS - (u-0.2) \times h \times (2-0.2) \times w$$

Figure 4D:
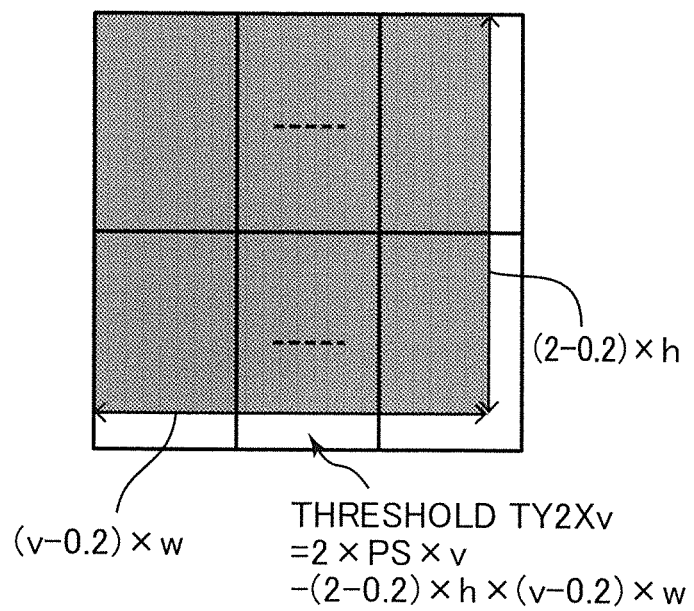
FIG. 4D is a diagram presenting a threshold associated with still another type of arrangement pattern.

In the same manner, an arrangement pattern Y2Xv in which two sheets are aligned in the vertical direction, and v sheets (where v≥2) are aligned in the horizontal direction is associated with a threshold TY2Xv, as depicted in FIG. 4D. The threshold TY2Xv is calculated by a formula described below.

$$TY2Xv = 2 \times PS \times v - (2-0.2) \times h(v-0.2) \times w$$

Figure 5A:
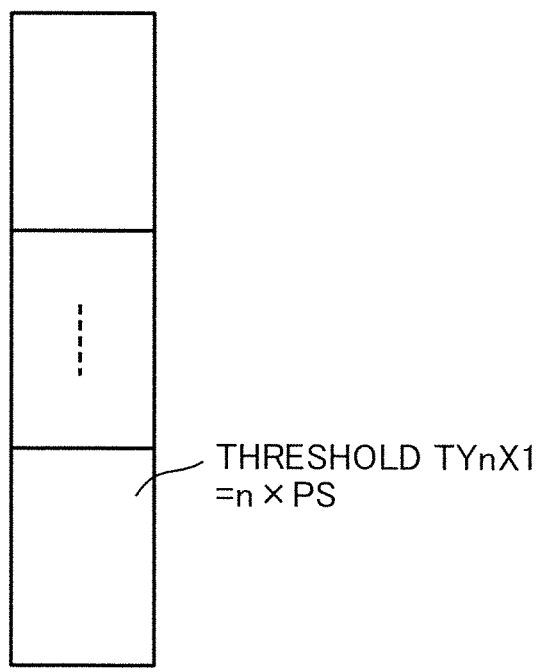
FIG. 5A is a diagram presenting a threshold associated with yet still another type of arrangement pattern.
Figure 5B:
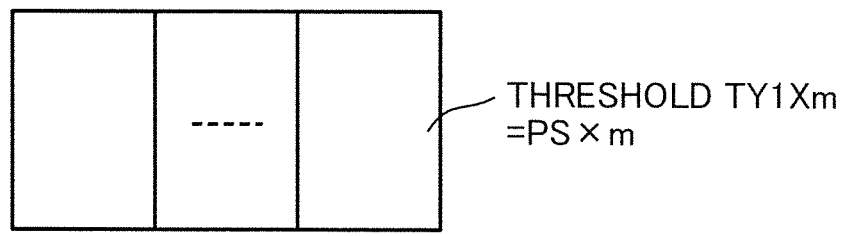
FIG. 5B is a diagram presenting a threshold associated with another further type of arrangement pattern.
Figure 5C:
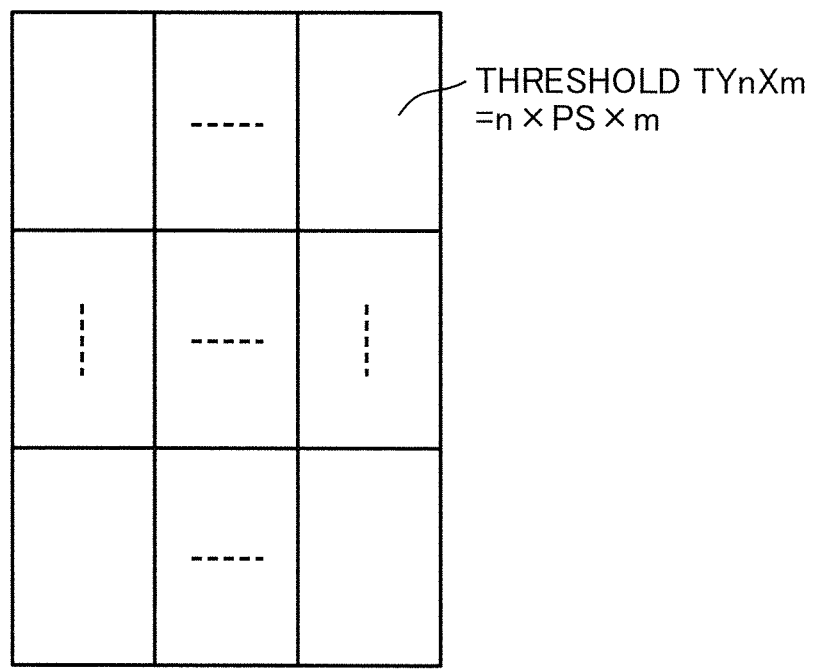
FIG. 5C is a diagram presenting a threshold associated with yet a further type of arrangement pattern.

FIGS. 5A to 5C are diagrams, respectively, presenting three different thresholds each associated with a respective one of three types of arrangement patterns different from the four arrangement patterns depicted in FIGS. 4A to 4D. An arrangement pattern YnX1 in which n sheets (where n≥3) are aligned in the vertical direction, and one sheet is disposed in the horizontal direction is associated with a threshold TYnX1. Differently from the thresholds presented in FIGS. 4A to 4D, the threshold TYnX1 is set in the following manner. Supposing that the entirety of the n sheets arranged in the arrangement pattern YnX1 is a margin region, an area of this margin region is set as the threshold TYnX1, and stored in the non-volatile memory of the control unit 10 or the like. Specifically, the threshold TYnX1 is calculated by a formula described below.

$$TYnX1 = n \times PS$$

That is, when the predicted arrangement pattern is the arrangement pattern YnX1, the threshold TYnX1 is set to allow the determination section 13 to surely determine that a sum of respective areas of margin regions of a plurality of sheets to be obtained as a result of execution of an accepted job is equal to or less than the threshold TYnX1.

In the same manner as above, an arrangement pattern Y1Xm in which one sheet is disposed in the vertical direction, and m sheets (where m≥3) are aligned in the horizontal direction is associated with a threshold TY1Xm, as depicted in FIG. 5B. The threshold TY1Xm is calculated by a formula described below.

$$TY1Xm = PS \times m$$

Further, an arrangement pattern YnXm in which n sheets (where n≥3) are aligned in the vertical direction, and m sheets (where m≥3) are aligned in the horizontal direction is associated with a threshold TYnXm, as depicted in FIG. 5C. The threshold TYnXm is calculated by a formula described below.

$$TYnXm = n \times PS \times m$$

That is, when the predicted arrangement pattern is the arrangement pattern Y1Xm and when the predicted arrangement pattern is the arrangement pattern YnXm, each of the thresholds TY1Xm, TYnXm is set to allow the determination section 13 to surely determine that a sum of respective areas of margin regions of a plurality of sheets to be obtained as a result of execution of an accepted job is equal to or less than the threshold.

Details of the operation of the determination section 13 will be described later.

Return reference to FIG. 1. In association with each of the above types of arrangement patterns, the pattern storage section 14 stores therein an altered arrangement pattern of one or more sheets whose number is less than that in the type of arrangement pattern.

FIG. 6 is a diagram depicting an altered arrangement pattern associated with each type of arrangement pattern. For example, in association with each of the arrangement patterns Y2X1, Y1X2 of two sheets, the pattern storage section 14 stores therein an altered arrangement pattern Y1X1 of one sheet, as depicted in FIG. 6.

Further, in association with an arrangement pattern Y2X2 in which two sheets are aligned in the vertical direction, and two sheets are aligned in the horizontal direction, the pattern storage section 14 stores therein three types of altered arrangement patterns Y1X1, Y1X2, Y2X1 of one or more sheets whose number is less than that in the arrangement pattern Y2X2. The altered arrangement pattern Y1X2 is an arrangement pattern in which the number of sheets aligned in the vertical direction is less than that in the arrangement pattern Y2X2 by one. The altered arrangement pattern Y2X1 is an arrangement pattern in which the number of sheets aligned in the horizontal direction is less than that in the arrangement pattern Y2X2 by one.

As above, in association with each of the arrangement patterns Y2X1, Y1X2, Y2X2 in which two or less sheets are aligned in the vertical direction, and two or less sheets are aligned in the horizontal direction, the pattern storage section 14 stores therein the altered arrangement pattern Y1X1 of only one sheet.

Further, in association with an arrangement pattern YsX1 in which s sheets (where s≥3) are aligned in the vertical direction, and one sheet is disposed in the horizontal direction, the pattern storage section 14 stores therein an altered arrangement pattern Ys−1X1 in which the number of sheets aligned in the vertical direction is less than that in the arrangement pattern YsX1 by one. Further, in association with an arrangement pattern Y1Xs in which one sheet is disposed in the vertical direction, and s sheets (where s≥3) are aligned in the horizontal direction, the pattern storage section 14 stores therein an altered arrangement pattern Y1Xs−1 in which the number of sheets aligned in the horizontal direction is less than that in the arrangement pattern Y1Xs by one.

Further, in association with an arrangement pattern YnXv in which n sheets (where n≥3) are aligned in the vertical direction, and v sheets (where v≥2) are aligned in the horizontal direction, the pattern storage section 14 stores therein two types of altered arrangement patterns Yn−1Xv, YnXv−1 of three or more sheets whose number is less than that in the arrangement pattern YnXv. The altered arrangement pattern Yn−1Xv is an arrangement pattern in which the number of sheets aligned in the vertical direction is less than that in the arrangement pattern YnXv by one. The altered arrangement pattern YnXv−1 is an arrangement pattern in which the number of sheets aligned in the horizontal direction is less than that in the arrangement pattern YnXv by one.

In the same manner, in association with an arrangement pattern YuXm in which n sheets (where u≥2) are aligned in the vertical direction, and m sheets (where m≥3) are aligned in the horizontal direction, the pattern storage section 14 stores therein two types of altered arrangement patterns Yu−1Xm, YuXm−1 of three or more sheets whose number is less than that in the arrangement pattern YuXm. The altered arrangement pattern Yu−1Xm is an arrangement pattern in which the number of sheets aligned in the vertical direction is less than that in the arrangement pattern YuXm by one. The altered arrangement pattern YuXm−1 is an arrangement pattern in which the number of sheets aligned in the horizontal direction is less than that in the arrangement pattern YuXm by one.

As above, in association with the four types of arrangement patterns Y2X2, YsX1, YnXv, YuXm in which two or less sheets are aligned in the vertical direction, the pattern storage section 14 stores therein the four types of altered arrangement patterns Y1X2, Ys−1X1, Yn−1Xv, Yu−1Xm in each of which the number of sheets aligned in the vertical direction is less than that in a corresponding one of the four types of arrangement patterns by one.

Further, in association with the four types of arrangement patterns Y2X2, Y1Xs, YnXv, YuXm in which two or less sheets are aligned in the horizontal direction, the pattern storage section 14 stores therein the four types of altered arrangement patterns Y2X1, Y1Xs−1, YnXv−1, YuXm−1 in each of which the number of sheets aligned in the horizontal direction is less than that in a corresponding one of the four types of arrangement patterns by one.

Return reference to FIG. 1. When the determination section 13 determines that a sum of respective areas of margin regions of a plurality of sheets to be obtained as a result of execution of an accepted job is greater than a threshold associated with a predicted arrangement pattern predicted by the prediction section 12, the adjusted printing section 15 is operable to execute an adjusted printing processing.

The adjusted printing processing is configured to downscale an overall image consisting of a set of partial images intended to be formed according to the accepted job and arranged in the predicted arrangement pattern, in such a manner as to fall within one or more sheets arranged in an altered arrangement pattern associated with the predicted arrangement pattern, and control the image forming unit 22 to form the downscaled overall image on the one or more sheets arranged in the altered arrangement pattern. Details of the adjusted printing processing will be described later.

On the other hand, when the determination section 13 determines that the sum is equal to or less than the threshold, the adjusted printing section 15 is operable to execute the accepted job without any alteration. Executing the accepted job without any alteration means controlling the image forming unit 22 to form the partial images, respectively, on the plurality of sheets, exactly according to the accepted job execution instruction.

Further, when information indicating that the accepted job execution instruction has been generated by a given spreadsheet software is not contained in the accepted job execution instruction, the adjusted printing section 15 is also operable to execute the accepted job without any alteration.

Specifically, spreadsheet software information indicative of a given spreadsheet software (e.g., Microsoft Excel (trademark)) is preliminarily stored in the non-volatile memory. When the generation software information is contained in the accepted job execution instruction, the adjusted printing section 15 is operable to determine whether or not software indicated by the generation software information is identical to the given spreadsheet software indicated by the spreadsheet software information stored in the non-volatile memory.

Then, when the adjusted printing section 15 determines that the software is not identical to the given spreadsheet software, or when the generation software information is not contained in the accepted job execution instruction, the adjusted printing section 15 is operable to determine that the information indicating that the accepted job execution instruction has been generated by the given spreadsheet software is not contained in the accepted job execution instruction.

In the case where the accepted job is a printing job for printing an image on one sheet, the adjusted printing section 15 is operable to execute the accepted job without any alteration. Details of the operation of the adjusted printing section 15 will be described later.

When the determination section 13 determines that the sum is greater than the threshold, the display control section 16 is operable, prior to execution of the adjusted printing processing by the adjusted printing section 15, to display a first manipulation screen on the display section 231. The first manipulation screen is configured to enable a user to input therethrough a preferential instruction for executing the accepted job without any alteration, or a selection instruction for selecting any one of one or more altered arrangement patterns associated with a predicted arrangement pattern. Details of the first manipulation screen and details of the operation of the display control section 16 will be described later.

Figure 7:
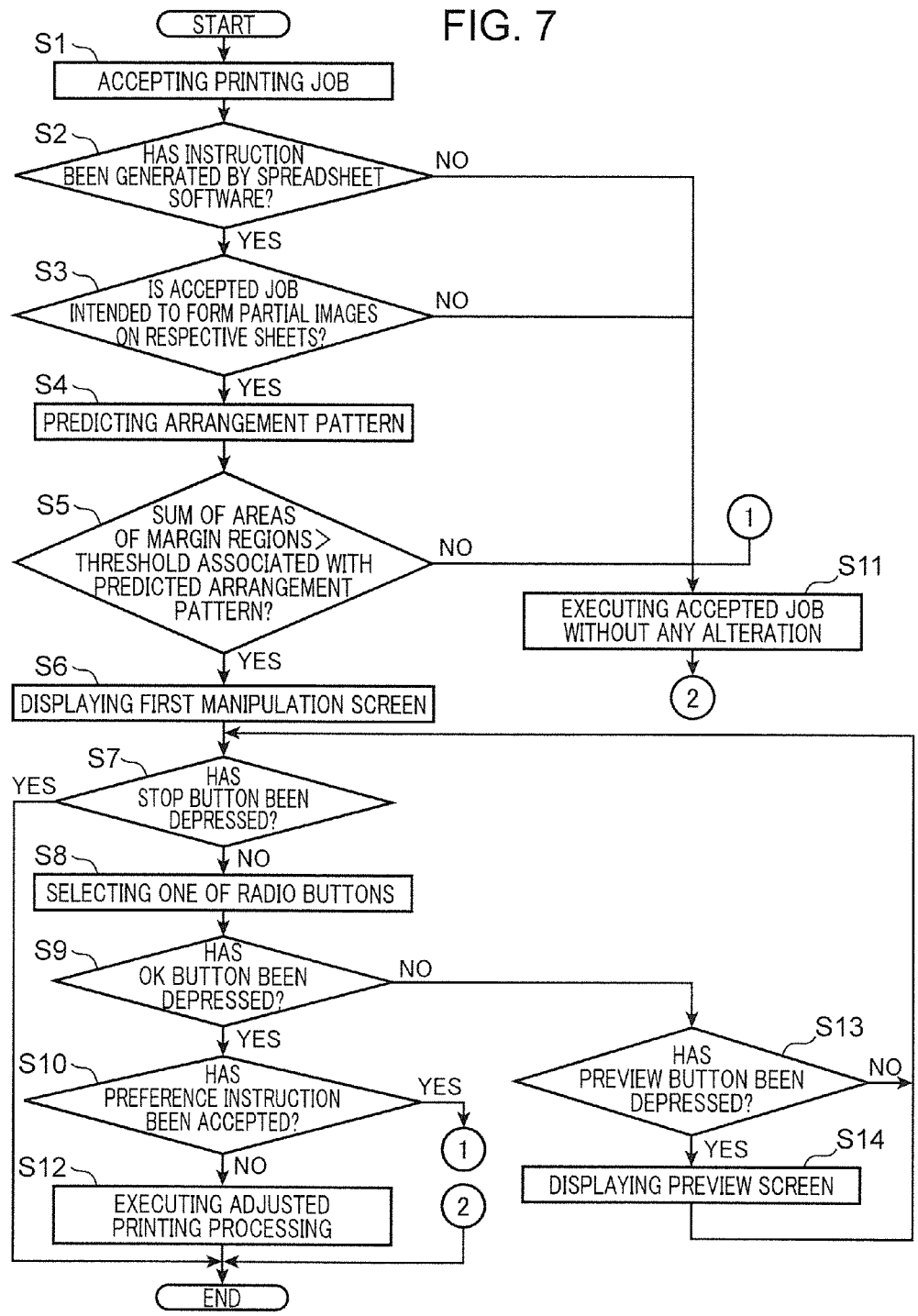
FIG. 7 is a flowchart depicting operation of a control unit to cause an image forming section to form an image on a sheet based on a printing job execution instruction.

The following description will be made about details of the operation of the control unit 10 to cause the image forming unit 22 to form an image on a sheet based on a printing job execution instruction. In this description, details of the respective operations of the determination section 13, the adjusted printing section 15 and the display control section 16, details of the adjusted printing processing, and details of the first manipulation screen, will be described. FIG. 7 is a flowchart depicting the operation of the control unit 10 to cause the image forming section 22 to form an image on a sheet based on a printing job execution instruction.

As depicted in FIG. 7, when a printing job execution instruction is accepted by the acceptance section 11 (S1), the adjusted printing section 15 operates to determine whether or not the information indicating that the printing job execution instruction accepted by the acceptance section 11 (the printing job will hereinafter be termed "accepted job") has been generated by the given spreadsheet software is contained in the accepted job execution instruction (S2).

When, in the step S2, the information indicating that the accepted job execution instruction has been generated by the given spreadsheet software is determined to be not contained in the accepted job execution instruction (S2: NO), the adjusted printing section 15 operates to execute the accepted job without any alteration (S11).

On the other hand, suppose that, in the step S2, the information indicating that the accepted job execution instruction has been generated by the given spreadsheet software is determined to be contained in the accepted job execution instruction (S2: YES). In this case, the adjusted printing section 15 operates to determine whether or not the accepted job is a printing job for forming a set of partial images, respectively, on a plurality of sheets, based on the output sheet number information contained in the accepted job execution instruction, or, for example, by counting the number of pieces of partial image data contained in the accepted job execution instruction (S3).

When, in the step S3, the accepted job is determined to be not the printing job for forming a set of partial images, respectively, on a plurality of sheets (S3: NO), the adjusted printing section 15 also operates to execute the accepted job without any alteration (S11).

On the other hand, suppose that, in the step S3, the accepted job is determined to be the printing job for forming a set of partial images, respectively, on a plurality of sheets (S3: YES). In this case, the prediction section 12 operates to predict, based on the margin information contained in the accepted job execution instruction, an arrangement pattern of a plurality of sheets to be obtained as a result of execution of the accepted job (S4).

Subsequently, the determination section 13 operates to determine, based on the margin information contained in the accepted job execution instruction, whether or not a sum of respective areas of margin regions of the plurality of sheets to be obtained as a result of execution of the accepted job is greater than a threshold associated with a predicted arrangement pattern which is the arrangement pattern predicted in the step S4 (S5).

When, in the step S5, the determination section 13 determines that the sum of the areas of the margin regions is greater than the threshold associated with the predicted arrangement pattern (S5: YES), the display control section 16 operates to display the first manipulation screen on the display section 231 (S6).

Figure 8:
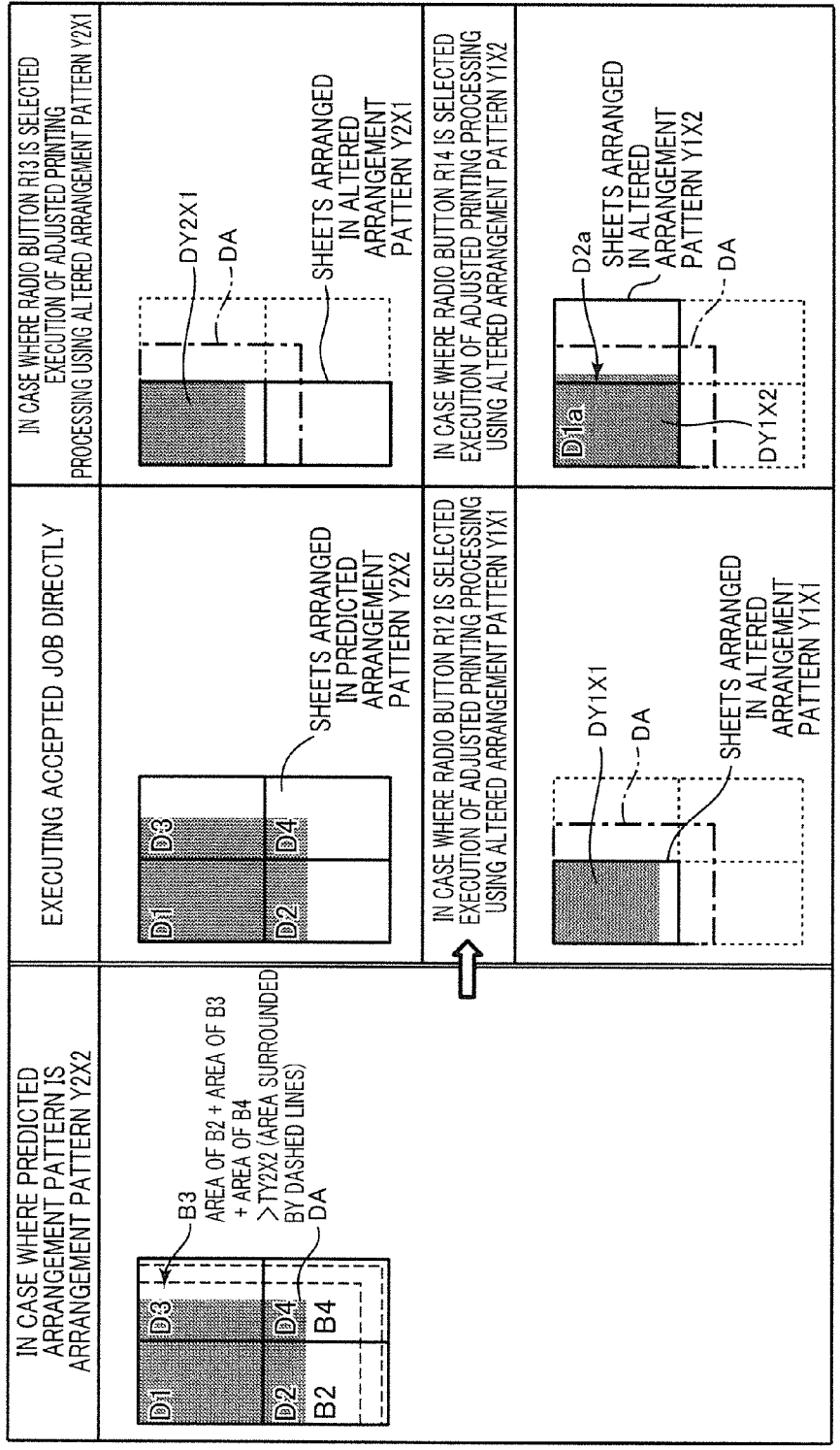
FIG. 8 is a diagram depicting a specific example of the operation in FIG. 7, in the case where a predicted arrangement pattern is an arrangement pattern in which two sheets are aligned in the vertical direction, and two sheets are aligned in the horizontal direction.

Details of the step S5 and the step S6 will be described below based on a specific example. FIG. 8 is a diagram depicting a specific example of the operation in FIG. 7, in the case where the predicted arrangement pattern is an arrangement pattern Y2X2 in which two sheets are aligned in the vertical direction, and two sheets are aligned in the horizontal direction. In this specific example, suppose that the accepted job is a printing job for forming a set of partial images D1 to D4, respectively, on four sheets, as depicted in the first column of FIG. 8. Further, suppose that the accepted job execution instruction contains therein margin information indicative of respective margin regions B2 to B4 of the second to fourth sheets, as indicated in the white region in the first column of FIG. 8. Then, suppose that, in the step S4, based on the margin information, the prediction section 12 predicts an arrangement pattern Y2X2 as the predicted arrangement pattern.

In this case, in the step S5, the determination section 13 operates to determine, based on the margin information, whether or not a sum of respective areas of the three margin regions B2 to B4 is greater than a threshold TY2X2 associated with the predicted arrangement pattern Y2X2.

As previously described with reference to FIG. 4C or FIG. 4D, supposing that a margin region (the region surrounded by the dashed lines in the first column of FIG. 8) lies along a right end and a lower end of a set of four sheets arranged in the predicted arrangement pattern Y2X2, the threshold TY2X2 is set to an area of the margin region. In this specific example, the sum of the areas of the margin regions B2 to B4 is equal to an area of the white region in the first column of FIG. 8, and is greater than the threshold TY2X2 which is equal to an area of the region surrounded by the dashed lines in the first column of FIG. 8. Thus, in this specific example, in the step S5, the determination section 13 operates to determine that the sum of the areas of the margin regions B2 to B4 is greater than the threshold TY2X2 associated with the predicted arrangement pattern Y2X2 (S5: YES).

Figure 9:
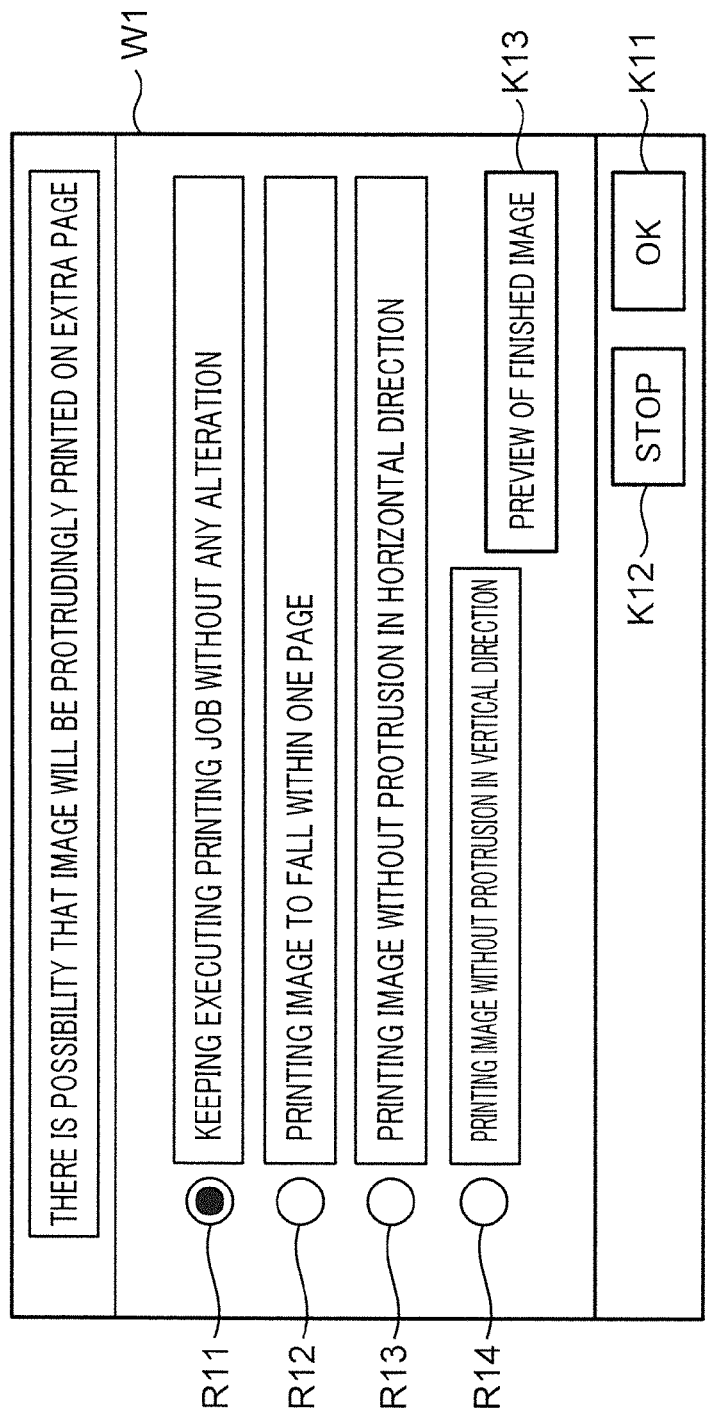
FIG. 9 is a diagram depicting one example of a first manipulation screen.

FIG. 9 is a drawing depicting one example of the first manipulation screen W1. In the above case (S5: YES), in the step S6, the display control section 16 operates to display the first manipulation screen W1 on the display section 231. The first manipulation screen W1 comprises four radio buttons R11 to R14, an OK button K11, a stop button K12, and a preview button K13.

The four radio buttons R11 to R14 are configured such that only any one of them can be selected. The radio button R11 is provided as a means to input a preference instruction for executing an accepted job without any alteration. The radio buttons R12 to R14 are provided as a means to input a selection instruction for selecting any one of the three altered arrangement patterns Y1X1, Y2X1, Y1X2 (FIG. 6) associated with the predicted arrangement pattern Y2X2 predicted in the step S4.

Specifically, the radio button R12 is provided as a means to input a selection instruction for selecting the altered arrangement pattern Y1X1 (FIG. 6) of only one sheet. The radio button R13 is provided as a means to input a selection instruction for selecting the altered arrangement pattern Y2X1 (FIG. 6) in which the number of sheets aligned in the horizontal direction is less than that in the predicted arrangement pattern Y2X2 by one. The radio button R14 is provided as a means to input a selection instruction for selecting the altered arrangement pattern Y1X2 (FIG. 6) in which the number of sheets aligned in the vertical direction is less than that in the predicted arrangement pattern Y2X2 by one.

The OK button K11 is provided as a means to finally set an input of the instruction designated by a user-selected one of the radio buttons R11 to R14. Specifically, suppose that any one of the four radio buttons R11 to R14 is selected by user's touch manipulation of the display section 231 or the like and then the OK button K11 is depressed. In this case, the input of the instruction designated by the selected one radio button is finally set, and this instruction is accepted by the acceptance section 11.

As one example, suppose that the radio button R11 is selected and then the OK button K11 is depressed. In this case, the instruction designated by the radio button R11, i.e., the preference instruction for executing an accepted job without any alteration, is accepted by the acceptance section 11. As another example, suppose that the radio button R12 is selected and then the OK button K11 is depressed. In this case, the instruction designated by the radio button R12, i.e., the selection instruction for selecting the altered arrangement pattern Y1X1, is accepted by the acceptance section 11.

The stop button K12 is provided as a means to input a job stop instruction for stopping execution of an accepted job. That is, upon depressing the stop button K12, the job stop instruction is accepted by the acceptance section 11. An operation to be performed when the acceptance section 11 accepts the job stop instruction will be described later.

The preview button K13 is provided as a means to input a preview execution instruction. That is, upon depressing the preview button K13, the preview execution instruction is accepted by the acceptance section 11. An operation to be performed when the acceptance section 11 accepts the preview execution instruction will be described later.

Return reference to FIG. 7. When, in the step S5, the prediction section 12 determines that the sum of the areas of the margin regions is equal to or less than the threshold associated with the predicted arrangement pattern (S5: NO), the adjusted printing section 15 operates to execute the accepted job without any alteration (S11). A specific example of this operation will be described below.

Figure 10A:
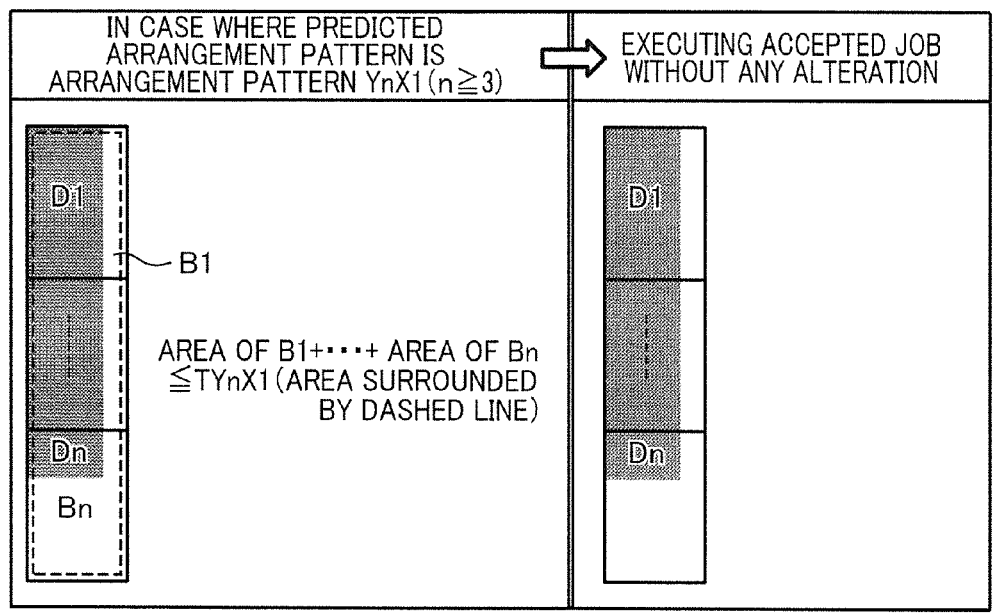
FIG. 10A is a diagram depicting a specific example of the operation in FIG. 7, in the case where the predicted arrangement pattern is an arrangement pattern in which three or more sheets are aligned in the vertical direction, and one sheets is disposed in the horizontal direction.
Figure 10B:
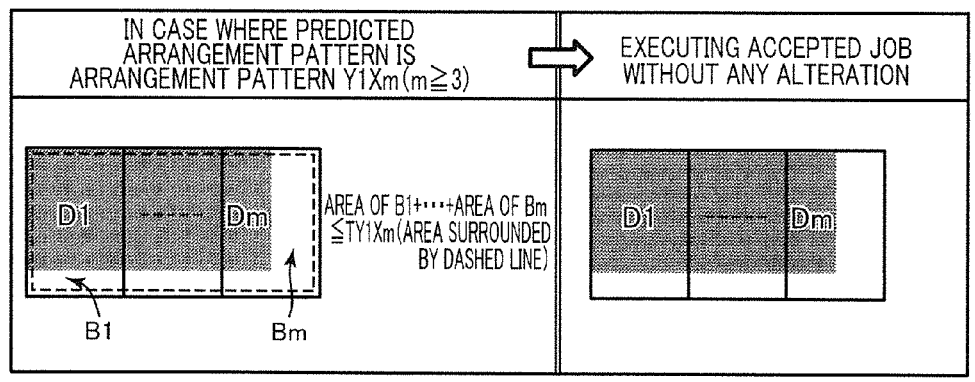
FIG. 10B is a diagram depicting a specific example of the operation in FIG. 7, in the case where the predicted arrangement pattern is an arrangement pattern in which one sheet is disposed in the vertical direction, and three sheets are aligned in the horizontal direction.
Figure 10C:
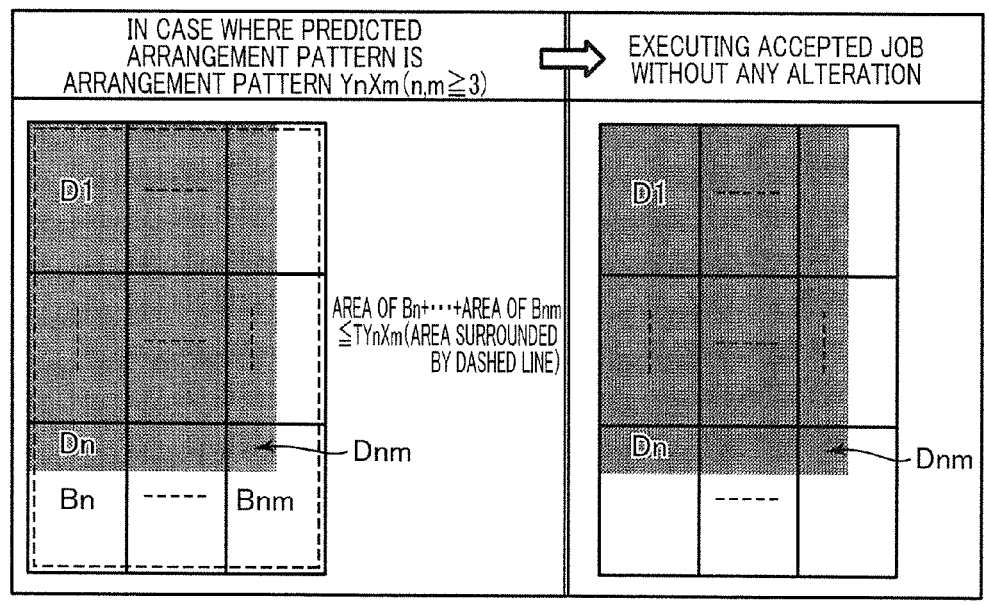
FIG. 10C is a diagram depicting a specific example of the operation in FIG. 7, in the case where the predicted arrangement pattern is an arrangement pattern in which three or more sheets are aligned in the vertical direction, and three or more sheets are aligned in the horizontal direction.

FIG. 10A is a diagram depicting a specific example of the operation in FIG. 7, in the case where the predicted arrangement pattern is an arrangement pattern YnX1 (n≥3) in which three or more sheets are aligned in the vertical direction, and one sheets is disposed in the horizontal direction. FIG. 10B is a diagram depicting a specific example of the operation in FIG. 7, in the case where the predicted arrangement pattern is an arrangement pattern Y1Xm (m≥3) in which one sheet is disposed in the vertical direction, and three sheets are aligned in the horizontal direction. FIG. 10C is a diagram depicting a specific example of the operation in FIG. 7, in the case where the predicted arrangement pattern is an arrangement pattern YnXm (n, m≥3) in which three or more sheets are aligned in the vertical direction, and three or more sheets are aligned in the horizontal direction.

As one example, suppose that the accepted job is a printing job for forming a set of partial images D1 to Dn, respectively, on n sheets (n≥3), as depicted in the left column of FIG. 10A. Further, suppose that margin information indicative of respective margin regions B1 to Bn of the first to nth sheets as indicated in the white region in the left column of FIG. 10A is contained in the accepted job execution instruction. Then, suppose that, in the step S4, based on the margin information, the prediction section 12 predicts an arrangement pattern YnX1 as the predicted arrangement pattern.

In this case, in the step S5, the determination section 13 operates to determine, based on the margin information, whether or not a sum of respective areas of the three margin regions B1 to Bn is greater than a threshold TYnX1 associated with the predicted arrangement pattern YnX1.

As previously described with reference to FIG. 5A, supposing that the entirety of the n sheets arranged in the arrangement pattern YnX1 (the region surrounded by the dashed line in the left column of FIG. 10A) is a margin region, the threshold TYnX1 is set to an area of this margin region. That is, when the predicted arrangement pattern is the arrangement pattern YnX1, the sum of the areas of the margin regions B1 to Bn surely becomes equal to or less than the threshold TYnX1 (an area of the region surrounded by the dashed line in the left column of FIG. 10A).

Thus, in the step S5, the determination section 13 operates to determine that the sum of the areas of the margin regions B1 to Bn is equal to or less than the threshold TYnX1 associated with the predicted arrangement pattern YnX1 (S5: NO). In this case (S5: NO), the adjusted printing section 15 operates to execute the accepted job without any alteration (S11). Specifically, in the step S11, the adjusted printing section 15 operates to control the image forming unit 22 to form the partial images D1 to Dn (black region), respectively, on the n sheets (indicated by the thick lines) exactly according to the accepted job execution instruction, as depicted in the right column of FIG. 10A.

As another example, suppose that, in the step S4, the prediction section 12 predicts an arrangement pattern Y1Xm (m≥3) as the predicted arrangement pattern. As yet another example, suppose that, in the step S4, the prediction section 12 predicts an arrangement pattern YnXm (n, m≥3) as the predicted arrangement pattern. In these cases, as with the specific example depicted in FIG. 10A, suppose that the entirety of a plurality of sheets arranged in each of the predicted arrangement patterns Y1Xm, YnXm (n, m≥3) (the region surrounded by the dashed line in each of the left columns of FIG. 10B and FIG. 10C) is a margin region, as previously described with reference to FIGS. 5B and 5C, each of the thresholds TY1Xm, TYnXm associated, respectively, with the predicted arrangement patterns Y1Xm, YnXm, is set to an area of the margin region, as depicted in the left columns of FIG. 10B and FIG. 10C.

That is, when the predicted arrangement pattern is one of the arrangement patterns Y1Xm, YnXm, a sum of respective areas of the margin regions (an area of the white region in each of the left column of FIGS. 10B and 10C) surely becomes equal to or less than a corresponding one of the thresholds TY1Xm, TYnXm (an area of the region surrounded by the dashed line in each of the left columns of FIGS. 10B and 10C). Thus, in the step S5, the determination section 13 operates to determine that the sum of the areas of the margin regions is equal to or less than the corresponding one of the thresholds TY1Xm, TYnXm (S5: NO). In this case, the adjusted printing section 15 operates to execute the accepted job without any alteration (S11).

Specifically, when the predicted arrangement pattern is the arrangement pattern Y1Xm, in the step S11, the adjusted printing section 15 operates to control the image forming unit 22 to form the partial images D1 to Dm (black region), respectively, on the m sheets (indicated by the thick lines) exactly according to the accepted job execution instruction, as depicted in the right column of FIG. 10B. On the other hand, when the predicted arrangement pattern is the arrangement pattern YnXm, in the step S11, the adjusted printing section 15 operates to control the image forming unit 22 to form the partial images D1 to Dnm (black region) (nm means a product of n and m (n×m)), respectively, on the nm sheets (indicated by the thick lines) exactly according to the accepted job execution instruction, as depicted in the right column of FIG. 10C.

Return reference to FIG. 7. Suppose that the stop button K12 in the first manipulation screen W1 displayed on the display section 231 is depressed, and the job stop instruction is accepted by the acceptance section 11 (S7: YES). In this case, the adjusted printing section 15 operates to stop the execution of the printing job accepted in the step S1, and terminate the processing.

Differently, suppose that, in the first manipulation screen W1, without depressing the stop button K12 (S7: NO), one of the four radio buttons R11 to R14 is selected (S8), and the OK button K11 is depressed (S9: YES). In this case, the acceptance section 11 operates to accept the instruction designated by the one radio button selected in the step S8.

As one example, when the radio button R11 is selected in the step S8, and the acceptance section 11 accepts the preference instruction for executing the accepted job without any alteration (S10: YES), the adjusted printing section 15 operates to execute the accepted job without any alteration (S11). As another example, suppose that any one of the radio buttons R12 to R14 is selected in the step S8, and the acceptance section 11 accepts the selection instruction designated by the selected radio button (S10: NO). In this case, the adjusted printing section 15 operates to execute the adjusted printing processing using the altered arrangement pattern indicated by the accepted selection instruction (S12).

Details of the step S11 and the step S12 will be described based on the specific example previously described with reference to FIG. 8. In the second and third columns of FIG. 8, the dashed lines indicate the sheets arranged in the predicted arrangement pattern Y2X2. Further, the one-dot chain line indicates an aftermentioned overall image DA.

When the accepted job is executed without any alteration (S11), as depicted in an upper half of the second column of FIG. 8, the adjusted printing section 15 operates to control the image forming unit 22 to form the partial images D1 to D3 (black region), respectively, on the four sheets (indicated by the thick lines), exactly according to the accepted job execution instruction.

When the acceptance section 11 accepts the selection instruction designated by the radio button R12 (S10: NO), the adjusted printing section 15 operates to execute the adjusted printing processing using the altered arrangement pattern Y1X1 indicated by the accepted selection instruction (S12). In this case, first of all, the adjusted printing section 15 operates to generate an overall image DA consisting of the partial images D1 to D4 intended to be formed according to the accepted job and arranged in the predicted arrangement pattern Y2X2, as depicted in the first column of FIG. 8.

Subsequently, as depicted in a lower half of the second column of FIG. 8, the adjusted printing section 15 operates to generate a downscaled image DY1X1 (black region) by downscaling the overall image DA (the region surrounded by the one-dot chain line) at the same scale ratio in both of the vertical and horizontal directions, in such a manner as to fall within one sheet (indicated by the thick line) arranged in the altered arrangement pattern Y1X1. Then, the adjusted printing section 15 operates to control the image forming unit 22 to form the generated downscaled image DY1X1 on the one sheet (indicated by the thick line) arranged in the altered arrangement pattern Y1X1.

When the acceptance section 11 accepts the selection instruction designated by the radio button R13 (S10: NO), the adjusted printing section 15 operates to execute the adjusted printing processing using the altered arrangement pattern Y2X1 indicated by the accepted selection instruction (S12). In this case, as with the above case, first of all, the adjusted printing section 15 operates to generate the overall image DA.

Subsequently, as depicted in an upper half of the third column of FIG. 8, the adjusted printing section 15 operates to generate a downscaled image DY2X1 (black region) by downscaling the overall image DA (the region surrounded by the one-dot chain line) at the same scale ratio in both of the vertical and horizontal directions, in such a manner as to fall within two sheets (indicated by the thick lines) arranged in the altered arrangement pattern Y2X1. In this specific example, the downscaled image DY2X1 has a size falling within one sheet. Thus, the adjusted printing section 15 operates to control the image forming unit 22 to form the generated downscaled image DY2X1 on one of the two sheets (indicated by the thick lines) arranged in the altered arrangement pattern Y2X1.

When the acceptance section 11 accepts the selection instruction designated by the radio button R14 (S10: NO), the adjusted printing section 15 operates to execute the adjusted printing processing using the altered arrangement pattern Y1X2 indicated by the accepted selection instruction (S12). In this case, as with the above cases, first of all, the adjusted printing section 15 operates to generate the overall image DA.

Subsequently, as depicted in a lower half of the third column of FIG. 8, the adjusted printing section 15 operates to generate a downscaled image DY1X2 (black region) by downscaling the overall image DA (the region surrounded by the one-dot chain line) at the same scale ratio in both of the vertical and horizontal directions, in such a manner as to fall within two sheets (indicated by the thick lines) arranged in the altered arrangement pattern Y1X2. Then, the adjusted printing section 15 operates to control the image forming unit 22 to form the generated downscaled image DY1X2 (black region) on the two sheets (indicated by the thick lines) arranged in the altered arrangement pattern Y1X2.

Specifically, in this case, based on the sheet size information contained in the accepted job execution instruction, the adjusted printing section 15 operates to divide the downscaled image DY1X2 into a partial image D1a having a size equal to that of one sheet and another partial image D2a. Then, the adjusted printing section 15 operates to control the image forming unit 22 to form the divided partial images D1a, D2a, respectively, on the two sheets.

Return reference to FIG. 7. Suppose that, in the first manipulation screen W1, any one of the four radio buttons R11 to R14 is selected (S8), and then the preview button K13 is depressed (S13: YES) without depressing the OK button K11 (S9: NO). Then, when the acceptance section 11 accepts the instruction designated by the one radio button selected in the step S8 and the preview execution instruction, the adjusted printing section 15 operates to display a preview screen on the display section 231 (S14).

Figure 11A:
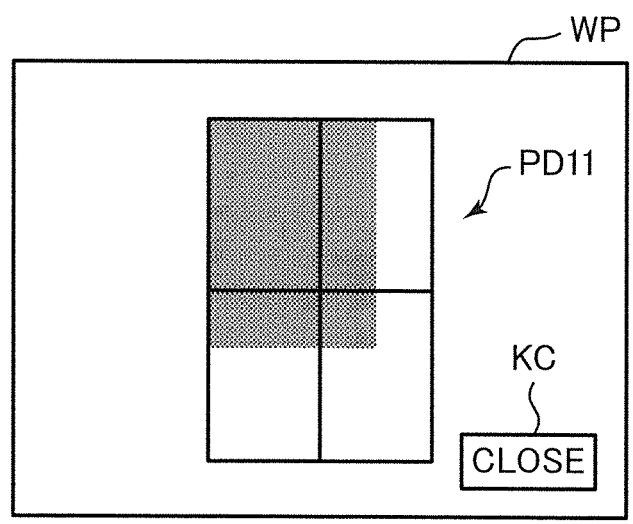
FIG. 11A is a diagram depicting a preview screen to be displayed when an execution instruction for executing an accepted job without any alteration and a preview execution instruction are accepted.
Figure 11B:
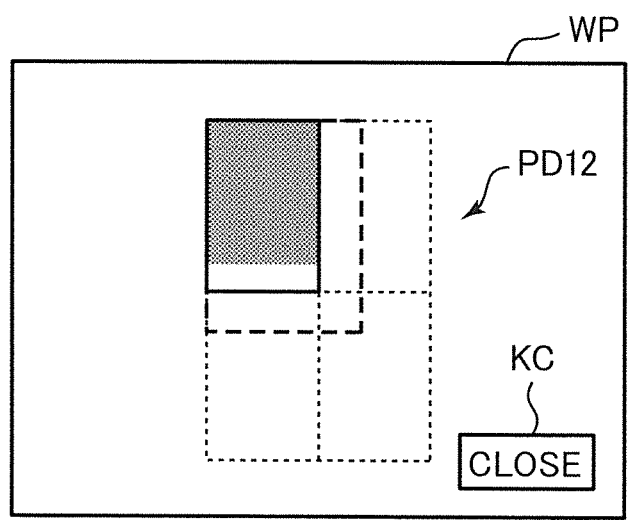
FIG. 11B is a diagram depicting a preview screen to be displayed when a selection instruction for selecting one type of altered arrangement pattern and the preview execution instruction are accepted.
Figure 11C:
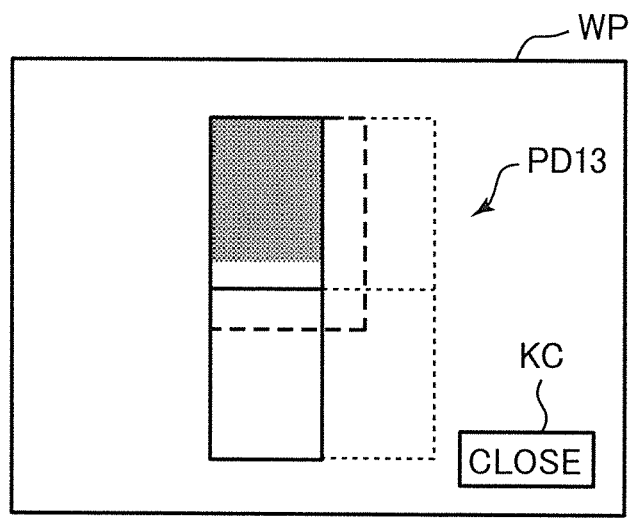
FIG. 11C is a diagram depicting a preview screen to be displayed when a selection instruction for selecting another type of altered arrangement pattern and the preview execution instruction are accepted.
Figure 11D:
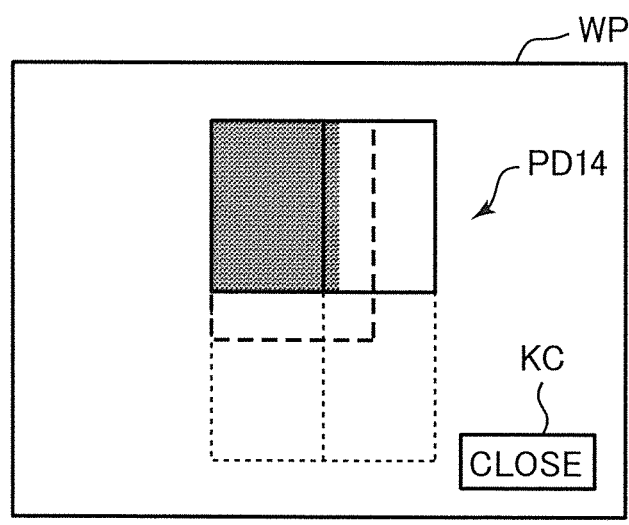
FIG. 11D is a diagram depicting a preview screen to be displayed when a selection instruction for selecting yet another type of altered arrangement pattern and the preview execution instruction are accepted.

Details of the step S14 will be described below, based on the specific example previously described with reference to FIG. 8, and FIGS. 11A to 11D. FIG. 11A is a diagram depicting a preview screen to be displayed when the execution instruction for executing the accepted job without any alteration and the preview execution instruction are accepted. FIG. 11B is a diagram depicting a preview screen to be displayed when the selection instruction for selecting the altered arrangement pattern Y1X1 and the preview execution instruction are accepted. FIG. 11C is a diagram depicting a preview screen to be displayed when the selection instruction for selecting the altered arrangement pattern Y2X1 and the preview execution instruction are accepted. FIG. 11D is a diagram depicting a preview screen to be displayed when the selection instruction for selecting the altered arrangement pattern Y1X2 and the preview execution instruction are accepted.

Suppose that, in response to selection of the radio button R11 in the step S8 and subsequent depression of the preview button K13 in the step S13, the acceptance section 11 accepts the preference instruction for executing the accepted job without any alteration and the preview execution instruction. In this case, in the step S14, the adjusted printing section 15 operates to display a preview screen WP comprising a preview image PD11 and a close button KC, on the display section 231, as depicted in FIG. 11A. The preview image PD11 is an image (image similar to the figure in the upper half of the second column of FIG. 8) representing a result obtained by arranging, in the predicted arrangement pattern Y2X2, four sheets to be obtained when the accepted job is executed without any alteration.

Suppose that, in response to selection of the radio button R12 in the step S8 and subsequent depression of the preview button K13 in the step S13, the acceptance section 11 accepts the selection instruction for selecting the altered arrangement pattern Y1X1 and the preview execution instruction. In this case, in the step S14, the adjusted printing section 15 operates to display a preview screen WP comprising a preview image PD12 and a close button KC, on the display section 231, as depicted in FIG. 11B.

The preview image PD12 is an image (image similar to the figure in the lower half of the second column of FIG. 8) representing a result obtained by arranging, in the altered arrangement pattern Y1X1, one sheet to be obtained when the adjusted printing processing in the step S12 is executed using the altered arrangement pattern Y1X1. The image representing this result includes a pre-alteration image indicated by the dashed lines, which represents a result obtained by arranging, in the predicted arrangement pattern Y2X2, four sheets to be obtained when the accepted job is executed without any alteration. Thus, a user can easily visually recognize a difference from the result when the accepted job is executed without any alteration. It is to be understood that the image representing the above result needs not necessarily include the pre-alteration image.

Similarly, suppose that, in response to selection of the radio button R13 in the step S8 and subsequent depression of the preview button K13 in the step S13, the acceptance section 11 accepts the selection instruction for selecting the altered arrangement pattern Y2X1 and the preview execution instruction. In this case, in the step S14, the adjusted printing section 15 operates to display a preview screen WP comprising a preview image PD13 and a close button KC, on the display section 231, as depicted in FIG. 11C. The preview image PD13 is an image (image similar to the figure in the upper half of the third column of FIG. 8) representing a result obtained by arranging, in the altered arrangement pattern Y2X1, two sheet to be obtained when the adjusted printing processing in the step S12 is executed using the altered arrangement pattern Y2X1. The image representing this result also includes the pre-alteration image. However, it is to be understood that the image representing this result needs not necessarily include the pre-alteration image.

Further, suppose that, in response to selection of the radio button R14 in the step S8 and subsequent depression of the preview button K13 in the step S13, the acceptance section 11 accepts the selection instruction for selecting the altered arrangement pattern Y1X2 and the preview execution instruction. In this case, in the step S14, the adjusted printing section 15 operates to display a preview screen WP comprising a preview image PD14 and a close button KC, on the display section 231, as depicted in FIG. 11D. The preview image PD14 is an image (image similar to the figure in the lower half of the third column of FIG. 8) representing a result obtained by arranging, in the altered arrangement pattern Y1X2, two sheets to be printed out when the adjusted printing processing in the step S12 is executed using the altered arrangement pattern Y1X2. The image representing this result also includes the pre-alteration image. However, it is to be understood that the image representing this result needs not necessarily include the pre-alteration image.

The close button KC is provided as a means to input a non-display instruction for setting the preview screen WP to a non-display state. That is, upon depressing the close button KC, the non-display instruction is accepted by the acceptance section 11. When the non-display instruction is accepted by the acceptance section 11, the adjusted printing section 15 operates to set the preview screen WP to the non-display state and return the processing to the step S7 (FIG. 7).

Figure 12A:
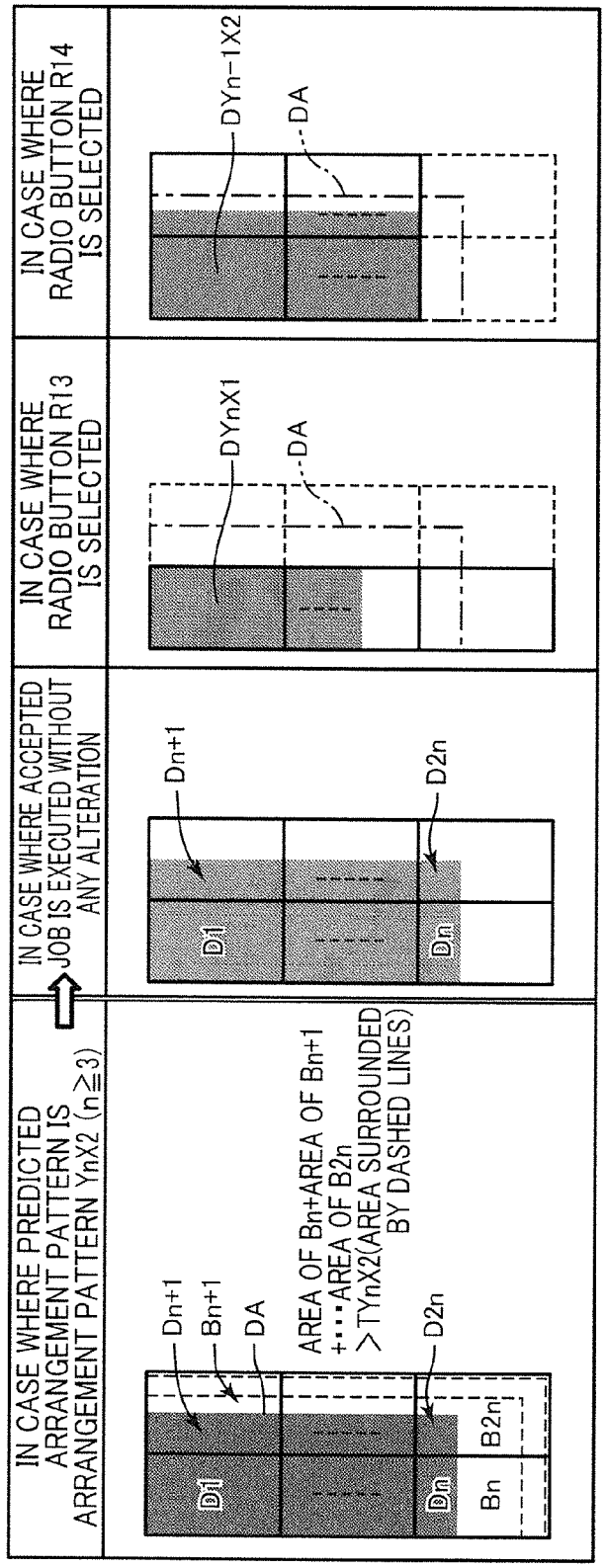
FIG. 12A is a diagram depicting a specific example of the operation depicted in FIG. 7, in the case where the predicted arrangement pattern is an arrangement pattern in which three sheets are aligned in the vertical direction, and two sheets are aligned in the horizontal direction.
Figure 12B:
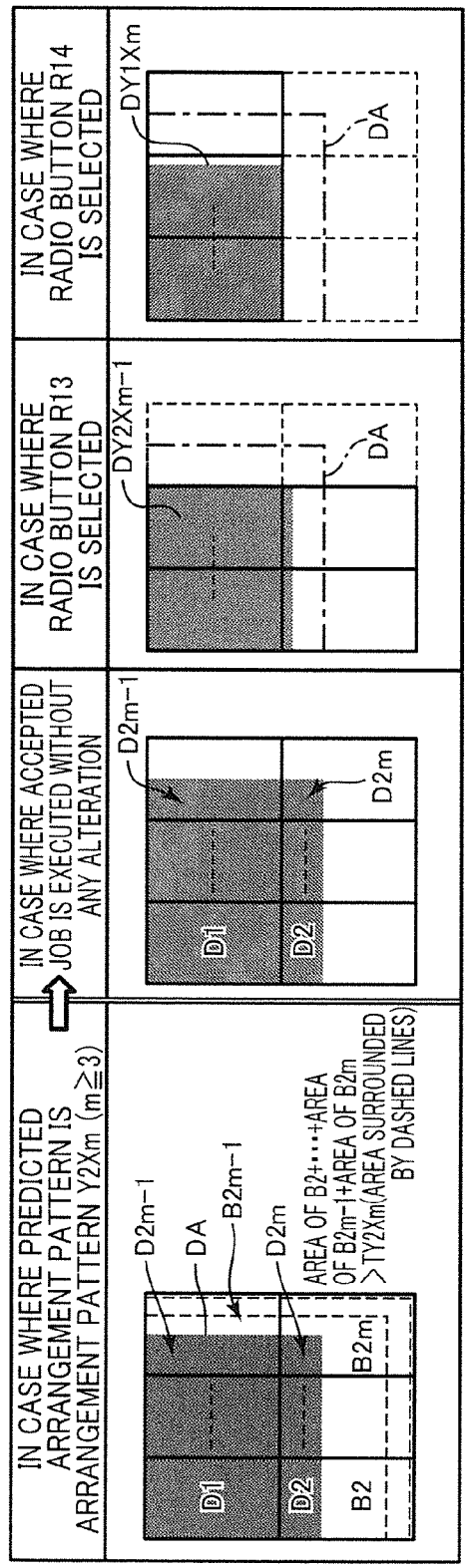
FIG. 12B is a diagram depicting a specific example of the operation depicted in FIG. 7, in the case where the predicted arrangement pattern is an arrangement pattern in which two sheets are aligned in the vertical direction, and three sheets are aligned in the horizontal direction.

With reference to FIG. 12A and FIG. 12B, the following description will be made about specific examples of the operation depicted in FIG. 7, in the case where the predicted arrangement pattern predicted in the step S4 is an arrangement pattern YnX2 (n≥3) and in the case where the predicted arrangement pattern predicted in the step S4 is an arrangement pattern Y2Xm (m≥3). FIG. 12A is a diagram depicting a specific example of the operation depicted in FIG. 7, in the case where the predicted arrangement pattern is an arrangement pattern YnX2 in which three sheets are aligned in the vertical direction, and two sheets are aligned in the horizontal direction, and FIG. 12B is a diagram depicting a specific example of the operation depicted in FIG. 7, in the case where the predicted arrangement pattern is an arrangement pattern Y2Xm in which two sheets are aligned in the vertical direction, and three sheets are aligned in the horizontal direction.

Suppose that the accepted job is a printing job for forming a set of partial images D1 to D2n (n≥3, 2n means a product of 2 and n (2× n)), respectively, on 2n sheets, as depicted in the first column of FIG. 12A. Further, suppose that the margin information indicative of margin regions Bn, Bn+1 to B2n as indicated in the white region in the first column of FIG. 12A is contained in the accepted job execution instruction. Then, suppose that, in the step S4, based on the margin information, the prediction section 12 predicts an arrangement pattern YnX2 as the predicted arrangement pattern.

In this case, in the step S5, the determination section 13 operates to determine, based on the margin information, whether or not a sum of respective areas of the margin regions Bn, Bn+1 to B2n is greater than a threshold TYnX2 associated with the predicted arrangement pattern YnX2.

As previously described with reference to FIG. 4C, supposing that a margin region (the region surrounded by the dashed lines in the first column of FIG. 12A) lies along a right end and a lower end of a set of sheets arranged in the predicted arrangement pattern YnX2, the threshold TYnX2 is set to an area of the margin region. In this specific example, the sum of the areas of the margin regions Bn, Bn+1 to B2n is equal to an area of the white region in the first column of FIG. 12A, and is greater than the threshold TYnX2 which is equal to an area of the region surrounded by the dashed lines in the first column of FIG. 12A. Thus, in this specific example, in the step S5, the determination section 13 operates to determine that the sum of the areas of the margin regions Bn, Bn+1 to B2n is greater than the threshold TYnX2 associated with the predicted arrangement pattern YnX2 (S5: YES).

In this case, as previously described with reference to FIG. 6, in association with the arrangement pattern YnX2, the pattern storage section 14 stores therein an altered arrangement pattern Yn−1X2 in which the number of sheets aligned in the vertical direction is less than that in the arrangement pattern YnX2, and an altered arrangement patterns YnX1 in which the number of sheets aligned in the horizontal direction is less than that in the arrangement pattern YnX2. However, in regard to the arrangement pattern YnX2, the altered arrangement pattern Y1X1 is not stored in the pattern storage section 14.

Thus, differently from the first manipulation screen W1 depicted in FIG. 9, the first manipulation screen W1 to be displayed in the step S6 under control of the display control section 16 is configured not to indicate the radio button R12 for inputting the selection instruction for selecting the altered arrangement pattern Y1X1. Further, the selection instruction designated by the radio button R13 is changed to a selection instruction for selecting the altered arrangement patterns YnX1 in which the number of sheets aligned in the horizontal direction is less than that in the arrangement pattern YnX2, and the selection instruction designated by the radio button R14 is changed to a selection instruction for selecting the altered arrangement patterns Yn−1X2 in which the number of sheets aligned in the vertical direction is less than that in the arrangement pattern YnX2.

Suppose that the radio button R11 is selected in the step S8, and the acceptance section 11 accepts the preference instruction for executing the accepted job without any alternation (S10: YES). In this case, as depicted in the second column of FIG. 12A, the adjusted printing section 15 operates to execute the accepted job without any alteration. That is, the adjusted printing section 15 operates to control the image forming unit 22 to form the images D1 to D2n (black region), respectively, on 2n sheets (indicated by the thick lines), exactly according to the accepted job execution instruction.

Suppose that the radio button R13 is selected in the step S8, and the acceptance section 11 accepts the selection instruction designated by the radio button R13 (S10: NO). In this case, as depicted in the third column of FIG. 12A, the adjusted printing section 15 operates to execute the adjusted printing processing using the altered arrangement pattern YnX1 indicated by the accepted selection instruction (S12). That is, in the step S12, the adjusted printing section 15 operates to generate a downscaled image DYnX1 (the black region in the third column) by downscaling the overall image DA (the black region in the first column, the region delimited by the one-dot chain line in the third column) in such a manner as to fall within n sheets (indicated by the thick lines) arranged in the altered arrangement pattern YnX1. Then, the adjusted printing section 15 operates to divide the downscaled image DYnX1 into a set of partial images based on a sheet size, and control the image forming unit 22 to form the partial images, respectively, on a corresponding number of the sheets.

Suppose that the radio button R14 is selected in the step S8, and the acceptance section 11 accepts the selection instruction designated by the radio button R14 (S10: NO). In this case, as depicted in the fourth column of FIG. 12A, the adjusted printing section 15 operates to execute the adjusted printing processing using the altered arrangement pattern Yn−1X2 indicated by the accepted selection instruction (S12). That is, in the step S12, the adjusted printing section 15 operates to generate a downscaled image DYn−1X2 (the black region in the fourth column) by downscaling the overall image DA (the black region in the first column, the region delimited by the one-dot chain line in the fourth column) in such a manner as to fall within 2n−2 sheets (indicated by the thick lines) arranged in the altered arrangement pattern Yn−1X2. Then, the adjusted printing section 15 operates to divide the downscaled image DYn−1X2 into a set of partial images based on a sheet size, and control the image forming unit 22 to form the partial images, respectively, on a corresponding number of the sheets.

As another example, suppose that the accepted job is a printing job for forming a set of partial images D1 to D2$m$ (n≥3, 2m means a product of 2 and m (2× m)), respectively, on 2m sheets, as depicted in the first column of FIG. 12B. Further, suppose that the margin information indicative of margin regions B2, - - - , B2$m$−1, B2$m$ as indicated in the white region in the first column of FIG. 12B is contained in the accepted job execution instruction. Then, suppose that, in the step S4, based on the margin information, the prediction section 12 predicts an arrangement pattern Y2Xm as the predicted arrangement pattern.

In this case, in the step S5, the determination section 13 operates to determine, based on the margin information, whether or not a sum of respective areas of the margin regions B2, - - - , B2$m$−1, B2$m$ is greater than a threshold TY2Xm associated with the predicted arrangement pattern Y2Xm.

As previously described with reference to FIG. 4D, supposing that a margin region (the region surrounded by the dashed lines in the first column of FIG. 12B) lies along a right end and a lower end of a set of sheets arranged in the predicted arrangement pattern Y2Xm, the threshold TY2Xm is set to an area of the margin region. In this specific example, the sum of the areas of the margin regions B2, - - - , B2$m$−1, B2$m$ is equal to an area of the white region in the first column of FIG. 12B, and is greater than the threshold TY2Xm which is equal to an area of the region surrounded by the dashed lines in the first column of FIG. 12B. Thus, in this specific example, in the step S5, the determination section 13 operates to determine that the sum of the areas of the margin regions B2, - - - , B2$m$−1, B2$m$ is greater than the threshold TY2Xm associated with the predicted arrangement pattern Y2Xm (S5: YES).

In this case, as previously described with reference to FIG. 6, in association with the arrangement pattern Y2Xm, the pattern storage section 14 stores therein an altered arrangement pattern Y1Xm in which the number of sheets aligned in the vertical direction is less than that in the arrangement pattern Y2Xm, and an altered arrangement patterns Y2Xm−1 in which the number of sheets aligned in the horizontal direction is less than that in the arrangement pattern Y2Xm. However, in regard to the arrangement pattern Y2Xm, the altered arrangement pattern Y1X1 is not stored in the pattern storage section 14.

Thus, differently from the first manipulation screen W1 depicted in FIG. 9, the first manipulation screen W1 to be displayed in the step S6 under control of the display control section 16 is configured not to indicate the radio button R12 for inputting the selection instruction for selecting the altered arrangement pattern Y1X1. Further, the selection instruction designated by the radio button R13 is changed to a selection instruction for selecting the altered arrangement patterns Y2Xm−1 in which the number of sheets aligned in the horizontal direction is less than that in the arrangement pattern Y2Xm, and the selection instruction designated by the radio button R14 is changed to a selection instruction for selecting the altered arrangement patterns Y1Xm in which the number of sheets aligned in the vertical direction is less than that in the arrangement pattern Y2Xm.

Suppose that the radio button R11 is selected in the step S8, and the acceptance section 11 accepts the preference instruction for executing the accepted job without any alternation (S10: YES). In this case, as depicted in the second column of FIG. 12B, the adjusted printing section 15 operates to execute the accepted job without any alteration. That is, the adjusted printing section 15 operates to control the image forming unit 22 to form the images D1 to D2$m$ (black region), respectively, on 2m sheets (indicated by the thick lines), exactly according to the accepted job execution instruction.

Suppose that the radio button R13 is selected in the step S8, and the acceptance section 11 accepts the selection instruction designated by the radio button R13 (S10: NO). In this case, as depicted in the third column of FIG. 12B, the adjusted printing section 15 operates to execute the adjusted printing processing using the altered arrangement pattern Y2Xm−1 indicated by the accepted selection instruction (S12). That is, in the step S12, the adjusted printing section 15 operates to generate a downscaled image DY2Xm−1 (the black region in the third column) by downscaling the overall image DA (the black region in the first column, the region delimited by the one-dot chain line in the third column) in such a manner as to fall within 2m−2 sheets (indicated by the thick lines) arranged in the altered arrangement pattern Y2Xm−1. Then, the adjusted printing section 15 operates to divide the downscaled image DY2Xm−1 into a set of partial images based on a sheet size, and control the image forming unit 22 to form the partial images, respectively, on a corresponding number of the sheets.

Suppose that the radio button R14 is selected in the step S8, and the acceptance section 11 accepts the selection instruction designated by the radio button R14 (S10: NO). In this case, as depicted in the fourth column of FIG. 12B, the adjusted printing section 15 operates to execute the adjusted printing processing using the altered arrangement pattern Y1Xm indicated by the accepted selection instruction (S12). That is, in the step S12, the adjusted printing section 15 operates to generate a downscaled image DY1Xm (the black region in the fourth column) by downscaling the overall image DA (the black region in the first column, the region delimited by the one-dot chain line in the fourth column) in such a manner as to fall within m sheets (indicated by the thick lines) arranged in the altered arrangement pattern Y1Xm. Then, the adjusted printing section 15 operates to divide the downscaled image DY1Xm into a set of partial images based on a sheet size, and control the image forming unit 22 to form the partial images, respectively, on a corresponding number of the sheets.

Figure 13A:
FIG. 13A is a diagram depicting a specific example of the operation depicted in FIG. 7, in the case where the predicted arrangement pattern is an arrangement pattern in which two sheets are aligned in the vertical direction, and one sheet is disposed in the horizontal direction.
Figure 13B:
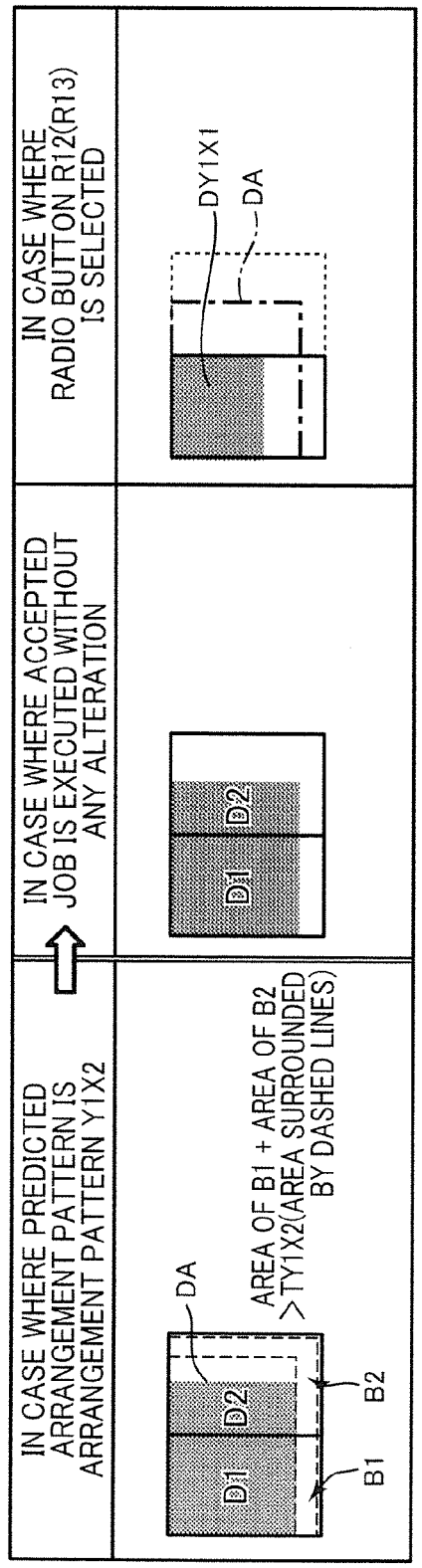
FIG. 13B is a diagram depicting a specific example of the operation depicted in FIG. 7, in the case where the predicted arrangement pattern is an arrangement pattern in which one sheet is disposed in the vertical direction, and two sheets are disposed in the horizontal direction.

With reference to FIG. 13A and FIG. 13B, the following description will be made about specific examples of the operation depicted in FIG. 7, in the case where the predicted arrangement pattern predicted in the step S4 is an arrangement pattern Y2X1 and in the case where the predicted arrangement pattern predicted in the step S4 is an arrangement pattern Y1X2. FIG. 13A is a diagram depicting a specific example of the operation depicted in FIG. 7, in the case where the predicted arrangement pattern is an arrangement pattern Y2X1 in which two sheets are aligned in the vertical direction, and one sheet is disposed in the horizontal direction. FIG. 13B is a diagram depicting a specific example of the operation depicted in FIG. 7, in the case where the predicted arrangement pattern is an arrangement pattern Y1X2 in which one sheet is disposed in the vertical direction, and two sheets are aligned in the horizontal direction.

Suppose that the accepted job is a printing job for forming a set of partial images D1, D2, respectively, on two sheets, as depicted in the first column of FIG. 13A. Further, suppose that the margin information indicative of margin regions B1, B2 as indicated in the white region in the first column of FIG. 13A is contained in the accepted job execution instruction. Then, suppose that, in the step S4, based on the margin information, the prediction section 12 predicts an arrangement pattern Y2X1 as the predicted arrangement pattern.

In this case, in the step S5, the determination section 13 operates to determine, based on the margin information, whether or not a sum of respective areas of the margin regions B1, B2 is greater than a threshold TY2X1 associated with the predicted arrangement pattern Y2X1.

As previously described with reference to FIG. 4A, supposing that a margin region (the region surrounded by the dashed lines in the first column of FIG. 13A) lies along a right end and a lower end of a set of two sheets arranged in the predicted arrangement pattern Y2X1, the threshold TY2X1 is set to an area of the margin region. In this specific example, the sum of the areas of the margin regions B1, B2 is equal to an area of the white region in the first column of FIG. 13A, and is greater than the threshold TY2X1 which is equal to an area of the region surrounded by the dashed lines in the first column of FIG. 13A. Thus, in this specific example, in the step S5, the determination section 13 operates to determine that the sum of the areas of the margin regions B1, B2 is greater than the threshold TY2X1 associated with the predicted arrangement pattern Y2X1 (S5: YES).

In this case, as previously described with reference to FIG. 6, in association with the arrangement pattern Y2X1, the pattern storage section 14 stores therein only the altered arrangement pattern Y1X1 of only one sheet.

Thus, differently from the first manipulation screen W1 depicted in FIG. 9, the first manipulation screen W1 to be displayed in the step S6 under control of the display control section 16 is configured to indicate the radio buttons R11, and the radio button R12 for inputting the selection instruction for selecting the altered arrangement pattern Y1X1, without indicating the radio buttons R13, R14.

Suppose that the radio button R11 is selected in the step S8, and the acceptance section 11 accepts the preference instruction for executing the accepted job without any alternation (S10: YES). In this case, as depicted in the second column of FIG. 13A, the adjusted printing section 15 operates to execute the accepted job without any alteration.

That is, the adjusted printing section 15 operates to control the image forming unit 22 to form the images D1, D2 (black region), respectively, on two sheets (indicated by the thick lines), exactly according to the accepted job execution instruction.

Suppose that the radio button R12 is selected in the step S8, and the acceptance section 11 accepts the selection instruction designated by the radio button R12 (S10: NO). In this case, as depicted in the third column of FIG. 13A, the adjusted printing section 15 operates to execute the adjusted printing processing using the altered arrangement pattern Y1X1 indicated by the accepted selection instruction (S12). That is, in the step S12, the adjusted printing section 15 operates to generate a downscaled image DY1X1 (the black region in the third column) by downscaling the overall image DA (the black region in the first column, the region delimited by the one-dot chain line in the third column) in such a manner as to fall within one sheet (indicated by the thick lines) arranged in the altered arrangement pattern Y1X1. Then, the adjusted printing section 15 operates to control the image forming unit 22 to form the downscaled image DY1X1 on the one sheet.

The altered arrangement pattern Y1X1 can be deemed as an arrangement pattern in which the number of sheets aligned in the vertical direction is less than that in the altered arrangement pattern Y2X1 by one. Thus, the first manipulation screen W1 to be displayed in the step S6 under control of the display control section 16 may be configured to indicate both of the radio buttons R12, R14. Alternatively, the first manipulation screen W1 to be displayed in the step S6 under control of the display control section 16 may be configured indicate the radio buttons R11, R14 without indicating the radio button R12. That is, even when the acceptance section 11 accepts either one of the selection instructions designated by the radio buttons R12, R14, the adjusted printing section 15 can execute, in the step S12, the adjusted printing processing using the altered arrangement pattern Y1X1 designated by the accepted selective instruction.

As another example, suppose that the accepted job is a printing job for forming a set of partial images D1, D2, respectively, on two sheets, as depicted in the first column of FIG. 13B. Further, suppose that the margin information indicative of margin regions B1, B2 as indicated in the white region in the first column of FIG. 13B is contained in the accepted job execution instruction. Then, suppose that, in the step S4, based on the margin information, the prediction section 12 predicts an arrangement pattern Y1X2 as the predicted arrangement pattern.

In this case, in the step S5, the determination section 13 operates to determine, based on the margin information, whether or not a sum of respective areas of the margin regions B1, B2 is greater than a threshold TY1X2 associated with the predicted arrangement pattern Y1X2.

As previously described with reference to FIG. 4B, supposing that a margin region (the region surrounded by the dashed lines in the first column of FIG. 13B) lies along a right end and a lower end of a set of two sheets arranged in the predicted arrangement pattern Y1X2, the threshold TY1X2 is set to an area of the margin region. In this specific example, the sum of the areas of the margin regions B1, B2 is equal to an area of the white region in the first column of FIG. 13B, and is greater than the threshold TY1X2 which is equal to an area of the region surrounded by the dashed lines in the first column of FIG. 13B. Thus, in this specific example, in the step S5, the determination section 13 operates to determine that the sum of the areas of the margin regions B1, B2 is greater than the threshold TY1X2 associated with the predicted arrangement pattern Y1X2 (S5: YES).

In this case, as previously described with reference to FIG. 6, in association with the arrangement pattern Y1X2, the pattern storage section 14 stores therein only the altered arrangement pattern Y1X1 of only one sheet.

Thus, differently from the first manipulation screen W1 depicted in FIG. 9, the first manipulation screen W1 to be displayed in the step S6 under control of the display control section 16 is configured to indicate the radio buttons R11, and the radio button R12 for inputting the selection instruction for selecting the altered arrangement pattern Y1X1, without indicating the radio buttons R13, R14.

Suppose that the radio button R11 is selected in the step S8, and the acceptance section 11 accepts the preference instruction for executing the accepted job without any alternation (S10: YES). In this case, as depicted in the second column of FIG. 13B, the adjusted printing section 15 operates to execute the accepted job without any alteration. That is, the adjusted printing section 15 operates to control the image forming unit 22 to form the images D1, D2 (black region), respectively, on two sheets (indicated by the thick lines), exactly according to the accepted job execution instruction.

Supposing that the radio button R12 is selected in the step S8, and the acceptance section 11 accepts the selection instruction designated by the radio button R12 (S10: NO), the adjusted printing section 15 operates to execute the adjusted printing processing using the altered arrangement pattern Y1X1 indicated by the accepted selection instruction (S12), as depicted in the third column of FIG. 13B. That is, in the step S12, the adjusted printing section 15 operates to generate a downscaled image DY1X1 (the black region in the third column) by downscaling the overall image DA (the black region in the first column, the region delimited by the one-dot chain line in the third column) in such a manner as to fall within one sheet (indicated by the thick line) arranged in the altered arrangement pattern Y1X1. Then, the adjusted printing section 15 operates to control the image forming unit 22 to form the downscaled image DY1X1 on the one sheet.

The altered arrangement pattern Y1X1 can be deemed as an arrangement pattern in which the number of sheets aligned in the horizontal direction is less than that in the altered arrangement pattern Y1X2 by one. Thus, the first manipulation screen W1 to be displayed in the step S6 under control of the display control section 16 may be configured to indicate both of the radio buttons R12, R13. Alternatively, the first manipulation screen W1 to be displayed in the step S6 under control of the display control section 16 may be configured indicate the radio buttons R11, R13 without indicating the radio button R12. That is, even when the acceptance section 11 accepts either one of the selection instructions designated by the radio buttons R12, R13, the adjusted printing section 15 can execute, in the step S12, the adjusted printing processing using the altered arrangement pattern Y1X1 designated by the accepted selective instruction.

The printer according to the first embodiment can obtain the following advantageous effects.

There is a possibility that a printing job execution instruction is not adequately generated for example, because a user fails to adequately input printing conditions. If a printing job is executed based on such a printing job execution instruction without any alteration, an image is likely to be formed on sheets whose number is greater than that intended by the user, in such a manner as to protrude beyond an intended sheet, possibly leading to a situation where a total area of a margin region becomes larger than that intended by the user.

In the printer according to the first embodiment, based on the margin information contained in the accepted job execution instruction, it is determined whether or not the sum of the areas of the margin regions of the plurality of sheets to be obtained as a result of execution of the accepted job is greater than the threshold associated with the predicted arrangement pattern (S5). Then, when the sum is determined to be greater than the threshold (S5: YES), the adjusted printing processing is executed (S12).

By executing the adjusted printing processing, a downscaled image can be obtained from the overall image DA intended to be originally formed, in such a manner as to fall within one or more sheets arranged in the altered arrangement pattern associated with the predicted arrangement pattern. This makes it possible to reduce the risk that, when the aforementioned improper printing job execution instruction is accepted, a plurality of sheets are output with an image formed thereon in a layout unintended by a user, i.e., in a layout causing an excessively increased margin region.

The altered arrangement pattern is set to an arrangement pattern in which the number of aligned sheets is less than that in the predicted arrangement pattern. Thus, by executing the adjusted printing processing, it is possible to obtain a less number of output sheets as compared to the case where the accepted job is executed without any alteration. Therefore, it becomes possible to reduce the risk of needless consumption of sheets.

When the preference instruction for executing the accepted job without any alteration is input through the first manipulation screen W1 (S10, YES), the adjusted printing section 15 operates to execute the accepted job without any alteration, and, when the selection instruction for selecting one of the altered arrangement patterns is input through the first manipulation screen W1 (S10, NO), the adjusted printing section 15 operates to execute the adjusted printing processing using the one altered arrangement pattern indicated by the input selection instruction (S12).

That is, by performing an input manipulation through the first manipulation screen W1, a user can intentionally switch between the operation of executing the accepted job without any alteration (S11) and the operation of executing the adjusted printing processing using an intended altered arrangement pattern (S12). This makes it possible to further reduce the risk that a plurality of sheets are output with an image formed thereon in a layout unintended by the user.

In the first embodiment, when the preview button K13 (FIG. 9) in the first manipulation screen W1 is depressed (S13: YES), the adjusted printing section 15 operates to display the preview screen WP (FIG. 11) corresponding to the instruction selected by a user, on the display section 231 (S14).

Thus, before executing the accepted job without any alteration (S11) or executing the adjusted printing processing using an intended altered arrangement pattern (S12), according to the instruction input through the first manipulation screen W1, the user can visually check an image representing a result of the execution. Therefore, it becomes possible to further reduce the risk that a plurality of sheets are output with an image formed thereon in a layout unintended by the user.

In the first embodiment, the pattern storage section 14 stores therein an altered arrangement pattern associated with a predicted arrangement pattern in which two or more sheets are aligned in the vertical direction, wherein the altered arrangement pattern is constructed such that the number of sheets aligned in the vertical direction is less than that in the predicted arrangement pattern by one (FIG. 6).

Thus, by executing the adjusted printing processing using the altered arrangement pattern in which the number of sheets aligned in the vertical direction is less than that in the predicted arrangement pattern by one, it becomes possible to reduce the risk that sheets are output with an image formed thereon to protrude beyond an intended sheet in the vertical direction.

The pattern storage section 14 stores therein an altered arrangement pattern associated with a predicted arrangement pattern in which two or more sheets are aligned in the horizontal direction, wherein the altered arrangement pattern is constructed such that the number of sheets aligned in the horizontal direction is less than that in the predicted arrangement pattern by one (FIG. 6).

Thus, by executing the adjusted printing processing using the altered arrangement pattern in which the number of sheets aligned in the horizontal direction is less than that in the predicted arrangement pattern by one, it becomes possible to reduce the risk that sheets are output with an image formed thereon to protrude beyond an intended sheet in the horizontal direction.

The pattern storage section 14 stores therein an altered arrangement pattern associated with a predicted arrangement pattern in which two or less sheets are aligned in the vertical direction, and two or less sheets are aligned in the horizontal direction, wherein the altered arrangement pattern is constructed such that only one sheet is disposed (FIG. 6)

In the case where a plurality of sheets are arranged such that two or less sheets are aligned in each of the vertical and horizontal directions and an image is formed on the sheets such that a sum of respective areas of margin regions is greater, even when the image is downscaled to fall within one sheet, and the downscaled image is formed on one sheet, visibility of the formed image is considered to be maintained.

Thus, in the case where the predicted arrangement pattern is an arrangement pattern in which two or less sheets are aligned in the vertical direction, and two or less sheets are aligned in the horizontal direction, it becomes possible to educe the risk of needless consumption of sheets while maintaining the visibility of the image, by executing the adjusted printing processing using the altered arrangement pattern of only one sheet.

As depicted in FIGS. 5A to 5C, each of the thresholds TY1Xm, TYnX1, TYnXm associated, respectively, with the arrangement pattern Y1Xm (m≥3), the arrangement pattern YnX1 (n≥3), and the arrangement pattern YnXm (n, m≥3) is set to a total area of all of the sheets arranged in each of the arrangement patterns. Thus, when the predicted arrangement pattern is one of the above arrangement pattern, it is possible to allow the determination section 13 to surely determine that the sum is equal to or less than the threshold.

Suppose that, based on the margin information contained in the accepted job execution instruction, the prediction section 12 predicts, as the predicted arrangement pattern, the arrangement pattern Y1Xm (m≥3) in which one sheet is disposed in the vertical direction, and three or more sheets are aligned in the horizontal direction, or the arrangement pattern YnX1 (n≥3) in which one sheet is disposed in the horizontal direction, and three or more sheets are aligned in the vertical direction. The accepted job execution instruction in this case is deemed to be a printing job execution instruction intentionally generated by a user with a view to forming an image, e.g., representing a text edited on Microsoft Word (trademark) or the like, on a plurality of sheets aligned (arranged in one line) in the vertical or horizontal direction.

That is, in the printer according to the first embodiment, when the predicted arrangement pattern is the arrangement pattern Y1Xm (m≥3) or the arrangement pattern YnX1 (n≥3), it is possible to allow the determination section 13 to surely determine that the sum is equal to or less than the threshold, to thereby cause the accepted job to be executed surely without any alteration. This makes it possible to increase the possibility that, when a user generates a printing job execution instruction with a view to forming an image representing a text on a plurality of sheets aligned in the vertical or horizontal direction, sheets are output with the image formed thereon in a layout intended by the user.

Further, suppose that, based on the margin information contained in the accepted job execution instruction, the prediction section 12 predicts an arrangement pattern YnXm (n, m≥3), as the predicted arrangement pattern. The accepted job execution instruction in this case is deemed to be a printing job execution instruction intentionally generated by a user with a view to forming a relatively large rectangular image, e.g., representing a table having a large number of columns and/or rows, on a plurality of sheets arranged such that three or more sheets are aligned in each of the vertical and horizontal directions.

That is, in the printer according to the first embodiment, when the predicted arrangement pattern is the arrangement pattern YnXm (n, m≥3), it is possible to allow the determination section 13 to surely determine that the sum is equal to or less than the threshold, to thereby cause the accepted job to be executed surely without any alteration. This makes it possible to increase the possibility that, when a user generates a printing job execution instruction with a view to forming a relatively large rectangular image on a plurality of sheets arranged such that three or more sheets are aligned in each of the vertical and horizontal directions, sheets are output with the image formed thereon in a layout intended by the user.

When information indicating that the accepted job execution instruction has been generated by a given spreadsheet software is not contained in the accepted job execution instruction (S2: NO), the adjusted printing section 15 operates to execute the accepted job without any alteration (S11).

When printing a rectangular image representing a table edited on a spreadsheet software such as Microsoft Excel (trademark), a user sometimes fails to adequately input printing conditions such as a size of a sheet to be output and a printing range, and thus a printing job execution instruction can be generated with the printing conditions set to a default state. If the printing job is executed based on such a printing job execution instruction, a plurality of sheets are likely to be output with an image formed thereon in a layout unintended by a user, e.g., an image is likely to be formed on sheets whose number is greater than that intended by the user, in such a manner as to protrude beyond an intended sheet. However, in case of printing an image edited on software other than a spreadsheet software, it is considered that there is almost no such risk.

That is, in the printer according to the first embodiment, it is possible to quickly execute the accepted job, in view of the fact that, when information indicating that the accepted job execution instruction has been generated by a given spreadsheet software is not contained in the accepted job execution instruction, an image is not likely to be output with an image formed thereon in a layout unintended by a user.

It should be noted that the first embodiment is no more than one example of an embodiment of the present invention. For example, the first embodiment may be modified as follows.

(1) The step S2 may be omitted.

(2) The first manipulation screen W1 may be configured to omit the preview button K13, and, in conjunction with this, the steps S13 and S14 may be omitted.

(3) The control unit 10 may be configured such that it does not operate as the display control section 16, i.e., it skips the steps S6 to S10, S13 and S14. In conjunction with this, the adjusted printing section 15 may be configured to execute the step S12 when the determination section 13 determines, in the step S5, that the sum is greater than the threshold associated with the predicted arrangement pattern predicted at the step S4.

Further, the adjusted printing section 15 may be configured to execute the adjusted printing processing in the step S12, using a given one of the one or more altered arrangement patterns associated with the predicted arrangement pattern predicted at the step S4. As the given one altered arrangement pattern, it is possible to appropriately select one of the one or more altered arrangement patterns associated with the predicted arrangement pattern and stored in the pattern storage section 14, such as an altered arrangement pattern of sheets whose number is smallest, or an altered arrangement pattern stored in a storage area of the pattern storage section 14 having an address closest to a top address.

Figure 14:
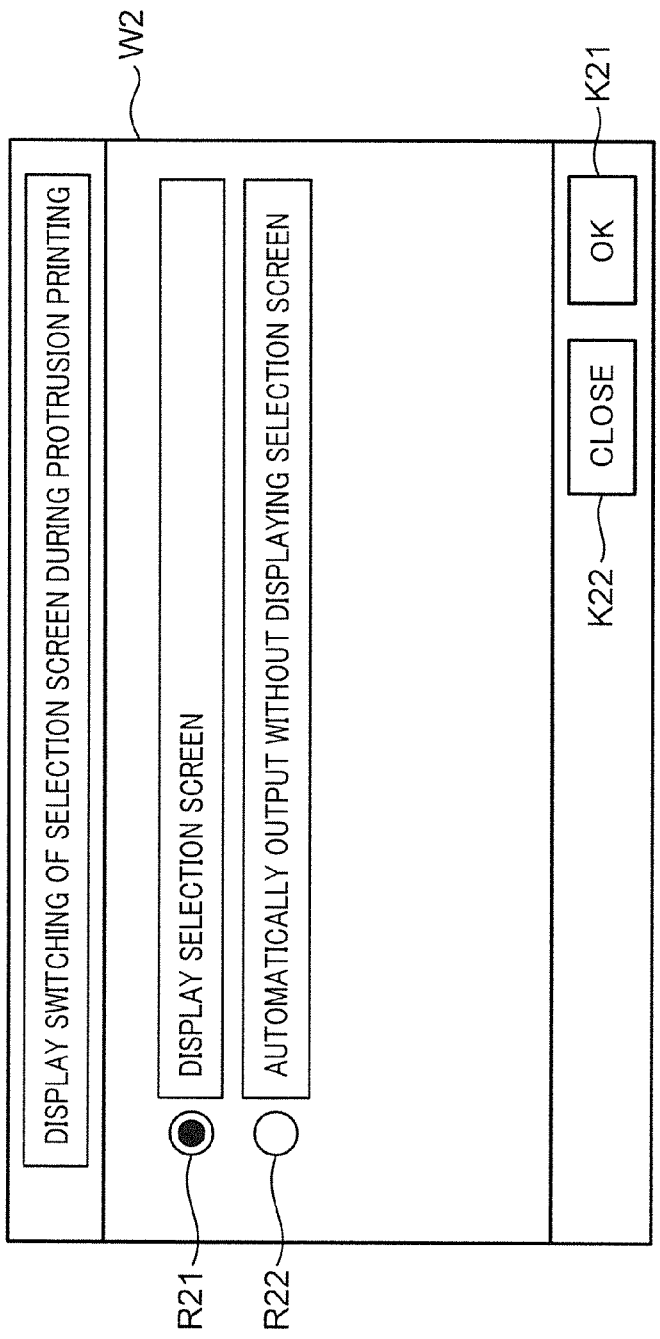
FIG. 14 is a diagram depicting one example of a second manipulation screen.

(4) The control unit 10 may be configured to further operate as an adjustment switching section 17, as indicated in the dashed line block in FIG. 1. FIG. 14 is a diagram depicting one example of a second manipulation screen W2. At a given timing when the acceptance section 11 has not yet accepted a printing job, such as when performing a default setting of the printer 1, the adjustment switching section 17 is operable to display a second manipulation screen W2 capable of allowing a user to input therethrough an automatic adjustment instruction or a manual adjustment instruction, on the display section 231, for example, as depicted in FIG. 14.

The second manipulation screen W2 comprises two radio buttons R21, R22, an OK button K21, and a close button K22.

The two radio buttons R21, R22 are configured such that only either one of them can be selected. The radio button R21 is provided as a means to input the manual adjustment instruction. The radio button R22 is provided as a means to input the automatic adjustment instruction.

The OK button K21 is provided as a means to finally set an input of the instruction designated by a user-selected one of the radio buttons R21 and R22. Specifically, suppose that either one of the radio buttons R21, R22 is selected and then the OK button K11 is depressed. In this case, the input of the instruction designated by the selected one radio button is finally set, and this instruction is accepted by the acceptance section 11.

As one example, suppose that the radio button R21 is selected and then the OK button K21 is depressed. In this case, the manual adjustment instruction designated by the radio button R21 is accepted by the acceptance section 11. As another example, suppose that the radio button R22 is selected and then the OK button K21 is depressed. In this case, the automatic adjustment instruction designated by the radio button R22 is accepted by the acceptance section 11.

When the radio button R22 is selected in the second manipulation screen W2, and the automatic adjustment instruction is accepted by the acceptance section 11, the adjustment switching section 17 skips the steps S6 to S10, S13 and S14, as with the aforementioned modification (3). Then, the adjustment switching section 17 is operable, when the determination section 13 determines, in the step S5, that the sum is greater than the threshold associated with the predicted arrangement pattern predicted in the step S4 (S5: YES), to cause the adjusted printing section 15 to execute the adjusted printing processing in the step S12, using a given one of the one or more altered arrangement patterns associated with the predicted arrangement pattern predicted in the step S4.

When the radio button R21 is selected in the second manipulation screen W2, and the manual adjustment instruction is accepted by the acceptance section 11, the adjustment switching section 17 performs the same operation as that depicted in FIG. 7. That is, in the step S6, the adjustment switching section 17 is operable, when the manual adjustment instruction is accepted, to cause the display control section 16 to display the first manipulation screen W1, prior to the execution of the adjusted printing processing by the adjusted printing section 15 in the step S12.

In the above modification (4), it is possible to allow a user to use the second manipulation screen W2 to switch between a first operation of automatically executing the adjusted printing processing using a given one altered arrangement pattern so as to quickly execute a printing processing according to the accepted job execution instruction, and a second operation of displaying the first manipulation screen W1 to allow a user to input therethrough an instruction for executing the accepted job without any alteration or executing the adjusted printing processing using a selected one altered arrangement pattern, so as to execute a printing processing suited to user's intention.

(5) The altered arrangement patterns stored in the pattern storage section 14, described in the first embodiment, are no more than examples of an altered arrangement pattern in the present invention. For example, only one of the aforementioned one or more altered arrangement patters may be associated with each of the predicted arrangement patterns and stored in the pattern storage section 14.

(6) The thresholds associated with the respective predicted arrangement patterns and stored in the non-volatile memory, described in the first embodiment, are no more than examples of a threshold in the present invention.

For example, the thresholds TYnX1 (n≥3), Y1Xm (m≥3), YnXm (n, m≥3) associated, respectively, with the arrangement patterns YnX1, Y1Xm, YnXm, as indicated in FIGS. 5A to 5C, may be set, respectively, as the thresholds TY2X1, TY1X2, YuX2 (u≥2), indicated in FIGS. 4A to 4C. That is, supposing that a margin region lies along a right end and a lower end of a set of sheets arranged in each of the arrangement patterns YnX1, Y1Xm, YnXm, each of the thresholds TYnX1, Y1Xm YnXm may be set to an area of the margin region of a corresponding one of the arrangement patterns.

Alternatively, the threshold associated with each of the arrangement patterns may be set to a given area which can be deemed to be sufficiently small as compared to a total area of the sheets arranged in the arrangement pattern (e.g., an area equal to 5% of the total area of the arranged sheets).

Second Embodiment

A second embodiment of the image forming apparatus of the present invention will now be described based on the drawings. Although the second embodiment will be described by taking a printer as an example of an image forming apparatus, this is not meant to be construed in a limiting sense. For example, the image forming apparatus may be a facsimile machine or a complex machine.

Figure 15:
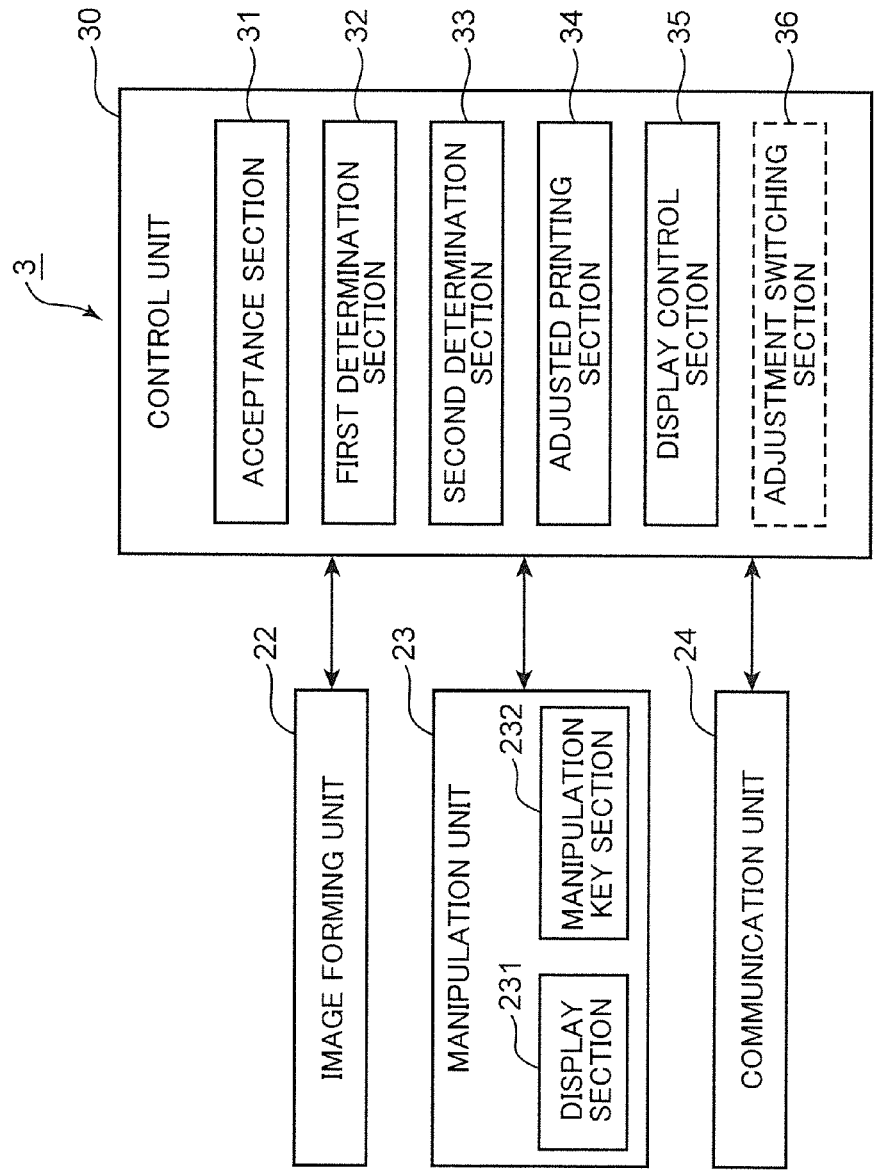
FIG. 15 is a block diagram depicting an electrical configuration of a printer according to a second embodiment of the image forming apparatus of the present invention.

FIG. 15 is a block diagram depicting an electrical configuration of a printer 3 according to the second embodiment of the image forming apparatus of the present invention. As depicted in FIG. 15, the printer 3 comprises an image forming unit 22, a manipulation unit 23 and a communication unit 24 each of which is the same as a corresponding one of those in the first embodiment, and a control unit 30. Details of the image forming unit 22, the manipulation unit 23 and the communication unit 24 have already been described in the first embodiment, and therefore description thereof will be omitted.

As with the control section 10 in the first embodiment, the control unit 30 comprises a non-depicted CPU, a non-depicted non-volatile memory, a non-depicted RAM, and peripheral circuits thereof. The control unit 30 is configured to cause the CPU to execute the control program stored in the non-volatile memory or the like to thereby execute a variety of processing to control operation of each unit of the printer 3.

For example, the control unit 30 is operable, when a printing job execution instruction is received by the communication unit 24, to cause the image forming unit 22 to form an image on a sheet, based on this printing job execution instruction. In particular, regarding the operation of causing the image forming unit 22 to form an image on a sheet based on the printing job execution instruction, the control unit 30 operates as an acceptance section 31, a first determination section 32, a second determination section 33, an adjusted printing section 34, and a display control section 35, as indicated in solid line blocks in FIG. 15.

The acceptance section 31 is operable to accept various instructions for the printer 3, which are input through touch manipulation of a display section 231 or manipulation of a manipulation key section 232 by a user. The acceptance section 31 is also operable, when a printing job execution instruction for forming a set of partial images, respectively, on a plurality of sheets, is transmitted from an external device and received by the communication unit 24, to accept this printing job execution instruction.

Specifically, the printing job execution instruction contains: the aforementioned generation software information; the aforementioned output sheet number information; the aforementioned sheet size information; image data representing a set of partial images intended to be formed, respectively, on a plurality of sheets; region information indicative of an image forming region of each of the sheets on which a corresponding one of the partial images is to be formed, and a margin region (non-image forming region) of each of the sheets; and others. The printing job execution instruction accepted by the acceptance section 31 will hereinafter be termed "accepted job execution instruction".

The first determination section 32 is operable, when the accepted job is a printing job for forming an image on one sheet, and based on the region information contained in the accepted job execution instruction, to determine whether or not a first area of a margin region lying rightward or leftward of the image forming region is greater than a preset first threshold.

The second determination section 33 is operable, when the accepted job is the printing job for forming an image on one sheet, and based on the region information contained in the accepted job execution instruction, to determine whether or not a second area of a margin region lying upward or downward of the image forming region is greater than a preset first threshold.

Figure 16:
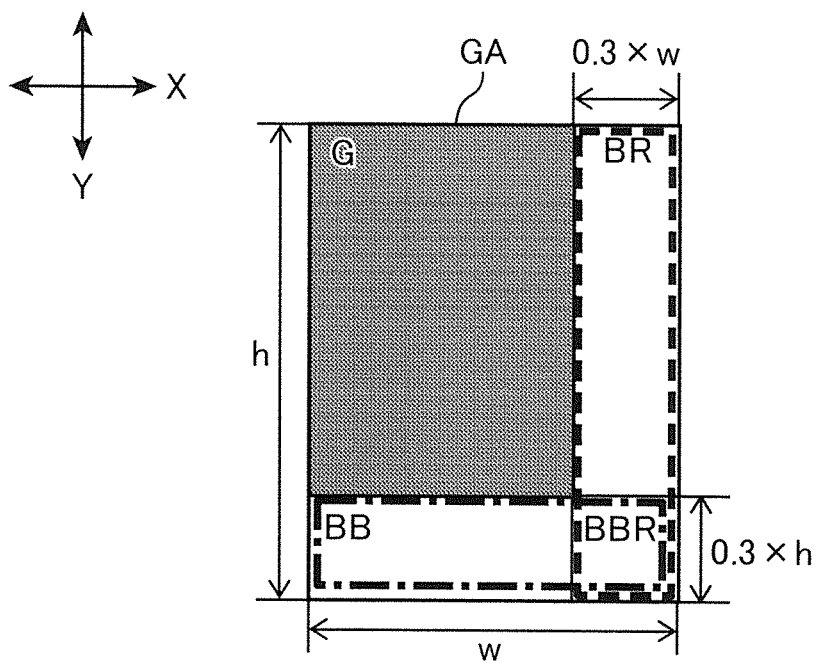
FIG. 16 is a diagram depicting a relationship among a first area, a second area, a first threshold and a second threshold.

FIG. 16 is a diagram depicting a relationship among the first threshold T1, the second threshold T2, the first area BS1, and the second area BS2. Specifically, the first threshold T1 and the second threshold T2 are set in the following manner, and stored in the non-volatile memory in the control unit 30.

Suppose that, in one sheet having an image G (black region) formed thereon, as depicted in FIG. 16, two margin regions BR, BBR each having a length in the rightward-leftward direction (X-direction) (the length in the rightward-leftward direction will hereinafter be termed "width") which is 0.3 times a width w of the sheet lie rightward of the image forming region GA (indicated by the thick solid line) on which the image G is to be formed. Further, suppose that two margin regions BB, BBR each having a length in the upward-downward direction (Y-direction) (the length in the upward-downward direction will hereinafter be termed "height") which is 0.3 times a height h of the sheet lie downward of the image forming region GA.

In this case, a sum of respective areas of the two margin regions BR, BBR lying rightward of the image forming region GA (the sum is equal to an area surrounded by the dashed line) is set as the first threshold T1. Further, a sum of respective areas of the two margin regions BB, BBR lying downward of the image forming region GA (the sum is equal to an area surrounded by the one-dot chain line) is set as the second threshold T2. That is, the first threshold T1 is calculated by the following formula: T1=h×0.3× w. The second threshold T2 is calculated by the following formula: T2=0.3× h×w.

Each of the first determination section 32 and the second determination section 33 is operable, when the accepted job is the printing job for forming an image on one sheet, and based on the region information contained in the accepted job execution instruction, to figure out that there are, in the one sheet, the margin region BB lying downward of the image forming region GA in adjacent relation thereto, the margin region BR lying rightward of the image forming region GA in adjacent relation thereto, and the margin region BBR lying rightward of the margin region BB in adjacent relation thereto and lying downward of the margin region BR in adjacent relation thereto.

Subsequently, the first determination section 32 is operable to calculate a sum of respective areas of the two margin regions BR, BBR lying rightward of the image forming region GA. Then, the first determination section 32 is operable to define the calculated total area as the first area BS1 and determine whether or not the first area BS1 is greater than the first threshold T1.

On the other hand, the second determination section 33 is operable to calculate a sum of respective areas of the two margin regions BB, BBR lying downward of the image forming region GA in the one sheet. Then, the second determination section 33 is operable to define the calculated total area as the second area BS2 and determine whether or not the second area BS2 is greater than the second threshold T2.

Details of the operation of each of the first determination section 32 and the second determination section 33 will be described later.

Return reference to FIG. 15. When the first determination section 32 determines that the first area BS1 is greater than the first threshold T1 or when the second determination section 33 determines that the second area BS2 is greater than the second threshold T2, the adjusted printing section 34 is operable to execute an adjusted printing processing.

The adjusted printing processing is configured to enlarge the image G intended to be formed according to the accepted job, so as to cause the first area BS1 or the second area BS2 to become reduced, and control the image forming unit 22 to form the enlarged image on one or more sheets.

The adjusted printing processing of enlarging the image G intended to be formed according to the accepted job, so as to cause the first area BS1 to become reduced, will hereinafter be termed "first adjusted printing processing". On the other hand, the adjusted printing processing of enlarging the image G intended to be formed according to the accepted job, so as to cause the second area BS2 to become reduced, will hereinafter be termed "second adjusted printing processing". Details of the first adjusted printing processing and the second adjusted printing processing will be described later.

On the other hand, when the first determination section 32 determines that the first area BS1 is equal to or less than the first threshold T1, and the second determination section 33 determines that the second area BS2 is equal to or less than the second threshold T2, the adjusted printing section 34 is operable to execute the accepted job without any alteration. Executing the accepted job without any alteration means controlling the image forming unit 22 to form one or more images, respectively, on one or more sheets, exactly according to the accepted job execution instruction.

Further, when information indicating that the accepted job execution instruction has been generated by a given spreadsheet software is not contained in the accepted job execution instruction, the adjusted printing section 34 is also operable to execute the accepted job without any alteration, as with the adjusted printing section 15 in the first embodiment.

Furthermore, when the accepted job is a printing job for forming a set of partial images, respectively, on a plurality of sheets, the adjusted printing section 34 is also operable to execute the accepted job without any alteration. Details of the operation of the adjusted printing section 34 will be described later.

When the first determination section 32 determines that the first area BS1 is greater than the first threshold T1 or when the second determination section 33 determines that the second area BS2 is greater than the second threshold T2, the display control section 35 is operable, prior to execution of the adjusted printing processing by the adjusted printing section 34, to display a first manipulation screen on the display section 231.

The first manipulation screen is configured to enable a user to input therethrough a preferential instruction for executing the accepted job without any alteration, or a selection instruction for selecting one of the first adjusted printing processing or the second adjusted printing processing. Details of the first manipulation screen and details of the operation of the display control section 35 will be described later.

Figure 17:
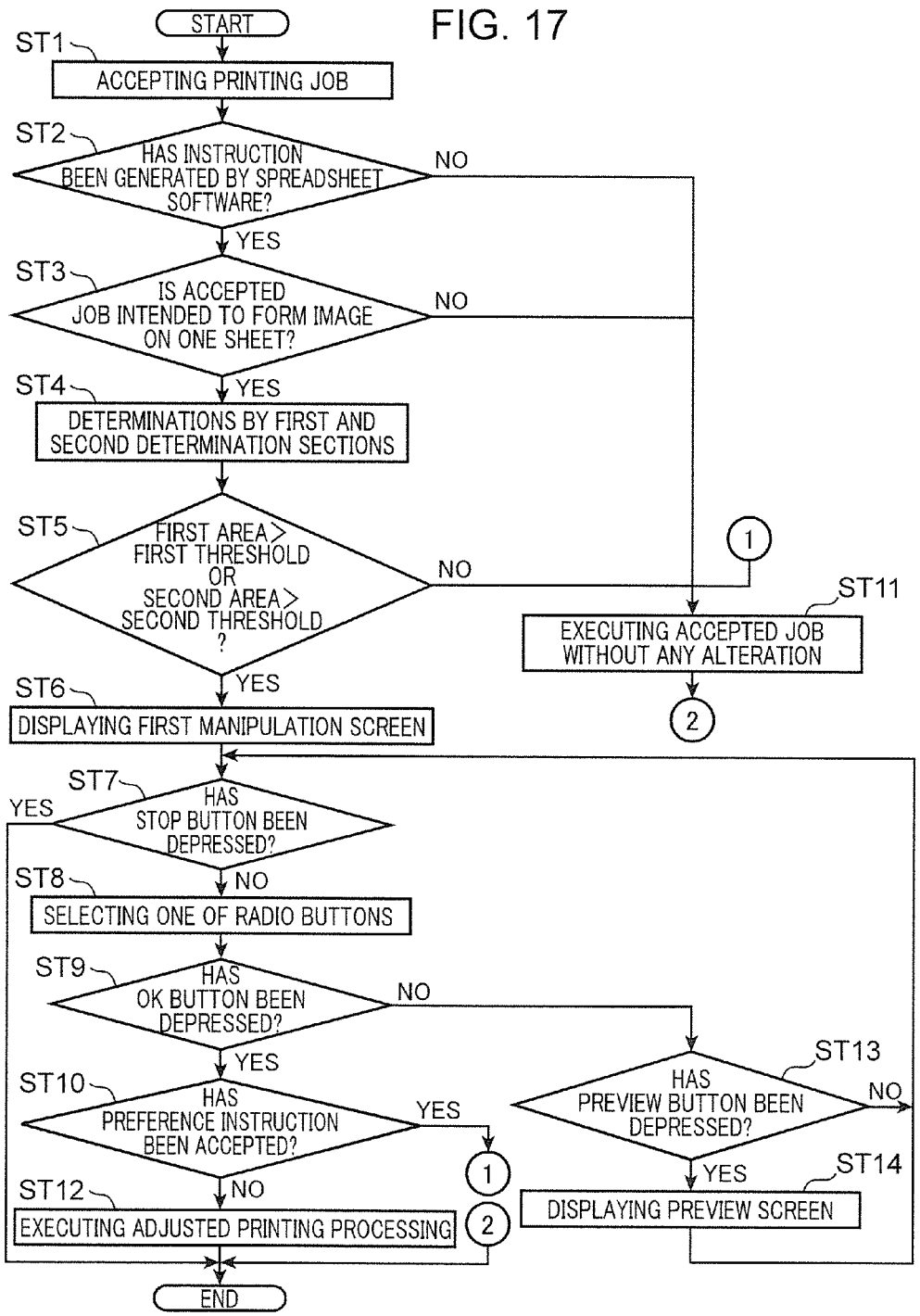
FIG. 17 is a flowchart depicting operation of a control unit to cause an image forming section to form an image on a sheet based on a printing job execution instruction.

The following description will be made about details of the operation of the control unit 30 to cause the image forming unit 22 to form an image on a sheet based on a printing job execution instruction. In this description, details of the respective operations of the first determination section 32, the second determination section 33, the adjusted printing section 34 and the display control section 35, and details of the first adjusted printing processing, the second adjusted printing processing and the first manipulation screen, will be described. FIG. 17 is a flowchart depicting the operation of the control unit 30 to cause the image forming section 22 to form an image on a sheet based on a printing job execution instruction.

As depicted in FIG. 17, when a printing job execution instruction is accepted by the acceptance section 31 (ST1), the adjusted printing section 34 operates to determine whether or not the information indicating that the printing job execution instruction accepted by the acceptance section 31 (the printing job will hereinafter be termed "accepted job") has been generated by the given spreadsheet software is contained in the accepted job execution instruction (ST2).

When, in the step ST2, the information indicating that the accepted job execution instruction has been generated by the given spreadsheet software is determined to be not contained in the accepted job execution instruction (ST2: NO), the adjusted printing section 34 operates to execute the accepted job without any alteration (ST11).

On the other hand, suppose that, in the step ST2, the information indicating that the accepted job execution instruction has been generated by the given spreadsheet software is determined to be contained in the accepted job execution instruction (ST2: YES). In this case, the adjusted printing section 34 operates to determine whether or not the accepted job is a printing job for forming an image on one sheet, based on the output sheet number information contained in the accepted job execution instruction, or, for example, by counting the number of pieces of partial image data contained in the accepted job execution instruction (ST3).

When, in the step ST3, the accepted job is determined to be not the printing job for forming an image on one sheet (ST3: NO), the adjusted printing section 34 also operates to execute the accepted job without any alteration (ST11).

On the other hand, suppose that, in the step ST3, the accepted job is determined to be the printing job for forming an image on one sheet (ST3: YES). In this case, the first determination section 32 operates to determine, based on the region information contained in the accepted job execution instruction, whether or not the first area BS1 is greater than the first threshold T1. Further, the second determination section 33 operates to determine, based on the region information contained in the accepted job execution instruction, whether or not the second area BS2 is greater than the second threshold T2 (ST4).

When, in the step ST4, the first determination section 32 determines that the first area BS1 is greater than the first threshold T1 or when, in the step ST4, the second determination section 33 determines that the second area BS2 is greater than the second threshold T2 (ST5: YES), the display control section 35 operates to display the first manipulation screen on the display section 231 (ST6).

Figure 18:
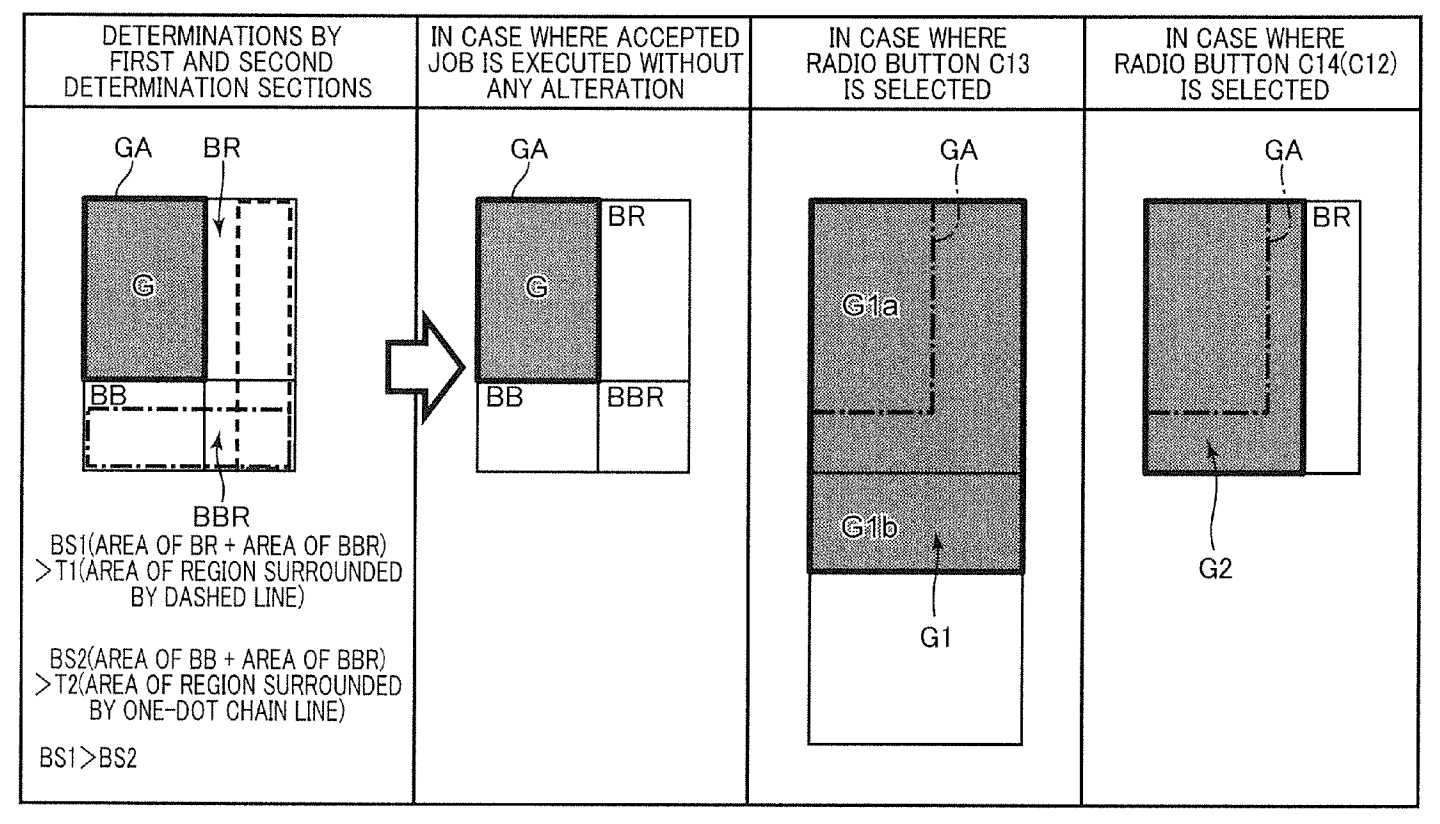

Details of the step ST4 to ST6 will be described below based on a specific example. FIG. 18 is a diagram depicting a specific example of the operation in FIG. 17, in the case where the first determination section 32 determines that the first area BS1 is greater than the first threshold T1, and the second determination section 33 determines that the second area BS2 is greater than the second threshold T2.

In this specific example, suppose that the accepted job is a printing job for forming an image G (black region) on one sheet, as depicted in the first column of FIG. 18. Further, suppose that the accepted job execution instruction contains therein region information indicative of: an image forming region GA (indicated by the thick solid line) on which the image G is to be formed; and, as indicated in the white region in the first column, a margin region BB lying downward of the image forming region GA in adjacent relation thereto, a margin region BR lying rightward of the image forming region GA in adjacent relation thereto, and a margin region BBR lying rightward of the margin region BB in adjacent relation thereto and lying downward of the margin region BR in adjacent relation thereto. Further, suppose that a sum of an area of the margin region BB and an area of the margin region BBR is less than a sum of an area of the margin region BR and the area of the margin region BBR.

In this case, in the step ST4, each of the first determination section 32 and the second determination section 33 operates to figure out, based on the region information contained in the accepted job execution instruction, the image forming region GA indicated by the thick solid line in the first column of FIG. 18, and the three margin regions BB, BR, BBR indicated in the white region in the first column of FIG. 18.

Thus, the first determination section 32 operates to determine whether or not the first area BS1, i.e., a sum of respective areas of the two margin regions BR, BBR lying rightward of the image forming region GA, is greater than a first threshold T1.

As previously described with reference to FIG. 16, supposing that each of the two margin regions BR, BBR has a width (of the region surrounded by the dashed line in the first column of FIG. 18) equal to 0.3 times a width w of the sheet, the first threshold T1 is set to the sum of the areas of the two margin regions BR, BBR. In this specific example, as indicated in the white region in the first column of FIG. 18, the sum of the areas of the two margin regions BR, BBR is greater than the first threshold T1 which is equal to an area of the region surrounded by the dashed line in the first column of FIG. 18. Thus, in this specific example, in the step ST4, the first determination section 32 operates to determine that the first area BS1 is greater than the first threshold T1.

On the other hand, the second determination section 33 operates to determine whether or not the second area BS2, i.e., a sum of respective areas of the two margin regions BB, BBR lying downward of the image forming region GA, is greater than a second threshold T2.

As previously described with reference to FIG. 16, supposing that each of the two margin regions BB, BBR has a height (of the region surrounded by the one-dot chain line in the first column of FIG. 18) equal to 0.3 times a height h of the sheet, the second threshold T2 is set to the sum of the areas of the two margin regions BB, BBR. In this specific example, as indicated in the white region in the first column of FIG. 18, the sum of the areas of the two margin regions BB, BBR is greater than the second threshold T2 which is equal to an area of the region surrounded by the one-dot chain line in the first column of FIG. 18. Thus, in this specific example, in the step ST4, the second determination section 33 operates to determine that the second area BS2 is greater than the second threshold T2.

Figure 19:
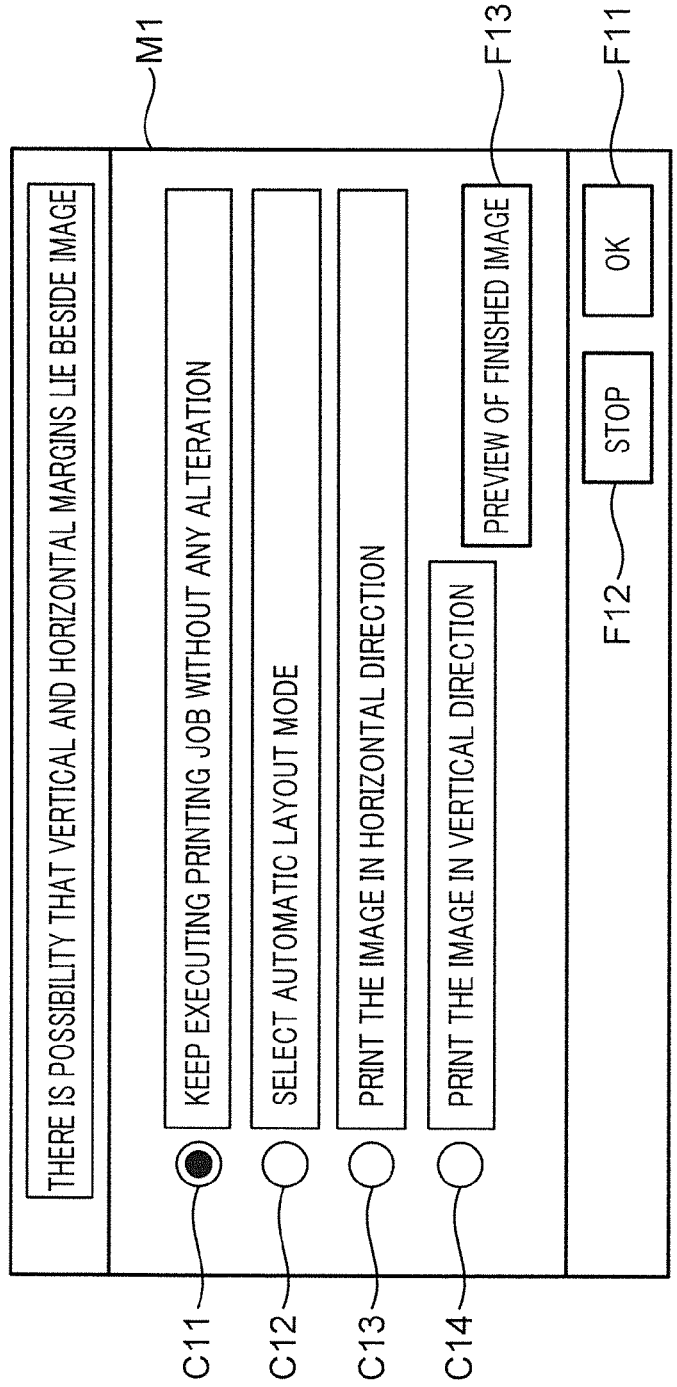
FIG. 19 is a diagram depicting another example of the first manipulation screen.

FIG. 19 is a diagram depicting an example of the first manipulation screen M1. Suppose that the first determination section 32 determines that the first area BS1 is greater than the first threshold T1 and the second determination section 33 determines that the second area BS2 is greater than the second threshold T2 (ST5: YES). In the above case, in the step S6, the display control section 35 operates to display the first manipulation screen M1 depicted, for example, in FIG. 19, on the display section 231. The first manipulation screen M1 comprises four radio buttons C11 to C14, an OK button F11, a stop button F12, and a preview button F13.

The four radio buttons C11 to C14 are configured such that only any one of them can be selected. The radio button C11 is provided as a means to input a preference instruction for executing an accepted job without any alteration. The radio buttons C12 to C14 are provided as a means to input a selection instruction for selecting one of the first adjusted printing processing and the second adjusted printing processing.

Specifically, the radio button C12 is provided as a means to input a selection instruction for selecting an adjusted printing processing of enlarging the image G intended to be formed according to the accepted job, so as to cause a smaller one of the first area BS1 and the second area BS2 to become reduced.

In this specific example, the second area BS2 (sum of the areas of the two margin regions BB, BBR) is less than the first area BS1 (sum of the areas of the two margin regions BR, BBR), as mentioned above. Thus, when a user selects the radio button C12 by touch manipulation or the like of the display section 231, the radio button C12 functions to input therethrough a selection instruction for selecting the second adjusted printing processing of enlarging the image G so as to cause the second area BS2 to become reduced.

On the other hand, differently from this specific example, in the case where the first area BS1 is less than the second area BS2, when selected, the radio button C12 functions to input therethrough a selection instruction for selecting the first adjusted printing processing.

Further, in the case where the first area BS1 is equal to the second area BS2, when selected, the radio button C12 functions to input therethrough the selection instruction for selecting the first adjusted printing processing. Alternatively, on the contrary, in the case where the first area BS1 is equal to the second area BS2, the radio button C12 may be configured such that when selected, it functions to input therethrough the selection instruction for selecting the second adjusted printing processing. Alternatively, in the case where the first area BS1 is equal to the second area BS2, the display control section 35 may be configured to keep the radio button C12 from being indicated in the first manipulation screen M1.

The radio button C13 is provided as a means to input the selection instruction for selecting the first adjusted printing processing. The radio button C14 is provided as a means to input the selection instruction for selecting the second adjusted printing processing.

The OK button F11 is provided as a means to finally set an input of the instruction designated by a user-selected one of the radio buttons C11 to C14. Specifically, suppose that any one of the four radio buttons C11 to C14 is selected and then the OK button F11 is depressed. In this case, the input of the instruction designated by the selected one radio button is finally set, and this instruction is accepted by the acceptance section 31.

As one example, suppose that the radio button C11 is selected and then the OK button F11 is depressed. In this case, the instruction designated by the radio button C11, i.e., the preference instruction for executing an accepted job without any alteration, is accepted by the acceptance section 31. As another example, supposing that the radio button C13 is selected and then the OK button F11 is depressed, the instruction designated by the radio button C13, i.e., the selection instruction for selecting the first adjusted printing processing, is accepted by the acceptance section 31. As yet another example, supposing that the radio button C14 is selected and then the OK button F11 is depressed, the instruction designated by the radio button C14, i.e., the selection instruction for selecting the second adjusted printing processing, is accepted by the acceptance section 31.

In this specific example, when the radio button C12 is selected, the selection instruction for selecting the second adjusted printing processing is input, as mentioned above. Thus, when the radio button C12 is selected and then the OK button F11 is depressed, the selection instruction for selecting the second adjusted printing processing is finally set, and accepted by the acceptance section 31.

The stop button F12 is provided as a means to input a job stop instruction for stopping execution of an accepted job. That is, upon depressing the stop button F12, the job stop instruction is accepted by the acceptance section 31. An operation to be performed when the acceptance section 31 accepts the job stop instruction will be described later.

The preview button F13 is provided as a means to input a preview execution instruction. That is, upon depressing the preview button F13, the preview execution instruction is accepted by the acceptance section 31. An operation to be performed when the acceptance section 31 accepts the preview execution instruction will be described later.

Return reference to FIG. 17. Suppose, in the step ST4, the first determination section 32 determines that the first area BS1 is equal to or less than the first threshold T1, and the second determination section 33 determines that the second area BS2 is equal to or less than the second threshold T2 (ST5: NO). In this case, the adjusted printing section 34 operates to execute the accepted job without any alteration (ST11). A specific example of this operation will be described below.

Figure 20:
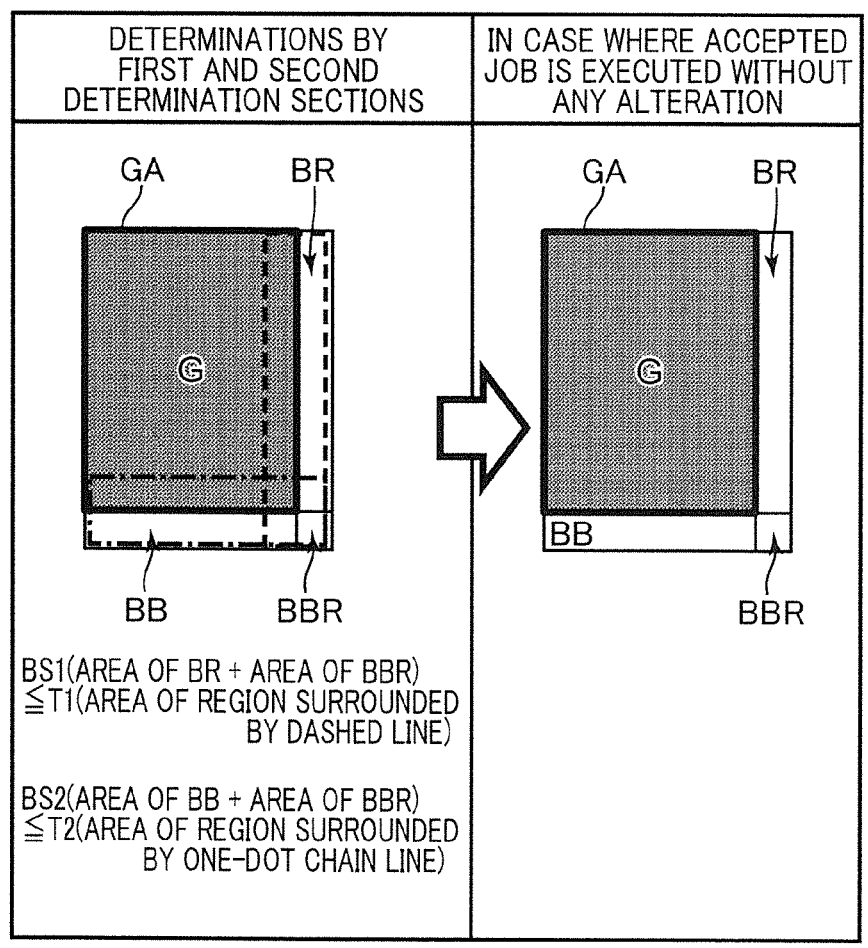
FIG. 20 is a diagram depicting a specific example of the operation in FIG. 17, in the case where the first determination section determines that the first area is equal to or less than the first threshold, and the second determination section determines that the second area is equal to or less than the second threshold.

FIG. 20 is a diagram depicting a specific example of the operation in FIG. 17, in the case where the first determination section 32 determines that the first area BS1 is equal to or less than the first threshold T1, and the second determination section 33 determines that the second area BS2 is equal to or less than the second threshold T2.

As one example, suppose that the accepted job is a printing job for forming an image G on one sheet, as depicted in the left column of FIG. 20. Further, suppose that the accepted job execution instruction contains therein region information indicative of: an image forming region GA (indicated by the thick solid line) on which the image G is to be formed; and, as indicated in the white region in the left column of FIG. 20, a margin region BB lying downward of the image forming region GA in adjacent relation thereto, a margin region BR lying rightward of the image forming region GA in adjacent relation thereto, and a margin region BBR lying rightward of the margin region BB in adjacent relation thereto and lying downward of the margin region BR in adjacent relation thereto.

In this case, in the step ST4, each of the first determination section 32 and the second determination section 33 operates to figure out, based on the region information contained in the accepted job execution instruction, the image forming region GA indicated by the thick solid line in the left column of FIG. 20, and the three margin regions BB, BR, BBR indicated in the white region in the left column of FIG. 20. Thus, the first determination section 32 operates to determine whether or not the first area BS1, i.e., a sum of respective areas of the two margin regions BR, BBR, is greater than a first threshold T1.

As previously described with reference to FIG. 16, supposing that each of the two margin regions BR, BBR has a width (of the region surrounded by the dashed line in the left column of FIG. 20) equal to 0.3 times a width w of the sheet, the first threshold T1 is set to the sum of the areas of the two margin regions BR, BBR. In this specific example, as indicated in the white region in the left column of FIG. 20, the sum of the areas of the two margin regions BR, BBR is equal to or less than the first threshold T1 which is equal to an area of the region surrounded by the dashed line in the left column of FIG. 20. Thus, in this specific example, in the step ST4, the first determination section 32 operates to determine that the first area BS1 is equal to or less than the first threshold T1.

On the other hand, the second determination section 33 operates to determine whether or not the second area BS2, i.e., a sum of respective areas of the two margin regions BB, BBR, is greater than a second threshold T2.

As previously described with reference to FIG. 16, supposing that each of the two margin regions BB, BBR has a height (of the region surrounded by the one-dot chain line in the left column of FIG. 20) equal to 0.3 times a height h of the sheet, the second threshold T2 is set to the sum of the areas of the two margin regions BB, BBR. In this specific example, as indicated in the white region in the left column of FIG. 20, the sum of the areas of the two margin regions BB, BBR is equal to or less than the second threshold T2 which is equal to an area of the region surrounded by the one-dot chain line in the left column of FIG. 20. Thus, in this specific example, in the step ST4, the second determination section 33 operates to determine that the second area BS2 is equal to or less than the second threshold T2.

As above, when the first determination section 32 determines that the first area BS1 is equal to or less than the first threshold T1, and the second determination section 33 determines that the second area BS2 is equal to or less than the second threshold T2 (ST5: NO), the adjusted printing section 34 operates to execute the accepted job without any alteration (ST11). Specifically, in the step ST11, the adjusted printing section 34 operates to control the image forming unit 22 to form the image G on the image forming region GA, exactly according to the accepted job execution instruction, as depicted in the right column of FIG. 20.

Return reference to FIG. 17. Suppose that the stop button F12 in the first manipulation screen M1 displayed on the display section 231 in the step ST6 is depressed, and the job stop instruction is accepted by the acceptance section 31 (ST7: YES). In this case, the adjusted printing section 34 operates to stop the execution of the printing job accepted in the step ST1, and terminate the processing.

Differently, suppose that, in the first manipulation screen M1, without depressing the stop button F12 (ST7: NO), one of the four radio buttons C11 to C14 is selected (ST8), and the OK button F11 is depressed (ST9: YES). In this case, the acceptance section 31 operates to accept the instruction designated by the one radio button selected in the step ST8.

As one example, when the radio button C11 is selected in the step ST8, and the acceptance section 31 accepts the preference instruction for executing the accepted job without any alteration (ST10: YES), the adjusted printing section 34 operates to execute the accepted job without any alteration (ST11). As another example, suppose that any one of the radio buttons C12 to C14 is selected in the step ST8, and the acceptance section 31 accepts the selection instruction designated by the selected radio button (ST10: NO). In this case, the adjusted printing section 34 operates to execute the first or second adjusted printing processing indicated by the accepted selection instruction (ST12).

Details of the step ST11 and the step ST12 will be described based on the specific example previously described with reference to FIG. 18.

When the accepted job is executed without any alteration (ST11), as depicted in the second column of FIG. 18, the adjusted printing section 34 operates to control the image forming unit 22 to form the image G (black region) on the image firming region GA (indicated by the thick solid line), exactly according to the accepted job execution instruction.

When the acceptance section 31 accepts the selection instruction designated by the radio button C13 (ST10: NO), the adjusted printing section 34 operates to execute the first adjusted printing processing indicated by the accepted selection instruction (ST12).

Specifically, as depicted in the third column of FIG. 18, the adjusted printing section 34 operates to generate an enlarged image G1 (the black region in the third column of FIG. 18) by enlarging the image G at the same scale ratio in both of the upward-downward and rightward-leftward directions through the first adjusted printing processing, so as to cause the first area BS1 to become 0, i.e., cause the two margin regions BR, BBR lying rightward of the image forming region GA in the white region depicted in the first column of FIG. 18 to disappear. In the third column of FIG. 18, the region delimited by the one-dot chain line denotes the image forming region GA indicated by the region information contained in the accepted job execution instruction.

Then, the adjusted printing section 34 operates to control the image forming unit 22 to form the generated enlarged image G1 on two sheets. Specifically, in this case, based on the sheet size information contained in the accepted job execution instruction, the adjusted printing section 34 operates to divide the enlarged image G1 into a partial image G1a having a size equal to that of one sheet and another partial image G1b. Then, the adjusted printing section 34 operates to control the image forming unit 22 to form the divided partial images G1a, G2a, respectively, on the two sheets.

When the acceptance section 31 accepts the selection instruction designated by the radio button C14 (ST10: NO), the adjusted printing section 34 operates to execute the second adjusted printing processing indicated by the accepted selection instruction (ST12). In this specific example, the selection instruction designated by the radio button C12 is the selection instruction for selecting the second adjusted printing processing. Thus, in this specific example, when the acceptance section 31 accepts the selection instruction designated by the radio button C12 (ST10: NO), the adjusted printing section 34 operates to execute the second adjusted printing processing indicated by the accepted selection instruction (ST12).

In this case, as depicted in the fourth column of FIG. 18, the adjusted printing section 34 operates to generate an enlarged image G2 (the black region in the fourth column of FIG. 18) by enlarging the image G at the same scale ratio in both of the upward-downward and rightward-leftward directions through the second adjusted printing processing, so as to cause the second area BS2 to become 0, i.e., cause the two margin regions BB, BBR lying downward of the image forming region GA in the white region depicted in the first column of FIG. 18 to disappear. In the fourth column of FIG. 18, the region delimited by the one-dot chain line denotes the image forming region GA indicated by the region information contained in the accepted job execution instruction.

Then, the adjusted printing section 34 operates to control the image forming unit 22 to form the generated enlarged image G2 on one sheet.

Return reference to FIG. 17. Suppose that, in the first manipulation screen M1, any one of the four radio buttons C11 to C14 is selected (ST8), and then the preview button F13 is depressed (ST13: YES) without depressing the OK button F11 (ST9: NO). Then, when the acceptance section 31 accepts the instruction designated by the one radio button selected in the step ST8 and the preview execution instruction, the adjusted printing section 34 operates to display a preview screen on the display section 231 (ST14).

Figure 21A:
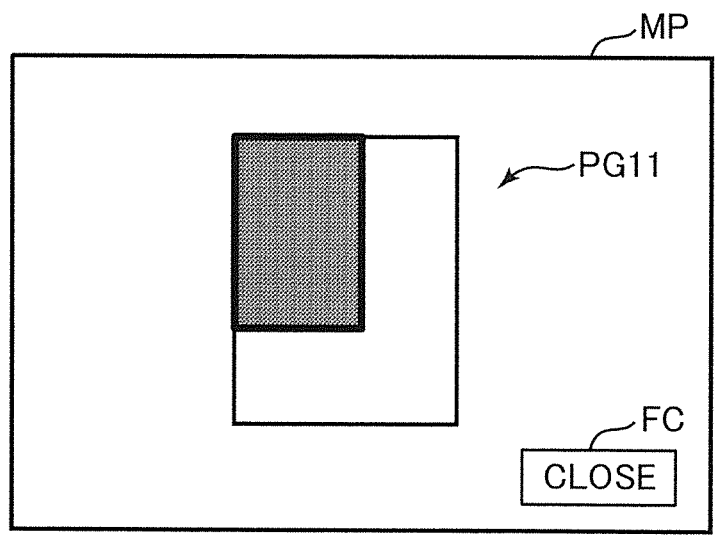
FIG. 21A is a diagram depicting a preview screen to be displayed when the preference instruction for executing an accepted job without any alteration and the preview execution instruction are accepted.
Figure 21B:
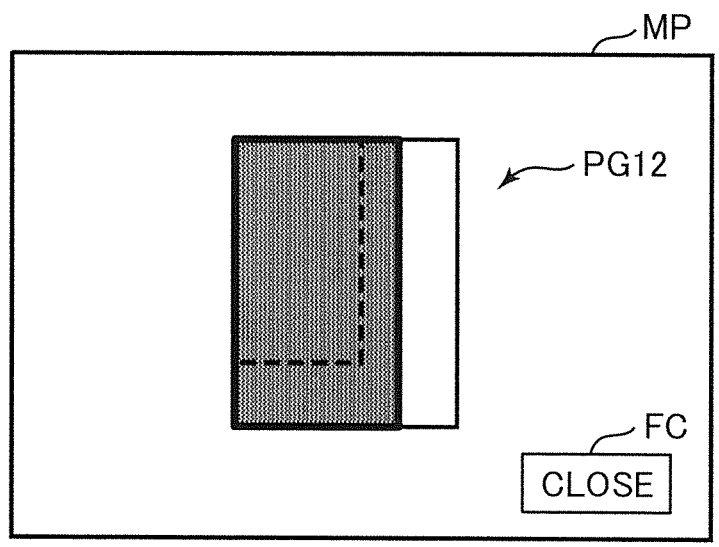
FIG. 21B is a diagram depicting a preview screen to be displayed when a first one of the selection instructions and the preview execution instruction are accepted.
Figure 21C:
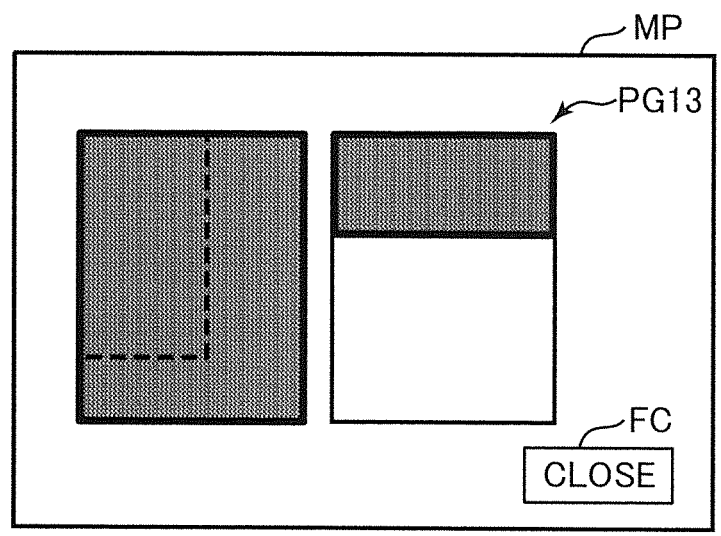
FIG. 21C is a diagram depicting a preview screen to be displayed when a second one of the selection instructions and the preview execution instruction are accepted.
Figure 21D:
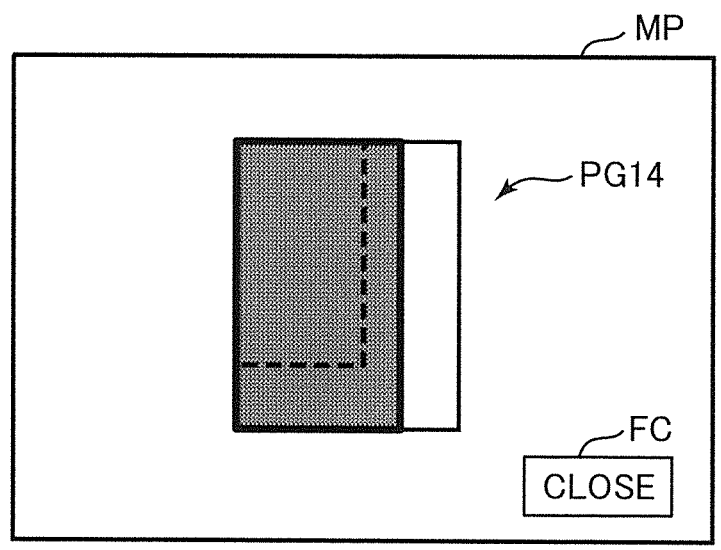
FIG. 21D is a diagram depicting a preview screen to be displayed when a third one of the selection instructions and the preview execution instruction are accepted.

Details of the step ST14 will be described below, based on the specific example previously described with reference to FIG. 18, and FIGS. 21A to 21D. FIG. 21A is a diagram depicting a preview screen to be displayed when the preference instruction for executing an accepted job without any alteration and the preview execution instruction are accepted. FIG. 21B is a diagram depicting a preview screen to be displayed when the selection instruction designated by the radio button C12 and the preview execution instruction are accepted. FIG. 21C is a diagram depicting a preview screen to be displayed when the selection instruction designated by the radio button C13 and the preview execution instruction are accepted. FIG. 21D is a diagram depicting a preview screen to be displayed when the selection instruction designated by the radio button C14 and the preview execution instruction are accepted.

Suppose that, in response to selection of the radio button C11 in the step ST8 and subsequent depression of the preview button F13 in the step ST13, the acceptance section 31 accepts the preference instruction for executing the accepted job without any alteration and the preview execution instruction. In this case, in the step ST14, the adjusted printing section 34 operates to display a preview screen MP comprising a preview image PG11 and a close button FC, on the display section 231, as depicted in FIG. 21A. The preview image PG11 is an image (image similar to the figure in the second column of FIG. 18) representing one sheet to be obtained when the accepted job is executed without any alteration.

Suppose that, in response to selection of the radio button C12 in the step ST8 and subsequent depression of the preview button F13 in the step ST13, the acceptance section 31 accepts the selection instruction for selecting the second adjusted printing processing and the preview execution instruction. In this case, in the step ST14, the adjusted printing section 34 operates to display a preview screen MP comprising a preview image PG12 and a close button FC, on the display section 231, as depicted in FIG. 21B.

The preview image PG12 is an image (image similar to the figure in the fourth column of FIG. 18) representing a sheet to be obtained when the second adjusted printing processing designated by the radio button C12 is executed in the step ST12. The preview image PG12 includes a pre-alteration image indicated by the dashed lines, which corresponds to an image forming region GA of a sheet to be obtained when the accepted job is executed without any alteration. Thus, a user can easily visually recognize a difference from a result when the accepted job is executed without any alteration. It is to be understood that the preview image PG12 needs not necessarily include the pre-alteration image.

Similarly, suppose that, in response to selection of the radio button C13 in the step ST8 and subsequent depression of the preview button F13 in the step ST13, the acceptance section 31 accepts the selection instruction for selecting the first adjusted printing processing and the preview execution instruction. In this case, in the step ST14, the adjusted printing section 34 operates to display a preview screen MP comprising a preview image PG13 and a close button FC, on the display section 231, as depicted in FIG. 21C.

The preview image PG13 is an image (image similar to the figure in the third column of FIG. 18) representing a sheet to be obtained when the first adjusted printing processing designated by the radio button C13 is executed in the step ST12.

In the case where two or more sheets are obtained as a result of execution of the adjusted printing processing, an image formed by arranging such sheets in the rightward-leftward direction is displayed as a preview image, as in the preview image PG13. Alternatively, in the case where two or more sheets are obtained as the result of execution of the adjusted printing processing, the adjusted printing section 34 may operate to display, as the preview image, an image formed by arranging such sheets in the upward-downward direction.

The preview image PG13 also includes the pre-alteration image. However, it is to be understood that the preview image PG13 needs not necessarily include the pre-alteration image.

Further, suppose that, in response to selection of the radio button C14 in the step ST8 and subsequent depression of the preview button F13 in the step ST13, the acceptance section 31 accepts the selection instruction for selecting the second adjusted printing processing and the preview execution instruction. In this case, in the step ST14, the adjusted printing section 34 operates to display a preview screen MP comprising a preview image PG14 and a close button FC, on the display section 231, as depicted in FIG. 21D.

The preview image PG14 is an image (image similar to the figure in the fourth column of FIG. 18) representing a sheet to be obtained when the second adjusted printing processing designated by the radio button C14 is executed in the step ST12. In this specific example, the second adjusted printing processing is also executed in the step S12 when the radio button C12 is selected in the step ST8. Thus, the preview image PG14 is identical to the preview image PG12.

The close button FC is provided as a means to input a non-display instruction for setting the preview screen MP to a non-display state. That is, upon depressing the close button FC, the non-display instruction is accepted by the acceptance section 31. When the non-display instruction is accepted by the acceptance section 31, the adjusted printing section 34 operates to set the preview screen MP to the non-display state and return the processing to the step ST7 (FIG. 17).

Figure 22:
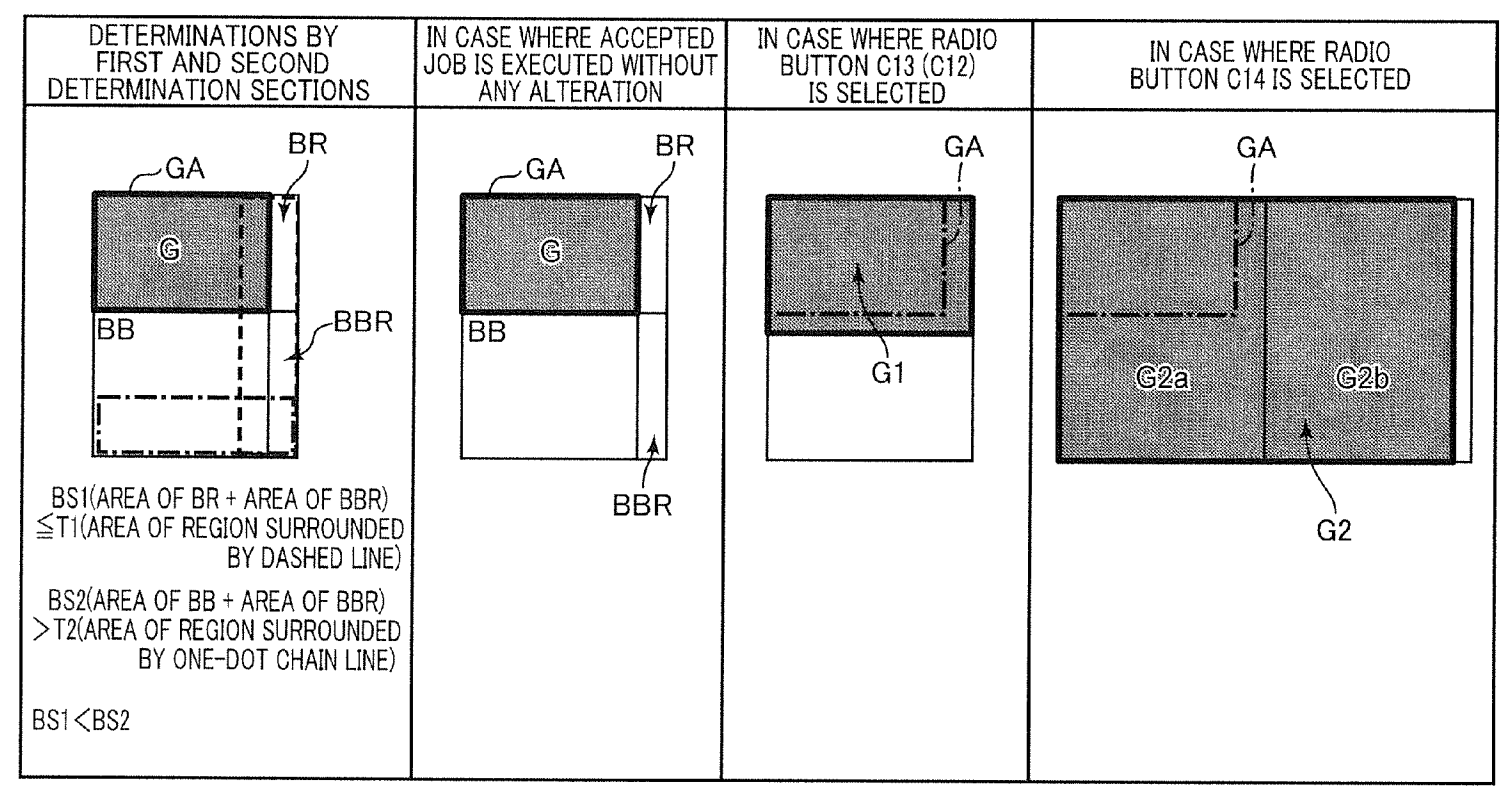
Figure 23:
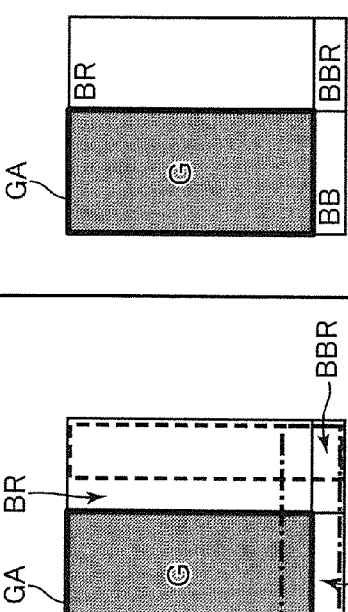
FIG. 23 is a diagram depicting a specific example of the operation in FIG. 17, in the case where the first determination section determines that the first area is greater than the first threshold, and the second determination section determines that the second area is equal to or less than the second threshold.

With reference to FIGS. 22 and 23, the following description will be made about specific examples of the operation depicted in FIG. 17, in the case where, in the step ST4, the first determination section 32 determines that the first area BS1 is equal to or less than the first threshold T1, and the second determination section 33 determines that the second area BS2 is greater than the second threshold T2 (ST5: YES), and in the case where, in the step ST4, the first determination section 32 determines that the first area BS1 is greater than the first threshold T1, and the second determination section 33 determines that the second area BS2 is equal to or less than the second threshold T2 (ST5: YES).

FIG. 22 is a diagram depicting a specific example of the operation in FIG. 17, in the case where the first determination section 32 determines that the first area BS1 is equal to or less than the first threshold T1, and the second determination section 33 determines that the second area BS2 is greater than the second threshold T2. FIG. 23 is a diagram depicting a specific example of the operation in FIG. 17, in the case where the first determination section 32 determines that the first area BS1 is greater than the first threshold T1, and the second determination section 33 determines that the second area BS2 is equal to or less than the second threshold T2.

Suppose that the accepted job is a printing job for forming an image G (black region) on one sheet, as depicted in the first column of FIG. 22. Further, suppose that the accepted job execution instruction contains therein: an image forming region GA (indicated by the thick solid line) on which an image G is to be formed; and margin information indicative of three margin regions BB, BR, BBR, as indicated in the white region in the first column of FIG. 22. Further, suppose that a sum of an area of the margin region BR and an area of the margin region BBR is less than a sum of an area of the margin region BB and the area of the margin region BBR.

In this case, in the step ST4, each of the first determination section 32 and the second determination section 33 operates to figure out, based on the region information contained in the accepted job execution instruction, the image forming region GA indicated by the thick solid line in the first column of FIG. 22, and the three margin regions BB, BR, BBR indicated in the white region in the first column of FIG. 22.

In this specific example, as indicated in the white region in the first column of FIG. 22, the sum of the areas of the two margin regions BR, BBR is equal to or less than the first threshold T1 which is equal to an area of the region surrounded by the dashed line in the first column of FIG. 22. Thus, in this specific example, in the step ST4, the first determination section 32 operates to determine that the first area BS1 is equal to or less than the first threshold T1. On the other hand, in this specific example, as indicated in the white region in the first column of FIG. 22, the sum of the areas of the two margin regions BB, BBR is greater than the second threshold T2 which is equal to an area of the region surrounded by the one-dot chain line in the first column of FIG. 22. Thus, in this specific example, in the step ST4, the second determination section 33 operates to determine that the second area BS2 is greater than the second threshold T2.

As above, even when the first determination section 32 determines that the first area BS1 is equal to or less than the first threshold T1, the step ST6 is executed when the second determination section 33 determines that the second area BS2 is greater than the second threshold T2 (ST5: YES).

In this specific example, the sum of the areas of the two margin regions BR, BBR is less than the sum of the areas of the two margin region BB, BBR, as mentioned above. That is, the first area BS1 is less than the second area BS2. Thus, the selection instruction designated by the radio button C12 of the first manipulation screen M1 displayed in the step ST6 serves as the selection instruction for selecting the first adjusted printing processing.

When the radio button C11 is selected in the step ST8, and the acceptance section 31 accepts the preference instruction for executing the accepted job without any alteration (ST10: YES), the adjusted printing section 34 operates to execute the accepted job without any alteration (ST11). Specifically, as depicted in the second column of FIG. 22, the adjusted printing section 34 operates to control the image forming unit 22 to form the image G (black region) on the image forming region GA (indicated by the thick solid line), exactly according to the accepted job execution instruction.

Suppose that the radio button C12 or the radio button C13 is selected in the step ST8, and the acceptance section 31 accepts the selection instruction for selecting the first adjusted printing processing designated by each of the radio button C12 and the radio button C13 (ST10: NO). In this case, the adjusted printing section 34 operates to execute the first adjusted printing processing (ST12).

Specifically, in the step ST12, the adjusted printing section 34 operates to generate an enlarged image G1 (the black region in the third column of FIG. 22) by enlarging at the same scale ratio in both of the upward-downward and rightward-leftward directions, so as to cause the first area BS1 to become 0, i.e., the two margin regions BR, BBR lying rightward of the image forming region GA in the white region depicted in the first column of FIG. 22 disappear, as depicted in the third column of FIG. 22. Then, the adjusted printing section 34 operates to control the image forming unit 22 to form the generated enlarged image G1 on one sheet.

Suppose that the radio button C14 is selected in the step ST8, and the acceptance section 31 accepts the selection instruction for selecting the second adjusted printing processing designated by the radio button C14 (ST10: NO). In this case, the adjusted printing section 34 operates to execute the second adjusted printing processing (ST12).

Specifically, in the step ST12, the adjusted printing section 34 operates to generate an enlarged image G2 (the black region in the fourth column of FIG. 22) by enlarging at the same scale ratio in both of the upward-downward and rightward-leftward directions, so as to cause the second area BS2 to become 0, i.e., cause the two margin regions BB, BBR lying downward of the image forming region GA in the white region depicted in the first column of FIG. 22 to disappear, as depicted in the fourth column of FIG. 22. Then, the adjusted printing section 34 operates to divide the generated enlarged image G2 into two partial images G2a, G2b based on a sheet size, and control the image forming unit 22 to form the divided partial images G2a, G2a, respectively, on two sheets.

As another example, suppose that the accepted job is a printing job for forming an image G (black region) on one sheet, as depicted in the first column of FIG. 23. Further, suppose that the accepted job execution instruction contains therein: an image forming region GA (indicated by the thick solid line) on which an image G is to be formed; and margin information indicative of three margin regions BB, BR, BBR, as indicated in the white region in the first column of FIG. 23. Further, suppose that a sum of an area of the margin region BB and an area of the margin region BBR is less than a sum of an area of the margin region BR and the area of the margin region BBR.

In this case, in the step ST4, each of the first determination section 32 and the second determination section 33 operates to figure out, based on the region information contained in the accepted job execution instruction, the image forming region GA indicated by the thick solid line in the first column of FIG. 23, and the three margin regions BB, BR, BBR indicated in the white region in the first column of FIG. 23.

In this specific example, as indicated in the white region in the first column of FIG. 23, the sum of the areas of the two margin regions BR, BBR is greater than the first threshold T1 which is equal to an area of the region surrounded by the dashed line in the first column of FIG. 23. Thus, in this specific example, in the step ST4, the first determination section 32 operates to determine that the first area BS1 is greater than the first threshold T1. On the other hand, in this specific example, as indicated in the white region in the first column of FIG. 23, the sum of the areas of the two margin regions BB, BBR is equal to or less than the second threshold T2 which is equal to an area of the region surrounded by the one-dot chain line in the first column of FIG. 23. Thus, in this specific example, in the step ST4, the second determination section 33 operates to determine that the second area BS2 is equal to or less than the second threshold T2.

As above, even when the second determination section 33 determines that the second area BS2 is equal to or less than the second threshold T2, the step ST6 is executed when the first determination section 32 determines that the first area BS1 is greater than the first threshold T1 (ST5: YES).

In this specific example, the sum of the areas of the two margin regions BB, BBR is less than the sum of the areas of the two margin region BR, BBR, as mentioned above. That is, the second area BS2 is less than the first area BS1. Thus, the selection instruction designated by the radio button C12 of the first manipulation screen M1 displayed in the step ST6 serves as the selection instruction for selecting the second adjusted printing processing.

When the radio button C11 is selected in the step ST8, and the acceptance section 31 accepts the preference instruction for executing the accepted job without any alteration (ST10: YES), the adjusted printing section 34 operates to execute the accepted job without any alteration (ST11). Specifically, as depicted in the second column of FIG. 23, the adjusted printing section 34 operates to control the image forming unit 22 to form the image G (black region) on the image forming region GA (indicated by the thick solid line), exactly according to the accepted job execution instruction.

Suppose that the radio button C13 is selected in the step ST8, and the acceptance section 31 accepts the selection instruction for selecting the first adjusted printing processing designated by the radio button C13 (ST10: NO). In this case, the adjusted printing section 34 operates to execute the first adjusted printing processing (ST12).

Specifically, in the step ST12, the adjusted printing section 34 operates to generate an enlarged image G1 (the black region in the third column of FIG. 23) by enlarging at the same scale ratio in both of the upward-downward and rightward-leftward directions, so as to cause the first area BS1 to become 0, i.e., cause the two margin regions BR, BBR lying rightward of the image forming region GA in the white region depicted in the first column of FIG. 23 to disappear, as depicted in the third column of FIG. 23. Then, the adjusted printing section 34 operates to divide the generated enlarged image G2 into two partial images G1a, G1b based on a sheet size, and control the image forming unit 22 to form the divided partial images G1a, G1a, respectively, on two sheets.

Suppose that the radio button C12 or the radio button C14 is selected in the step ST8, and the acceptance section 31 accepts the selection instruction for selecting the second adjusted printing processing designated by each of the radio button C12 and the radio button C14 (ST10: NO). In this case, the adjusted printing section 34 operates to execute the second adjusted printing processing (ST12).

Specifically, in the step ST12, the adjusted printing section 34 operates to generate an enlarged image G2 (the black region in the fourth column of FIG. 23) by enlarging at the same scale ratio in both of the upward-downward and rightward-leftward directions, so as to cause the second area BS2 to become 0, i.e., cause the two margin regions BB, BBR lying downward of the image forming region GA in the white region depicted in the first column of FIG. 23 to disappear, as depicted in the fourth column of FIG. 23. Then, the adjusted printing section 34 operates to control the image forming unit 22 to form the generated enlarged image G2 on one sheet.

The printer according to the second embodiment can obtain the following advantageous effects.

During editing of an image, a user sometimes sets as printing conditions a printing range corresponding to a size of the image during the edition, so as to preview a result of printing of the image. Suppose that the image size is subsequently reduced so that a final image size after the editing becomes smaller than that during the editing. Despite this situation, there is a possibility that the user performs operation for generating a printing job execution instruction without changing the setting of the printing conditions.

If a printing job is executed based on such a printing job execution instruction, a sheet having an image formed thereon in a size smaller than that intended by the user and thus having a relatively large margin is likely to be output, i.e., a sheet having an image formed thereon in a layout unintended by the user is likely to be output. In this case, the user feels inconvenient due to difficulty in visually recognizing the image, and will perform operation for re-generating a new printing job execution instruction. As a result, there is a possibility that the user feels a burden of taking time and effort for re-generating a new printing job execution instruction.

In the printer according to the second embodiment, based on the region information contained in the accepted job execution instruction, it is determined whether or not the first area BS1 of the margin regions BR, BBR lying rightward of the image forming region GA in a sheet to be obtained as a result of execution of the accepted job is greater than the first threshold T1, and it is determined whether or not the second area BS2 of the margin regions BB, BBR lying downward of the image forming region GA is greater than the second threshold T2 (ST4). When the first area BS1 is determined to be greater than the first threshold T1 or when the second area BS2 is determined to be greater than the second threshold T2 (ST5: YES), the adjusted printing processing is executed (ST12).

Then, in the step ST12, by executing the first adjusted printing processing, it is possible to enlarge an image G intended to be formed, so as to cause the first area BS1 to become 0, and form the enlarged image G1 on a sheet. Instead, in the step ST12, by executing the second adjusted printing processing, it is possible to enlarge an image G intended to be formed, so as to cause the second area BS2 to become 0, and form the enlarged image G2 on a sheet.

In this way, even when an accepted job execution instruction is accepted with inadequately-set printing conditions as mentioned above, a user can obtain a sheet in which an image is enlargedly formed thereon to eliminate a margin region in the rightward-leftward or upward-downward direction so as to improve visibility of the image.

Thus, in the printer according to the second embodiment, it becomes possible to reduce the risk that a sheets is output with an image formed thereon in a layout unintended by a user, i.e., in a layout causing an excessively increased margin region. Further, it becomes possible to eliminate the need for taking time and effort for re-generating a new printing job execution instruction, to thereby improve user's convenience.

When the preference instruction for executing the accepted job without any alteration is input through the first manipulation screen (ST10: YES), the adjusted printing section 34 operates to execute the accepted job without any alternation, and, when the selection instruction for selecting one of the first adjusted printing processing and the second adjusted printing processing is input through the first manipulation screen (ST10: NO), the adjusted printing section 34 operates to execute the first adjusted printing processing or the second adjusted printing processing indicated by the input selection instruction (ST12).

That is, by performing an input manipulation through the first manipulation screen M1, a user can intentionally switch between the operation of executing the accepted job without any alteration (ST11) and the operation of executing the intended adjusted printing processing (ST12). This makes it possible to further reduce the risk that a sheet is output with an image formed thereon in a layout unintended by the user.

The selection instruction inputtable through the first manipulation screen M1 includes the selection instruction for selecting the adjusted printing processing of enlarging the image G intended to be formed according to the accepted job, so as to cause a smaller one of the first area BS1 and the second area BS2 to become reduced (the selection instruction designated by the radio button C12).

Thus, a user can input this selection instruction so as to quickly execute the adjusted printing processing, without taking time and effort for considering which of the first adjusted printing processing and the second adjusted printing processing should be selected, and then inputting the selection instruction for selecting the selected first or second adjusted printing processing through the first manipulation screen M1.

In the second embodiment, by executing the adjusted printing processing, the enlarged image G1 or G2 enlarged so as to cause a smaller one of the first image BS1 and the second image BS2 to become reduced is formed on a sheet. Thus, as compared to the case where the adjusted printing processing is executed to enlarge the image so as to cause a larger one of the first image BS1 and the second image BS2 to become reduced, a size of the image G to be formed on a sheet becomes smaller. This makes it possible to reduce the risk that the number of sheets to be obtained as a result of execution of the adjusted printing processing becomes plural, as compared to the case where the adjusted printing processing is executed to enlarge the image so as to cause a larger one of the first image BS1 and the second image BS2 to become reduced. Therefore, it becomes possible to reduce the risk that the plurality of sheets obtained as a result of execution of the adjusted printing processing causes difficulty in visually recognizing an image formed on the sheets.

Further, Suppose that the preview button F13 (FIG. 19) in the first manipulation screen M1 is depressed (ST13: YES). In this case, according to the instruction designated by one of the radio buttons C11 to C14 which is selected during depressing of the preview button F13, the preview screen MP (FIGS. 21A to 21D) comprising the preview image PG11 representing one sheet to be obtained when the accepted job is executed, or one of the preview images PG12 to PG14 each representing one or more sheets to be obtained when the first or second adjusted printing processing is executed.

Thus, before executing the accepted job without any alteration (ST11) or executing the first or second adjusted printing processing (ST12), according to the instruction selected in the first manipulation screen M1, the user can visually check an image representing one or more sheets to be printed out as a result of the execution. Therefore, it becomes possible to further reduce the risk that a sheet is output with an image formed thereon in a layout unintended by the user.

When information indicating that the accepted job execution instruction has been generated by a given spreadsheet software is not contained in the accepted job execution instruction (ST2: NO), the adjusted printing section 34 operates to execute the accepted job without any alteration (ST11), as with the adjusted printing section 15 in the first embodiment.

That is, as with the first embodiment, it is possible to quickly execute the accepted job, in view of the fact that, when information indicating that the accepted job execution instruction has been generated by a given spreadsheet software is not contained in the accepted job execution instruction, an image is not likely to be output with an image formed thereon in a layout unintended by a user.

It should be noted that the second embodiment is no more than one example of an embodiment of the present invention. For example, the second embodiment may be modified as follows.

(1) The step ST2 may be omitted.

(2) The first manipulation screen M1 may be configured to omit the preview button F13, and, in conjunction with this, the steps ST13 and ST14 may be omitted.

(3) The control unit 30 may be configured such that it does not operate as the display control section 35, i.e., it skips the steps ST6 to ST10, ST13 and ST14. In conjunction with this, the adjusted printing section 32 may be configured to execute the step ST12, when, in the step ST4, the first determination section 32 determines, in the step ST4, that the first area BS1 is greater than the first threshold T1 or when the second determination section 33 determines, in the step ST4, that the second area BS2 is greater than the second threshold T2 (ST5: YES).

In this case, the adjusted printing section 34 operates to execute the adjusted printing processing of enlarging the image G so as to cause a smaller one of the first area BS1 and the second area BS2 to become reduced, in the same manner as that when the selection instruction designated by the radio button C21 is accepted by the acceptance section 31 during the adjusted printing processing in the step ST12.

Alternatively, execution processing information indicative of one of the first adjusted printing processing and the second adjusted printing processing to be executed in the step ST12 may be preliminarily stored in a non-volatile memory. In conjunction with this, the adjusted printing section 34 may be configured to execute the first or second adjusted printing processing indicated by the execution processing information stored in the non-volatile memory, during the adjusted printing processing in the step ST12.

Figure 24:
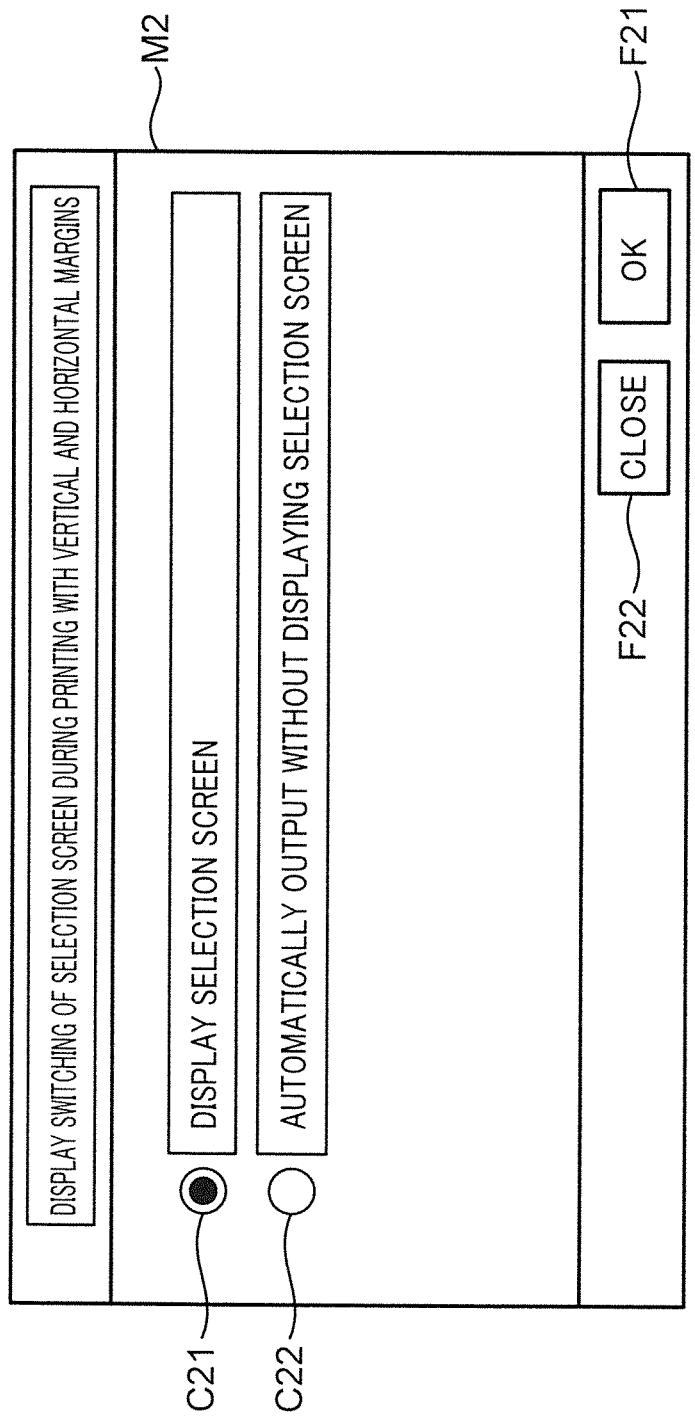
FIG. 24 is a diagram depicting another example of the second manipulation screen.

(4) The control unit 30 may be configured to further operate as an adjustment switching section 36, as indicated in the dashed line block in FIG. 15. FIG. 24 is a diagram depicting one example of a second manipulation screen M2. At a given timing when the acceptance section 31 has not yet accepted a printing job, such as when performing a default setting of the printer 3, the adjustment switching section 36 is operable to display a second manipulation screen M2 capable of allowing a user to input therethrough an automatic adjustment instruction or a manual adjustment instruction, on the display section 231, for example, as depicted in FIG. 24.

The second manipulation screen M2 comprises two radio buttons C21, C22, an OK button F21, and a close button F22.

The two radio buttons C21, C22 are configured such that only either one of them can be selected. The radio button C21 is provided as a means to input the manual adjustment instruction. The radio button C22 is provided as a means to input the automatic adjustment instruction.

The OK button F21 is provided as a means to finally set an input of the instruction designated by a user-selected one of the radio buttons C21 and C22. Specifically, suppose that either one of the radio buttons C21, C22 is selected and then the OK button F11 is depressed. In this case, the input of the instruction designated by the selected one radio button is finally set, and this instruction is accepted by the acceptance section 31.

As one example, suppose that the radio button C21 is selected and then the OK button F21 is depressed. In this case, the manual adjustment instruction designated by the radio button C21 is accepted by the acceptance section 31. As another example, suppose that the radio button C22 is selected and then the OK button F21 is depressed. In this case, the automatic adjustment instruction designated by the radio button C22 is accepted by the acceptance section 31.

When the radio button C22 is selected in the second manipulation screen M2, and the automatic adjustment instruction is accepted by the acceptance section 31, the adjustment switching section 36 skips the steps ST6 to ST10, ST13 and ST14, in the same manner as that in the above modification (3) of the second embodiment.

Then, the adjustment switching section 36 is operable, when the first determination section 32 determines, in the step ST4, that the first area BS1 is greater than the first threshold T1 or when the second determination section 33 determines, in the step ST4, that the second area BS2 is greater than the second threshold T2 (ST5: YES), to cause the adjusted printing section 34 to execute the first or second adjusted printing processing (ST12), in the same manner as that in the modification (3) of the second embodiment.

On the other hand, when the radio button C21 is selected in the second manipulation screen M2, and the manual adjustment instruction is accepted by the acceptance section 31, the adjustment switching section 36 performs the same operation as that depicted in FIG. 17. That is, in the step ST6, the adjustment switching section 36 is operable, when the manual adjustment instruction is accepted, to cause the display control section 35 to display the first manipulation screen M1, prior to the execution of the adjusted printing processing by the adjusted printing section 34.

In the above modification (4) of the second embodiment, it is possible to allow a user to use the second manipulation screen M2 to switch between a first operation of automatically executing the adjusted printing processing so as to quickly execute a printing processing according to the accepted job execution instruction, and a second operation of displaying the first manipulation screen M1 to allow a user to input therethrough an instruction for executing the accepted job without any alteration or executing the second adjusted printing processing, so as to execute a printing processing suited to user's intention.

(5) The first threshold T1 and the second threshold T2 described in the second embodiment are no more than examples of the first and second thresholds in the present invention. For example, each of the first threshold T1 and the second threshold T2 may be set to a given area which is deemed to be sufficiently small as compared to an area of one sheet (e.g., an area equal to 5% the overall area of the sheet)

(6) In the second embodiment, the specific examples of the operation depicted in FIG. 17 have been described on the assumption that: the image forming region GA lies in an upper left corner; the first area BS1 is the area of the margin region lying rightward of the image forming region GA (the sum of the areas of the margin regions BR, BBR); and the second area BS2 is the area of the margin region lying downward of the image forming region GA (the sum of the areas of the margin regions BB, BBR).

Alternatively, the operation depicted in FIG. 17 may be performed on the assumption that, when the image forming region GA lies in an upper right corner, the first area BS1 may be set to an area of a margin region lying leftward of the image forming region GA, and the second area BS2 may be set to an area of a margin region lying downward of the image forming region GA. Alternatively, the operation depicted in FIG. 17 may be performed on the assumption that, when the image forming region GA lies in a lower left corner, the first area BS1 may be set to an area of a margin region lying rightward of the image forming region GA, and the second area BS2 may be set to an area of a margin region lying upward of the image forming region GA. Alternatively, the operation depicted in FIG. 17 may be performed on the assumption that, when the image forming region GA lies in a lower right corner, the first area BS1 may be set to an area of a margin region lying leftward of the image forming region GA, and the second area BS2 may be set to an area of a margin region lying upward of the image forming region GA.

(7) In the second embodiment, the first adjusted printing processing to be performed in the step ST12 is configured to enlarge the image G intended to be formed according to the accepted job, so as to cause the first area BS1 to become zero, and the second adjusted printing processing to be performed in the step ST12 is configured to enlarge the image G intended to be formed according to the accepted job, so as to cause the second area BS2 to become zero.

Alternatively, the first adjusted printing processing may be configured to enlarge the image G intended to be formed according to the accepted job, so as to cause the first area BS1 to become a given value greater than 0 (this given value will hereinafter be termed "first given value"). For example, the first given value may be set to a value of a half of the first threshold T1, or an area of a margin region to be provided along a right or left edge of a sheet in connection with design specifications of the image forming unit 22.

Similarly, the second adjusted printing processing may be configured to enlarge the image G intended to be formed according to the accepted job, so as to cause the second area BS2 to become a given value greater than 0 (this given value will hereinafter be termed "second given value"). For example, the second given value may be set to a value of a half of the second threshold T2, or an area of a margin region to be provided along an upper or lower edge of a sheet in connection with design specifications of the image forming unit 22.

Figure 25:
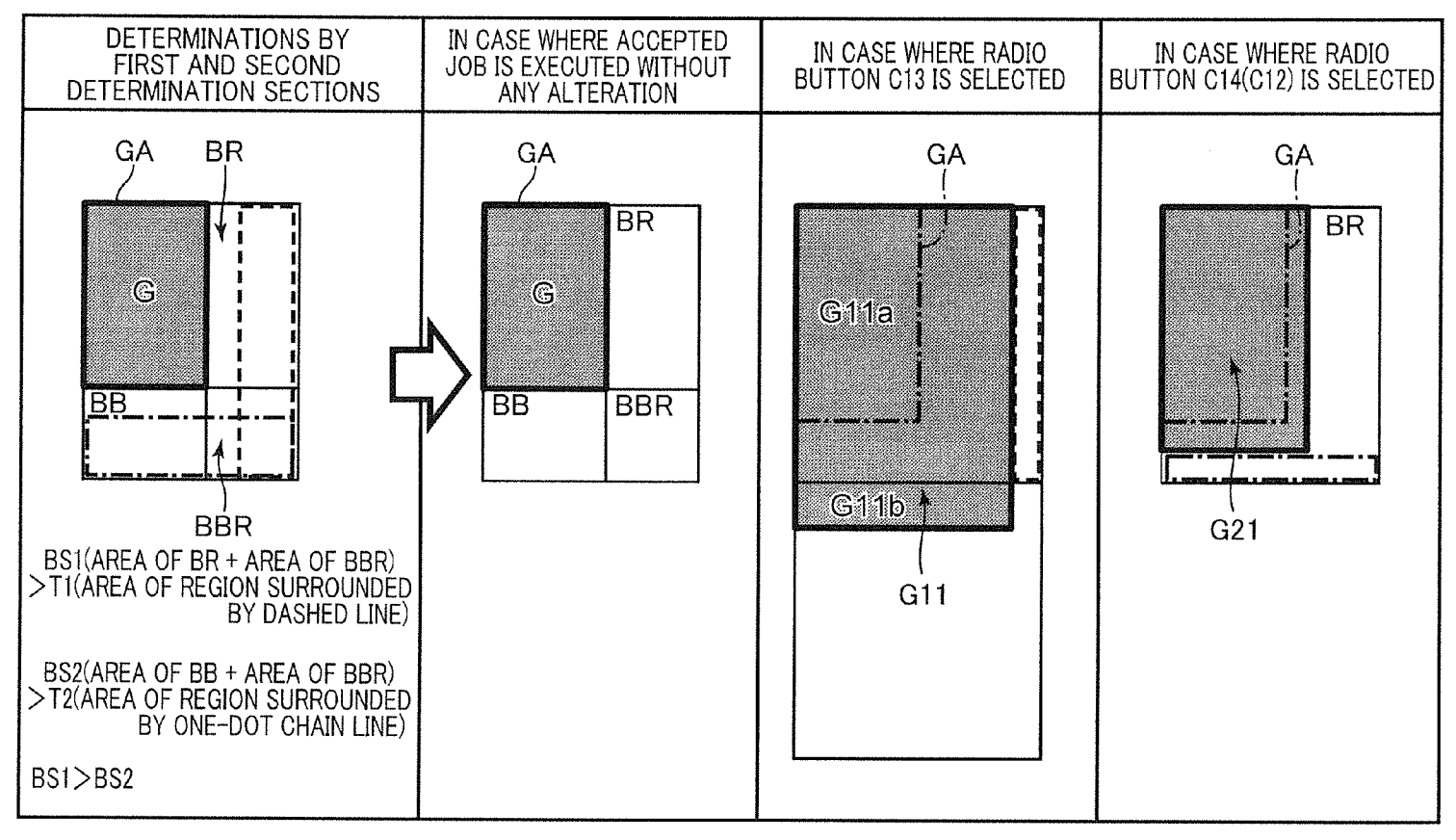

A specific example of this case will be described with reference to FIG. 25. FIG. 25 is a diagram depicting specific examples of the first and second given values to be set when the first adjusted printing processing and the second adjusted printing processing in the modification (7) of the second embodiment are performed. The first and second columns of FIG. 25 are the same as the first and second columns of FIG. 18, and therefore description thereof will be omitted. Further, in FIG. 25, description of any element or region designated by the same reference sign as that in FIG. 18 will also be omitted.

In this specific example, suppose that the first adjusted printing processing to be performed in the step ST12 is configured to enlarge the image G intended to be formed according to the accepted job, so as to cause the first area BS1 to become the first given value. Further, suppose that the first given value is set to a value equal to a half of the first threshold T1. On the other hand, the second adjusted printing processing to be performed in the step ST12 is configured to enlarge the image G intended to be formed according to the accepted job, so as to cause the second area BS2 to become the second given value. Further, suppose that the second given value is set to a value equal to a half of the second threshold T2.

In this case, as depicted in the third column of FIG. 25, the adjusted printing section 34 is operable, when performing the first adjusted printing processing in the step ST12, to generate an enlarged image G11 (the black region in the third column of FIG. 25) by enlarging at the same scale ratio in both of the upward-downward and rightward-leftward directions, so as to cause the first area BS1 to become the first given value, i.e., cause the first area BS1 to become an area (of the region surrounded by the dashed line in the third column of FIG. 25) equal to a half of the first threshold T1 which is equal to an area of the region surrounded by the dashed line in the first column of FIG. 25. Then, the adjusted printing section 34 is operable to divide the generated enlarged image G11 into two partial images G11$a$, G11$b$ based on a sheet size, and control the image forming unit 22 to form the divided partial images Gi1a, Gi1a, respectively, on two sheets.

On the other hand, as depicted in the fourth column of FIG. 25, the adjusted printing section 34 is operable, when performing the second adjusted printing processing in the step ST12, to generate an enlarged image G21 (the black region in the fourth column of FIG. 25) by enlarging at the same scale ratio in both of the upward-downward and rightward-leftward directions, so as to cause the second area BS2 to become the second given value, i.e., cause the second area BS2 to become an area (of the region surrounded by the one-dot chain line in the fourth column of FIG. 25) equal to a half of the second threshold T2 which is equal to an area of the region surrounded by the one-dot chain line in the first column of FIG. 25. Then, the adjusted printing section 34 is operable to control the image forming unit 22 to form the generated enlarged image G21 on one sheet.

In the printer according to the modification (7) of the second embodiment, by executing the adjusted printing processing, the enlarged image G11 or G21 obtained by enlarging the image G intended to be formed, so as to cause the first image BS1 or the second image BS2 to become reduced, can be formed on a sheet. This makes it possible to obtain a sheet on which the enlarged image G11 or G21 is formed while a margin region is reduced in the rightward-leftward or upward-downward direction, with improved visibility of the image.

The invention claimed is:

1. An image forming apparatus comprising: an acceptance section which accepts a printing job execution instruction for executing a printing job for forming a set of partial images, respectively, on a plurality of sheets;
   a prediction section which predicts, based on margin information contained in an accepted job execution instruction accepted by the acceptance section, and indicative of a margin region as a non-image forming region defined in each of the sheets, an arrangement pattern of the plurality of sheets to be obtained as a result of execution of an accepted job as the printing job indicated by the accepted job execution instruction;
   a determination section which determines, based on the margin information, whether or not a sum of respective areas of margin regions of the plurality of sheets is greater than a threshold associated with the arrangement pattern predicted by the prediction section; and
   an adjusted printing section which executes an adjusted printing processing of: downscaling, when the determination section determines that that the sum is greater than the threshold, an overall image consisting of a set of partial images intended to be formed according to the accepted job and arranged in the predicted arrangement pattern, in such a manner as to fall within one or more sheets arranged in an altered arrangement pattern associated with the predicted arrangement pattern; and forming the downscaled overall image on the one or more sheets arranged in the altered arrangement pattern, wherein the number of the one or more sheets is less than that of the sheets arranged in the predicted arrangement pattern.

2. The image forming apparatus as recited in claim 1, wherein the altered arrangement pattern is set by a number of one or more in association with the predicted arrangement pattern, and wherein the image forming apparatus further comprises:
   a display section; and
   a display control section which displays, on the display section, a first manipulation screen capable of allowing a user to input therethrough a preferential instruction for executing the accepted job without any alteration, or a selection instruction for selecting one of the one or more altered arrangement patterns associated with the predicted arrangement pattern, when the determination section determines that the sum is greater than the threshold, and prior to the execution of the adjusted printing processing by the adjusted printing section, and
   wherein, when the preference instruction is input through the first manipulation screen, the adjusted printing section executes the accepted job without any alternation, and, when the selection instruction is input through the first manipulation screen, the adjusted printing section executes the adjusted printing processing using the one altered arrangement pattern indicated by the input selection instruction.

3. The image forming apparatus as recited in claim 2, wherein the first manipulation screen is further capable of allowing the user to input a preview execution instruction,
   and wherein, when the preference instruction and the preview execution instruction are input through the first manipulation screen, the adjusted printing section displays, on the display section, an image representing a result obtained by arranging the plurality of sheets in the predicted arrangement pattern, and, when the selection instruction and the preview execution instruction are input through the first manipulation screen, the adjusted printing section displays, on the display section, an image representing a result obtained by arranging one or more sheets in the one altered arrangement pattern based on the execution of the adjusted printing processing using the one altered arrangement pattern indicated by the input selection instruction.

4. The image forming apparatus as recited in claim 2, which further comprises an adjustment switching section which displays, on the display section, a second manipulation screen capable of allowing the user to input an automatic adjustment instruction or a manual adjustment instruction, wherein, when the automatic adjustment instruction is input through the second manipulation screen, the adjustment switching section causes the adjusted printing section to execute the adjusted printing processing, and, when the manual adjustment instruction is input through the second manipulation screen, the adjustment switching section causes the display control section to display the first manipulation screen, prior to the execution of the adjusted printing processing by the adjusted printing section.

5. The image forming apparatus as recited in claim 1, wherein the predicted arrangement pattern includes a specific arrangement pattern in which two or more sheets are aligned in a vertical direction, and wherein the altered arrangement pattern associated with the specific arrangement pattern is constructed such that the number of sheets aligned in the vertical direction is less than that in the specific arrangement pattern by one.

6. The image forming apparatus as recited in claim 1, wherein the predicted arrangement pattern includes a specific arrangement pattern in which two or more sheets are aligned in a horizontal direction, and wherein the altered arrangement pattern associated with the specific arrangement pattern is constructed such that the number of sheets aligned in the horizontal direction is less than that in the specific arrangement pattern by one.

7. The image forming apparatus as recited in claim 1, wherein the predicted arrangement pattern includes a specific arrangement pattern in which two or less sheets are aligned in a vertical direction, and two or less sheets are aligned in a horizontal direction, and wherein the altered arrangement pattern associated with the specific arrangement pattern is constructed such that only one sheet is disposed.

8. The image forming apparatus as recited in claim 1, wherein the predicted arrangement pattern includes a first arrangement pattern in which one sheet is disposed in a vertical direction, and three or more sheets are aligned in a horizontal direction, and a second arrangement pattern in which one sheet is disposed in the horizontal direction, and three or more sheets are aligned in the vertical direction, and wherein the threshold associated with each of the first and second arrangement patterns is set to a total area of all of the sheets arranged in each of the first and second arrangement patterns.

9. The image forming apparatus as recited in claim 1, wherein, when information indicating that the accepted job execution instruction has been generated by a given spreadsheet software is not contained in the accepted job execution instruction, the adjusted printing section executes the accepted job without any alteration.

10. An image forming apparatus comprising:
   an acceptance section which accepts a printing job execution instruction for executing a printing job for forming an image on one sheet;
   a first determination section which determines, based on region information contained in an accepted job execution instruction accepted by the acceptance section, and indicative of an image forming region and a margin region as a non-image forming region each defined in the one sheet, whether or not a first area of a part of the margin region lying rightward or leftward of the image forming region is greater than a preset first threshold;
   a second determination section which determines, based on the region information, whether or not a second area of a part of the margin region lying upward or downward of the image forming region is greater than a preset second threshold; and
   an adjusted printing section which executes an adjusted printing processing of: enlarging, when the first determination section determines that the first area is greater than the first threshold or when the second determination section determines that the second area is greater than the second threshold, an image intended to be formed according to the accepted job, so as to cause the first area or the second area to become reduced; and forming the enlarged image on one or more sheets.

11. The image forming apparatus as recited in claim 10, which further comprises:
a display section; and
a display control section which display on the display section, when the first determination section determines that the first area is greater than the first threshold or when the second determination section determines that the second area is greater than the second threshold, and prior to execution of the adjusted printing processing by the adjusted printing section, a first manipulation screen for allowing a user to input therethrough a preference instruction for executing the accepted job without any alteration, or a selection instruction for selecting one of a first adjusted printing processing of enlarging the image intended to be formed according to the accepted job, so as to cause the first area to become reduced, and a second adjusted printing processing of enlarging the image intended to be formed according to the accepted job, so as to cause the second area to become reduced,
wherein, when the preference instruction is input through the first manipulation screen, the adjusted printing section executes the accepted job without any alteration, and, when the selection instruction is input through the first manipulation screen, the adjusted printing section executes the first or second adjusted printing processing indicated by the input selection instruction.

12. The image forming apparatus as recited in claim 11, wherein the selection instruction comprises a selection instruction for selecting the adjusted printing processing of enlarging the image intended to be formed according to the accepted job, so as to cause a smaller one of the first and second areas to become reduced.

13. The image forming apparatus as recited in claim 11, wherein the first manipulation screen is configured to allow the user to input therethrough a preview execution instruction, and wherein, when the preference instruction and the preview execution instruction are input through the first manipulation screen, the adjusted printing section displays on the display section an image representing the one sheet to be obtained as a result of execution of the accepted job, and, when the selection instruction and the preview execution instruction are input through the first manipulation screen, the adjusted printing section displays, on the display section, an image representing the one or more sheets to be obtained as a result of execution of the first or second adjusted printing processing indicated by the input selection instruction.

14. The image forming apparatus as recited in claim 11, which further comprises an adjustment switching section which displays, on the display section, a second manipulation screen capable of allowing the user to input an automatic adjustment instruction or a manual adjustment instruction, wherein, when the automatic adjustment instruction is input through the second manipulation screen, the adjustment switching section causes the adjusted printing section to execute the adjusted printing processing, and, when the manual adjustment instruction is input through the second manipulation screen, the adjustment switching section causes the display control section to display the first manipulation screen, prior to the execution of the adjusted printing processing by the adjusted printing section.

15. The image forming apparatus as recited in claim 10, wherein, during the first adjusted printing processing of enlarging the image intended to be formed according to the accepted job, so as to cause the first area to become reduced, the adjusted printing section enlarges the image intended to be formed according to the accepted job, so as to cause the first area to become 0, and, during the second adjusted printing processing of enlarging the image intended to be formed according to the accepted job, so as to cause the second area to become reduced, the adjusted printing section enlarges the image intended to be formed according to the accepted job, so as to cause the second area to become 0.

16. The image forming apparatus as recited in claim 10, wherein, when information indicating that the accepted job execution instruction has been generated by a given spreadsheet software is not contained in the accepted job execution instruction, the adjusted printing section executes the accepted job without any alteration.

* * * * *